United States Patent [19]
Iida

[11] Patent Number: 5,900,608
[45] Date of Patent: May 4, 1999

[54] METHOD OF PURCHASING PERSONAL RECORDING MEDIA, SYSTEM FOR PURCHASING PERSONAL RECORDING MEDIA, AND MEDIA RECORDED WITH PERSONAL RECORDING MEDIA PURCHASING PROGRAM

[76] Inventor: Takahito Iida, 531-11, Yabata, Chigasaki-shi, Kanagawa-ken, Japan

[21] Appl. No.: 08/991,235

[22] Filed: Dec. 16, 1997

[30] Foreign Application Priority Data

Oct. 16, 1997 [JP] Japan .................................. 9-284084

[51] Int. Cl.[6] ...................................................... G06F 7/08
[52] U.S. Cl. ............................................................ 235/381
[58] Field of Search .................................. 235/381, 380, 235/492, 382, 382.5; 369/30, 34, 36, 85, 15, 84, 55

[56] References Cited

U.S. PATENT DOCUMENTS

| | | |
|---|---|---|
| 3,718,906 | 2/1973 | Lightner .................................. 340/147 |
| 3,947,882 | 3/1976 | Lightner .................................... 360/92 |
| 3,990,710 | 11/1976 | Hughes . |
| 4,141,045 | 2/1979 | Sheehan . |
| 4,674,055 | 6/1987 | Ogaki et al. . |
| 4,703,465 | 10/1987 | Parker . |
| 4,811,325 | 3/1989 | Sharples, Jr. et al. . |
| 4,937,807 | 6/1990 | Weitz et al. . |
| 5,041,921 | 8/1991 | Scheffler . |
| 5,237,157 | 8/1993 | Kaplan . |
| 5,408,630 | 4/1995 | Moss . |
| 5,418,654 | 5/1995 | Scheffler . |
| 5,418,763 | 5/1995 | Ichikawa et al. . |
| 5,445,295 | 8/1995 | Brown . |
| 5,502,601 | 3/1996 | Scheffler . |
| 5,513,116 | 4/1996 | Buckley et al. . |
| 5,561,604 | 10/1996 | Buckley et al. . |

(List continued on next page.)

FOREIGN PATENT DOCUMENTS 09204378A 8/1997 Japan .

OTHER PUBLICATIONS

"The Net Is Alive With The Sound Of Music," *Tech. Web*, Ian Scott Gertler, Oct. 30, 1997;.

"DVS Synchrome Will Unveil Four New CD–R Drives at COMDEX: Ideal for making Custom Music CDs, Multimedia CD–ROMS," *Business Wire*, Oct. 21, 1997;.

"New Venture Aims to Combat Discounters' Deary Selections," *Billboard Publications*, Ed Christman, Mar. 8, 1997;.

"Polygram, Capitol/EMI, Warner and MCA Grant Music Rights to Technical Maintenance Corporation," *Business Wire*, Jan. 20, 1997.

"Network Music Announces Private Label Division," *Newwork Music, Inc.*, Jan. 1996;.

(List continued on next page.)

*Primary Examiner*—Thien Minh Le
*Attorney, Agent, or Firm*—Cowan, Liebowitz & Latman, P.C.

[57] ABSTRACT

A system for purchasing a personal recording media includes a first entering unit for entering an identification information in order to identify a customer, a unit connected to the first entering unit for identifying whether or not the customer is an authorized customer based on the entered identification information, a second entering unit connected to the identifying unit for entering at least one designated information by the customer when the customer is identified as an authorized customer in accordance with the identifying unit, a unit for storing a plurality of information, a unit connected to the second entering unit and the information storing unit for reading information associated with the designated information by retrieving the plurality of information in the information storing unit based on the designated information entered by the second entering unit, and a unit connected to the information reading unit for recording the information read from the information storing unit into a predetermined recording media.

41 Claims, 37 Drawing Sheets

5,900,608
Page 2

U.S. PATENT DOCUMENTS

| | | | |
|---|---|---|---|
| 5,592,511 | 1/1997 | Schoen et al. | 375/220 |
| 5,633,839 | 5/1997 | Alexander et al. | |
| 5,641,092 | 6/1997 | Scott | |
| 5,654,746 | 8/1997 | McMullan, Jr. et al. | |
| 5,740,134 | 4/1998 | Peterson | 369/30 |

OTHER PUBLICATIONS

"Network Music Introduces Promotional Music Series," *Newwork Music, Inc.,* Jul. 1996;.

"Apple and N2K Inc. Provide Definitive Resource on the Internet for Enhanced CDs;".

"Buying Sound Effects CDs on the Internet," Gefen Systems, 1997;.

"PPL and MCPS Create New Database," *Music Week,* Jan. 17, 1998;.

"Billboard's Music Database Now An Internet Freebie," *The Times Union* (Albany, NY), Jan. 28, 1998.

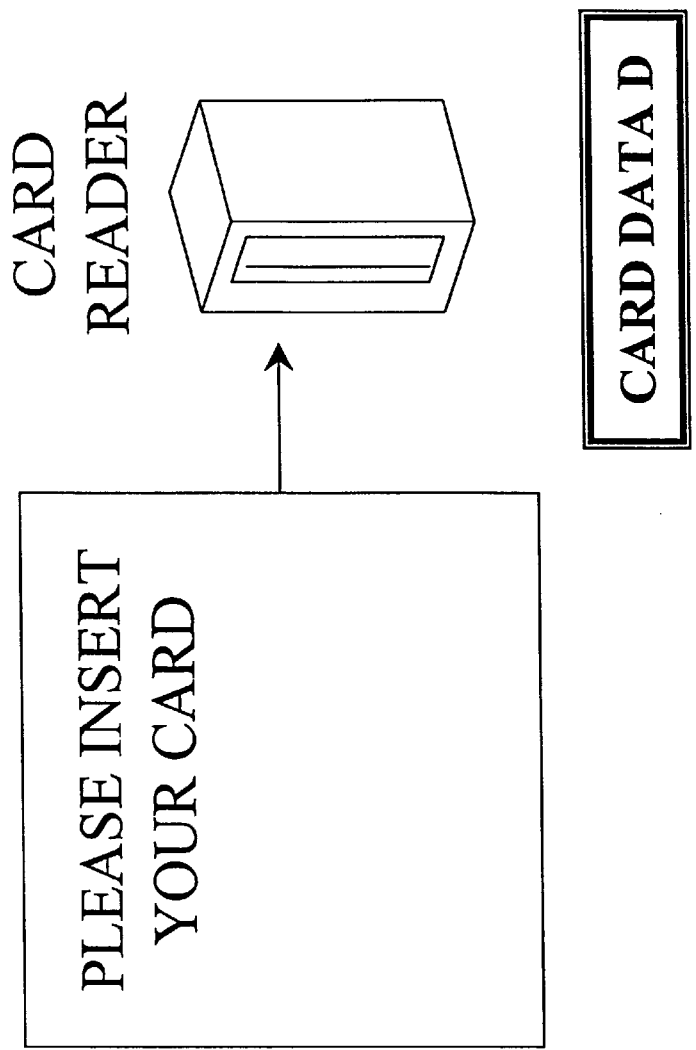
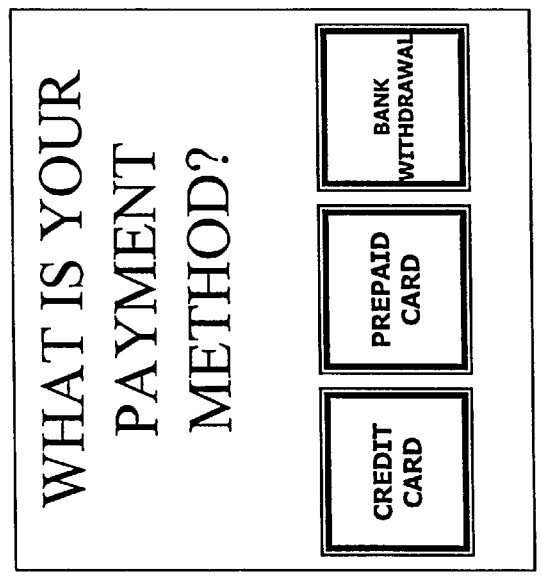
Figure 8

FIG. 12

Index A
Japanese Music

| | |
|---|---|
| Title of musical composition | Red Sweetpea |
| Minutes of Musical Composition | 5 Minutes 21 Seconds |
| Artist | Seiko Matsuda |
| Songwriter | Karuho Kureta |
| Musical Composer | Karuho Kureta |
| Manufactured Date | 1982.7.1 |
| Representative Country of original disc | Japan |
| Representative Company of original disc | Sony Music (Japan) |
| Option I | (Words) |
| Option II | (Music Score) |

FIG. 13

Index B -
Western Music

| | |
|---|---|
| Title of musical composition | Yesterday |
| Minutes of Musical Composition | 4 Minutes 50 Seconds |
| Artist | The Beatles |
| Songwriter | John Lennon |
| Musical Composer | Paul McCartney |
| Manufactured Date | 1968.7.1 |
| Representative Country of original disc | England |
| Representative Company of original disc | Big Apple |
| Option I | (Words) |
| Option II | (Music Score) |

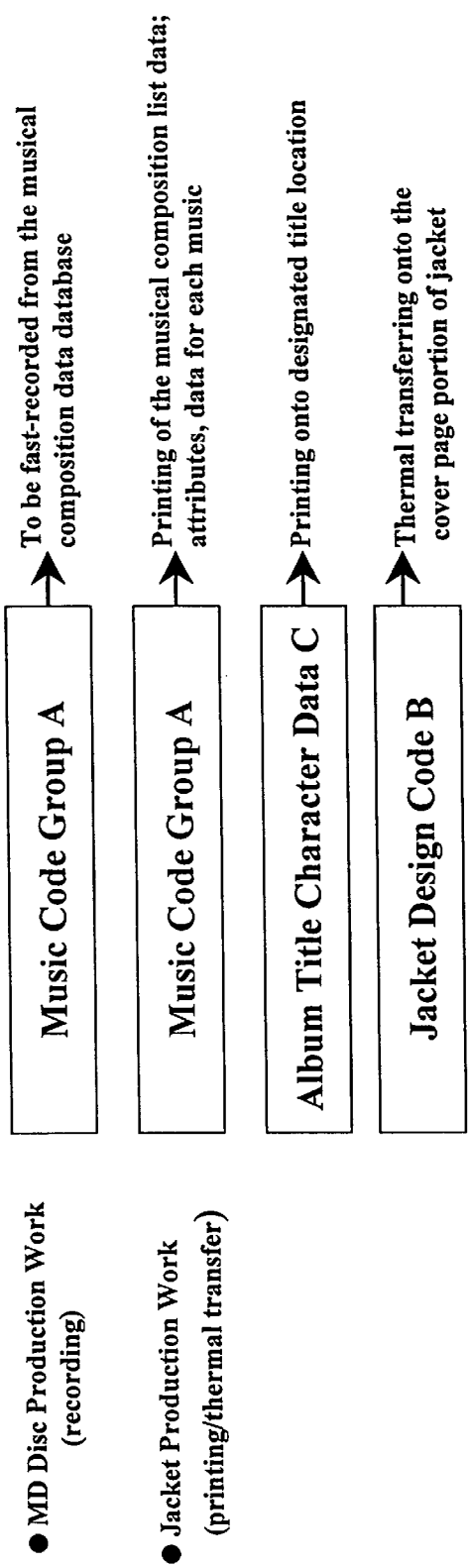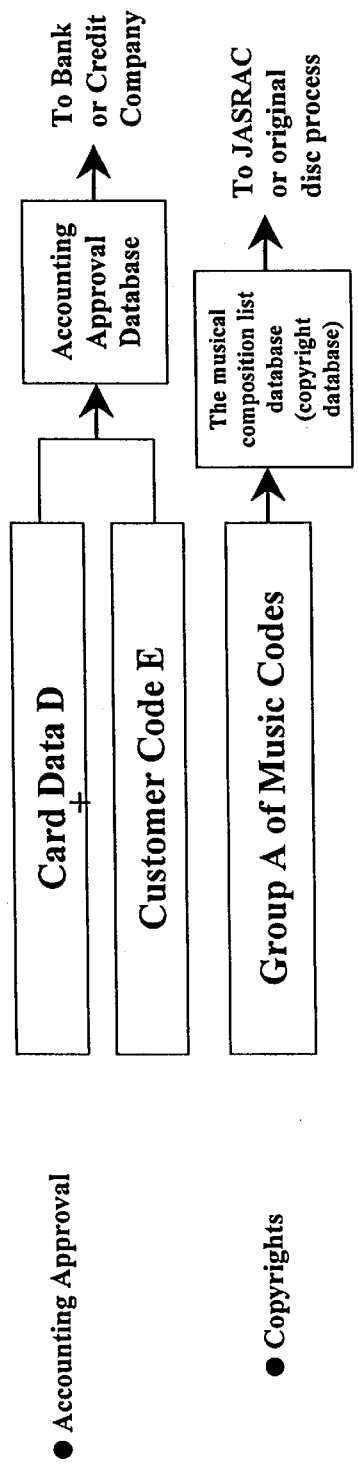
Figure 23

- "Acquisition Button" is blinking (an indication of a possibility of direct receiving).

- By clicking, the music code 081AMDB029988 and the music sound source(digital) are stored on the hard disk.

- The music codes for 5 music tracks are stored onto the hard disk when the TV program finishes.

| Group A of Music Codes | Group X of Music Sound Source |

After having confirmed the receipt of ADE at the Host-Computer, the Approval Code B, which is attached to the customer data E, is transmitted to the Home PC.

5,900,608

METHOD OF PURCHASING PERSONAL RECORDING MEDIA, SYSTEM FOR PURCHASING PERSONAL RECORDING MEDIA, AND MEDIA RECORDED WITH PERSONAL RECORDING MEDIA PURCHASING PROGRAM

BACKGROUND OF THE INVENTION

1. Field of the Invention

The present invention relates to a system for purchasing a personal recording media, and more particularly to a system capable of searching one or more musical compositions, editing the searched musical compositions, and purchasing a recording media such as CD, MD, cassette tape and the like into which the edited musical compositions are inserted.

2. Description of the Related Art

In general, a customer can produce an original compilation recording media which is unique to the customer by renting or purchasing a MD, CD, cassette tape and the like, selecting the customer's favorite musical compositions by utilizing a reproducing/recording apparatus such as a CD player/recorder, a cassette deck and the like, and editing and recording the selected musical compositions into recording media such as a MD, CD, or cassette tape in the customer's preferred order.

For example, even for musical compositions by a single musician or artist, it is rare that all personally favorite musical compositions are recorded in just one album such as an MD, CD, or cassette tape. Accordingly, when the customer desires to produce a personally original compilation recording media such as an album composed of only the customer's personally favorite musical compositions, the customer has to purchase or rent a plurality of MDs, CDs, cassette tapes and the like, and then select, edit, and then record personally favorite musical compositions using reproducing/editing/recording storage apparatus in such a manner that a few musical compositions are selected from one album, more musical compositions are selected from another album and further musical compositions are selected from another album.

Similarly, when the customer desires to produce an album composed of musical compositions by a plurality of musicians or artists, a plurality of albums by each of the musicians or artists have to be purchased or rent, and then the desired personally original compilation recording media must be produced by using the reproducing/editing/recording storage apparatus.

In the above mentioned conventional methods, there is a problem, such that when a customer desires to produce an original compilation recording media, the customer has to purchase or rent a plurality of MDs, CDs, cassette tapes and the like, and then select, edit, and then record personally favorite musical compositions from them using reproducing/editing/recording storage apparatus, and as a result, it would be more costly than purchasing one MD, CD, cassette tape and the like having those personally favorite musical compositions, and also it would take time for reproducing/editing/recording.

Further, there is another problem, such that because a customer freely produces a personally original compilation recording media by copying the musical compositions from a plurality of MDs, CDs, cassette tapes and the like, without concern for the existence of the copyrights of the musical compositions, the copyright owners can not collect royalties for the copyrights regarding their own musical compositions, and as a result, no return has been provided for the music industries as well as for the musical composers.

SUMMARY OF THE INVENTION

It is an object of the present invention to provide a system for purchasing a personal recording media, which system is capable of arbitrarily selecting or designating the customer's favorite musicians or artists, arbitrarily selecting or designating musical compositions by the selected musicians or artists, and purchasing a personally original compilation recording media composed of the selected or designated musical compositions.

It is another object of the present invention to provide a method of purchasing a personal recording media for arbitrarily selecting or designating the customer's favorite musicians or artists, arbitrarily selecting or designating musical compositions by the selected musicians or artists, and purchasing a personally original compilation recording media composed of the selected or designated musical compositions.

It is still another object of the present invention to provide a recording media of recording a personal recording media purchasing program for arbitrarily selecting or designating the customer's favorite musicians or artists, arbitrarily selecting or designating musical compositions by the selected musicians or artists, and purchasing a personally original compilation recording media composed of the selected or designated musical compositions.

It is further object of the present invention to provide a system for purchasing a personal recording media, which system is capable of automatically collecting royalties for copyrights and the like regarding the musical compositions incorporated into the recording media at a time when a customer purchases a personally original compilation recording media, and also capable of implementing the return and the like concerning the use of the musical compositions for the copyrighters and the like.

It is another object of the present invention to provide a method of purchasing a personal recording media for automatically collecting royalties for copyrights and the like regarding the musical compositions incorporated into the recording media at a time when a customer purchases a personally original compilation recording media, and for implementing the return and the like concerning the use of the musical compositions for the copy righters and the like.

It is still another object of the present invention to provide a recording media of recording a personal recording media purchasing program for automatically collecting royalties for copyrights and the like regarding the musical compositions incorporated into the recording media at a time when a customer purchases a personally original compilation recording media, and for implementing the return and the like concerning the use of the musical compositions for the copy righters and the like.

The objects of the present invention can be achieved by a system for purchasing a personal recording media, comprising:

a first entering unit for entering an identification information in order to identify a customer;

a unit connected to the first entering unit for identifying whether or not the customer is an authorized customer based on the entered identification information;

a second entering unit connected to the identifying unit for entering at least one designated information by the customer when the customer is identified as an authorized customer in accordance with the identifying unit;

a unit for storing a plurality of information;

a unit connected to the second entering unit and the information storing unit for reading information associated with the designated information by retrieving the plurality of information in the information storing unit based on the designated information entered by the second entering unit; and a unit connected to the information reading unit for recording the information read from the information storing unit into a predetermined recording media.

Preferably, a system for purchasing a personal recording media according to the present invention further includes unit for implementing a predetermined accounting process regarding the recording media into which the information has been recorded.

Another object of the present invention can be achieved by a system for purchasing a personal recording media, comprising:

a first station, including a first entering unit for entering an identification information in order to identify a customer;

a second entering unit for entering at least one designated information by the customer when the customer is identified as an authorized customer;

a second station, including a unit connected to the first station for identifying whether or not the customer is an authorized customer based on the identification information entered by the first entering unit;

a unit for storing a plurality of information;

a unit for reading information associated with the designated information by retrieving the plurality of information in the information storing unit based on the designated information entered by the second entering unit;

a unit connected to the information reading unit for recording the information read from the information storing unit into a predetermined recording media; and a unit for implementing a predetermined accounting process regarding the recording media into which the information has been recorded, wherein, the customer can purchase the recording media at the first station in such a manner that the recording media consisting of the information corresponding to an arbitrary number of the designated information entered from the second entering unit by the customer at the first station is produced at the second station, and then the produced recording media is delivered to the first station.

Preferably, the first station further includes a unit for storing a specific information consisting of a part of the plurality of information stored in the information storing unit at the second station; and a unit for retrieving the specific information storing unit based on the designated information entered from the second entering unit by the customer and for displaying, to the customer, the specific information associated with the designated information entered.

Yet another object of the present invention can be achieved by a system for purchasing a personal recording media, comprising:

a first station, including a first entering unit for entering an identification information in order to identify a customer;

a second entering unit for entering at least one designated information by the customer when the customer is identified as an authorized customer;

a first information storing unit for storing a plurality of information;

a information recording unit for recording information associated with the designated information by retrieving the plurality of information of the first information storing unit based on the designated information entered from the second entering unit;

a second station, including a unit connected to the first station for identifying whether or not the customer is an authorized customer based on the identification information entered by the first entering unit;

a second information storing unit for storing a plurality of information corresponding to the plurality of information stored in the first storing unit;

a unit for implementing a predetermined accounting process regarding the recording media into which the information has been recorded;

a third station, connected to the first station and the second station, respectively, including a latest information storing unit for storing the latest information, wherein, the first station and the second station update the plurality of information stored in the first information storing unit and the second information storing unit, respectively, based on the latest information stored in the latest information storing unit, wherein the customer can purchase the recording media at the first station in such a manner that the recording media consisting of an arbitrary number of the information is produced at the first station based on the designated information entered by the customer at the first station.

Preferably, the plurality of information stored in the first information storing unit and the plurality of information stored in the second information storing unit are musical composition information which include information concerning a musical composition list, a musical composition data, an index and a copyright.

Still another object of the present invention can be achieved by a system for purchasing a personal recording media, comprising:

a first station, including a first entering unit for entering an identification information in order to identify a customer;

a second entering unit for entering at least one designated information by the customer when the customer is identified as an authorized customer;

a second station, including a unit connected to the first station for identifying whether or not the customer is an authorized customer based on the identification information entered by the first entering unit;

an information storing unit for storing a plurality of information;

a unit for reading the information associated with the designated information by retrieving the plurality of information in the information storing unit based on the designated information entered from the second entering unit;

information recording unit connected to the information reading unit for recording the information read from the information storing unit into a predetermined recording media;

a unit for implementing a predetermined accounting process regarding the recording media into which the information has been recorded;

a third station, connected to the first station and the second station, respectively, including a latest information storing unit for storing the latest information, wherein, the first station and the second station update the plurality of information stored in the information storing unit in the second station based on the latest information stored in the latest information storing unit, as necessary, wherein the customer can purchase the recording media at the first station in such a manner that the recording media consisting of an arbitrary number of the information is produced at the second station, based on the designated information entered by the customer at the first station, and then the produced recording media is delivered to the first station.

It is preferable that the first station further includes a unit for storing specific information consisting of a part of the plurality of information stored in the information storing unit at the second station; and a unit for retrieving the specific information storing unit based on the designated information entered from the second entering unit by the customer and for displaying, to the customer, the specific information associated with the designated information entered.

The information storing unit is preferably a musical composition information storing unit, and the plurality of information stored therein are a plurality of musical composition information which includes information concerning a musical composition list, a musical composition data, an index and a copyright.

The musical composition information storing unit is preferably a database having an accumulable specification which unifies the music, and is constituted by digitizing and unifying a sound source, MIDI data, music score data, and right attribution data.

Further preferably, the musical composition information storing unit includes five categories of a music attribution, an original disc right, a copyright, a music score, and a sound source.

More preferably, the information storing unit is a video information storing unit, and the plurality of information are a plurality of video information which includes information regarding video data, sound data, an index, and a copyright.

It is preferable that the information storing unit is a program storing unit, and the plurality of information are a plurality of program information which includes information regarding a plurality of programs, an index, and a copyright.

Another object of the present invention can be achieved by a method of purchasing a personal recording media, with which a customer can purchase the recording media composed of an arbitrary number of desired information, comprising the steps of:

entering an identification information in order to identify a customer;

identifying whether or not the customer is an authorized customer based on the entered identification information;

entering at least one designated information by the customer when the customer is identified as an authorized customer in accordance with a result of the identifying;

reading information associated with the designated information by retrieving a database which includes a plurality of information based on the designated information entered;

storing the read information into a predetermined recording media; and implementing a predetermined accounting process regarding the recording media into which the information are recorded.

Preferably, the plurality of information are the musical composition information which include information concerning a musical composition list, musical composition data, an index and a copyright.

Further preferably, the plurality of information are a plurality of video information which includes information regarding video data, sound data, an index, and a copyright.

More preferably, the plurality of information are a plurality of program information which includes information regarding a plurality of software programs, an index, and a copyright.

Further object of the present invention can be achieved by a recording media having a program for purchasing a personal recording media, with which a customer can purchase the recording media composed of an arbitrary number of desired information, the program comprising the steps of:

entering an identification information in order to identify a customer;

identifying whether or not the customer is an authorized customer based on the entered identification information;

entering at least one designated information by the customer when the customer is identified as an authorized customer in accordance with a result of the identifying;

reading information associated with the designated information by retrieving a database which includes a plurality of information based on the designated information entered;

storing the read information into a predetermined recording media; and implementing a predetermined accounting process regarding the recording media into which the information are recorded.

Preferably, the plurality of information are the musical composition information which include information concerning a musical composition list, musical composition data, an index and a copyright.

Further preferably, the plurality of information are a plurality of video information which includes information regarding video data, sound data, an index, and a copyright.

More preferably, the plurality of information are a plurality of program information which include information regarding a plurality of software programs, an index, and a copyright.

The video data is preferably motion picture data.

The video data is television program data, preferably.

Preferably, the video data is a commercial program data.

The plurality of information are preferably a plurality of image information which include information regarding a graphic data, a sound data, an index, and a copyright.

More preferably, the video information storing unit is a Digital Versatile Disc (DVD).

Preferably the video information storing unit is a video cassette tape (VCT).

The system for purchasing a personal recording media according to the present invention is capable of arbitrarily selecting or designating the customer's favorite musicians or artists, arbitrarily selecting or designating the musical compositions by the selected musicians or artists, and purchasing a personally original compilation recording media composed of the selected or designated musical compositions.

Furthermore, the system for purchasing a personal recording media according to the present invention is capable of automatically collecting the royalty for the copyrights and the like regarding the musical compositions incorporated into the recording media at a time when a customer purchases a personally original compilation recording media, and is also capable of implementing the return and the like concerning the use of the musical compositions for the copyright holders and the like.

The above mentioned features of the system according to the present invention could be also equally applicable to the method and the media according to the present invention as well.

BRIEF DESCRIPTION OF THE DRAWINGS

FIG. 8 is an illustrative diagram of another portion of the operation of the system for purchasing a personal recording media according to the present invention shown in FIG. 1;

FIG. 12 is a diagram showing one example of the index database which composes one portion of the music database of the system for purchasing a personal recording media shown in FIG. 11;

FIG. 13 is a diagram showing another example of the index database which composes one portion of the music database of the system for purchasing a personal recording media shown in FIG. 11;

FIG. 23 is an illustrative diagram of another portion of the operation of the system for purchasing a personal recording media according to the present invention shown in FIG. 14;

DESCRIPTION OF THE PREFERRED EMBODIMENTS

In the following, referring to the accompanying drawings, the preferred embodiments of the system for purchasing a personal recording media according to the present invention will be described in detail.

Figure 1:
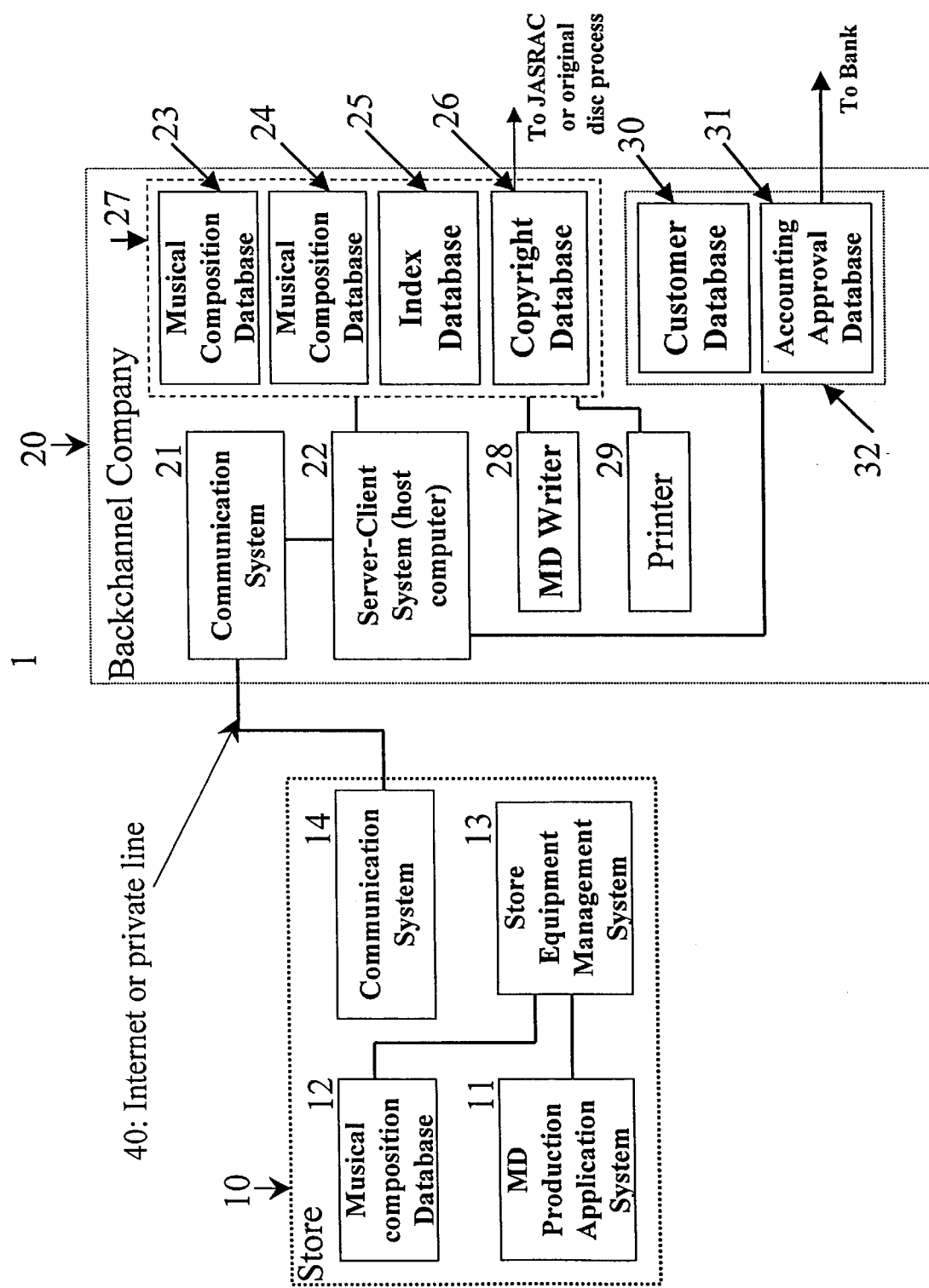
FIG. 1 is a schematic diagram showing a first embodiment of the system for purchasing a personal recording media according to the present invention.
Figure 2:
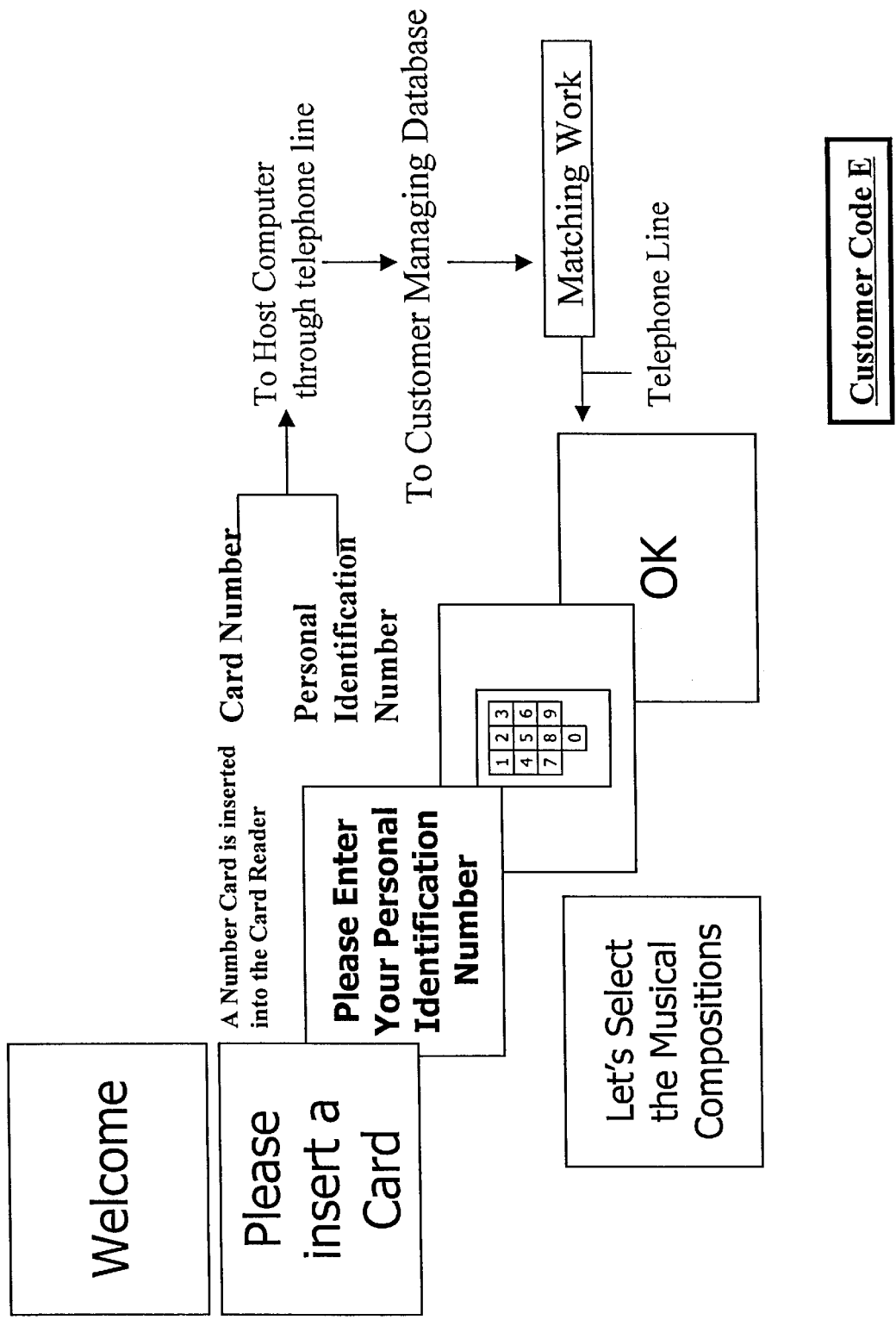
FIG. 2 is an illustrative diagram of one portion of the operation of the system for purchasing a personal recording media according to the present invention shown in FIG. 1.
Figure 3:
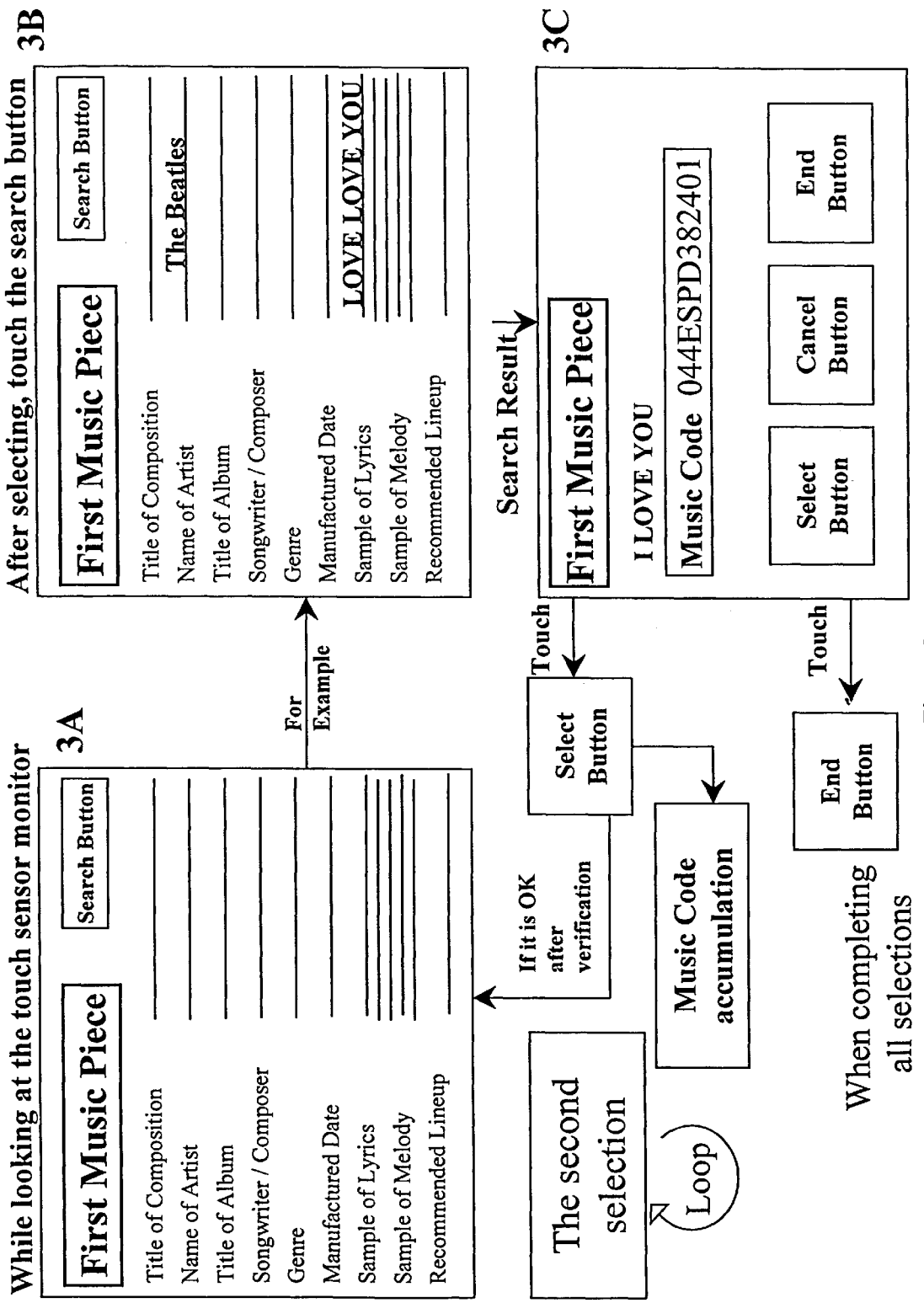
FIG. 3 is an illustrative diagram of another portion of the operation of the system for purchasing a personal recording media according to the present invention shown in FIG. 1.

FIG. 1 is a schematic diagram showing a first embodiment of the system for purchasing a personal recording media (hereinafter referred to as "a purchasing system") according to the present invention.

As shown in FIG. 1, the main parts of the purchasing system in this embodiment are composed of a store 10, that is a KIOSK such as a convenience store or a gasoline station and the like which will be easily accessed by a customer, and a backchannel company 20. Store 10 is connected with backchannel company 20 using an internet or a private line (leased line) 40.

The store 10 includes a MD production application accepting system 11 (hereinafter referred to as the "AAS") which is composed of a monitor, a cardreader, and a database retrieval/application terminal (not shown), a musical composition database 12 connected to the AAS 11, a store equipment managing system 13 connected to both the AAS 11 and the musical composition database 12, and a communication system 14 connected to the store equipment managing system 13.

The backchannel company 20 includes a communication system 21 connected to the communication system 14 of the store 10 via a telephone or an internet line 40 and the like; a server-client system (hereinafter referred to as the "host-computer") 22 connected to the communication system 21; a music database 27 connected to the host-computer 22 and including a musical composition list database 23, a musical composition data database 24, an index database 25 as well as a copy right database 26; a MD writer 28 connected to the music database 27; a printer 29 connected to the music database 27; and a company side database 32 connected to the host-computer 22 and including a customer database 30 as well as an accounting approval database 31.

In the following, by referring to FIGS. 2 to 9, an operation of the purchasing system shown in FIG. 1 will be described.
1-1. Membership Recognition Step At first, a switch of the purchasing system is turned on by touching a "START" entry display on a screen of a touch-sensor type monitor (hereinafter referred to as the "monitor") in the AAS 11. A word "WELCOME" is displayed on the monitor screen, and then words "PLEASE INSERT A CARD" are displayed on the screen.

When the customer is a registered member of the purchasing system, he/she should insert his/her member card into the cardreader of the AAS 11. Further, when the customer is a non-registered member, he/she should apply for a membership registration at the store and purchase a new member card, and then insert the purchased member card into the cardreader. Herein, the purchasing system can be constituted as having a new membership card manufacturing function such that a new member card can be automatically manufactured based on anything which can verify the customer's identification, such as the customer's driver's license or bank card.

After the cardreader has read the member card, the words "PLEASE ENTER YOUR PERSONAL IDENTIFICATION NUMBER" are displayed on the monitor. According to the display thereof, the customer will enter a personal identification number (hereinafter referred to as the "PIN") unique for each member. The entry of the PIN can be implemented by touching the alphanumeric characters displayed on the monitor screen. The information of the entered PIN and the information of the member registration number of the member card, which has been read in advance by the cardreader, are transmitted from the communication system 14 via the telephone line 40 to the host-computer 22 through the communication system 21 of the backchannel company 20.

In the backchannel company 20, the host-computer 22 searches the customer managing database 30 of the company side database 32 based on the information of the PIN and the member registration number transmitted from the store 10, and matches whether or not the customer is a valid member, and then transmits the information concerning the result of that match from the communication system 21 via the telephone line 40 to the AAS 11 through the communication system 14 of the store 10. Further, the host-computer 22 will produce a customer code E when the customer is a valid member.

The AAS 11 in the store 10 displays the words "OK" on the monitor screen's display when the customer is a valid member, based on the received information concerning the result of the match. On the other hand, when the customer is an invalid member, then the AAS 11 displays the words "INVALID" on the monitor screen's display. In case the wrong PIN was entered during the above mentioned operation, it could be constituted such that the PIN can be re-entered by displaying the words "INVALID" on the screen, and then displaying the words "PLEASE ENTER YOUR PERSONAL IDENTIFICATION NUMBER AGAIN WITH GREAT CARE" on the screen.

In this case, in view of security, it could be set such that a limit would be imposed on the number of times that a PIN can be re-entered. And if the match cannot be made within the defined number of times for the re-entry, the purchasing system is automatically turned off.

When the word "OK" is displayed on the monitor screen in the above mentioned step, the monitor displays the words "LET'S SELECT THE MUSICAL COMPOSITIONS" on the screen, and then the operation will proceed to the musical composition selection step.
1-2. Musical Composition Selection Step As shown in FIG. 3A, the musical composition selection items for "the first music piece" are displayed on the monitor screen. In these musical composition selection items, the items of (a) the title of a musical composition, (b) the name of an artist, (c) the title of an album, (d) the names of the songwriter/composer, (e) the category, (f) the manufactured date, (g) a portion of the words, (h) a portion of the melody (tune), and (i) the recommended lineup are displayed, respectively.

The customer enters the necessary information by looking at the musical composition selection items displayed on the monitor screen, in order to select the first music piece. There are various methods of entering this information. For example, the necessary information can be entered by using the keyboard or can be directly written on the screen by using a touch pen.

The AAS 11 will obtain the necessary information by searching the musical composition list database 12 in the store 10 based on the information entered on the monitor screen.

As an example, FIG. 3B shows the monitor screen when the customer has entered (b) the name of an artist, (g) a portion of the words, and (h) a portion of the melody, respectively.

Herein, it could be constituted such that a voice recognition method can be adopted for the entry of (h) a portion of the melody, and making a recognition of the melody that the customer is singing using that recognition method, and it could be constituted such that the recognized melody is further converted to the score corresponding thereto, and then the converted score is displayed on the screen of the monitor.

After these entries have been completed, the search is implemented by pushing the "search button" which is displayed on the monitor screen, and then the search result as shown in FIG. 3C is displayed on the monitor screen. That is, as a result of the search, the title of the first music piece, "I LOVE YOU" in this example, as well as its music code "044ESPD382401" are displayed on the monitor screen, and the selection items "SELECTION BUTTON", "CANCEL BUTTON", "END BUTTON" are also displayed on the monitor screen at the same time.

The customer verifies the first music piece displayed on the monitor screen, and then touches the "SELECTION BUTTON" if the entered information is confirmed. When the "SELECTION BUTTON" is touched, the music code is accumulated into a harddisc of the AAS 11, as well as the musical composition selection items for the second music piece are displayed on the monitor screen. The musical composition selection for the second music piece is implemented according to the same procedure. The music codes for the desired musical compositions are accumulated sequentially by repeating the procedure until the desired number of music pieces is reached.

When all the music piece selections have been completed, the musical composition selection is completed by touching the "END BUTTON" selection item after the validation result of the last music piece has been displayed on the monitor screen.

1-3. Musical Composition Editing Step

Figure 4:
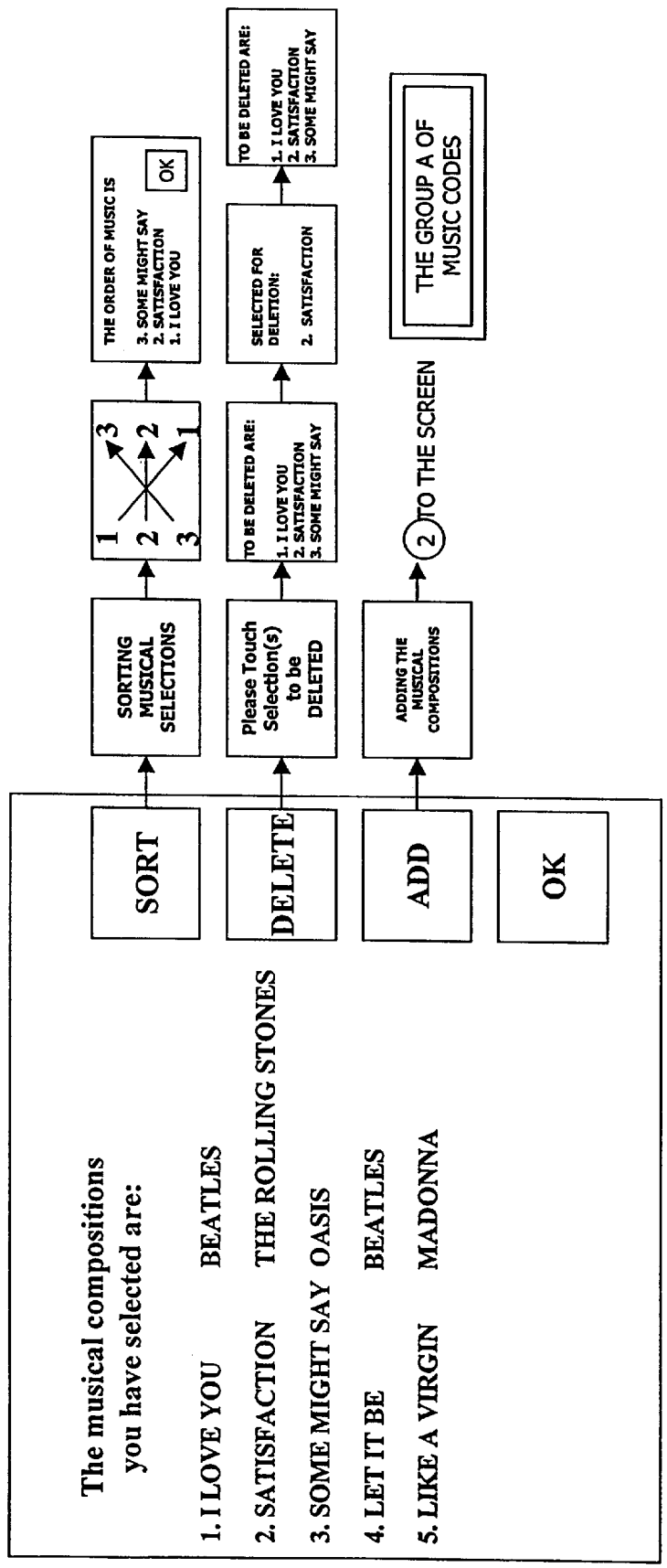
FIG. 4 is an illustrative diagram of another portion of the operation of the system for purchasing a personal recording media according to the present invention shown in FIG. 1.

By touching "END BUTTON" in the above mentioned step, as shown in FIG. 4, after having displayed the words "THE MUSICAL COMPOSITIONS YOU HAVE SELECTED ARE:", the musical compositions selected in the above mentioned musical composition selection step are displayed on the screen.

In this example, the selected musical compositions are displayed on the monitor screen as:

| | |
|---|---|
| 1. I LOVE YOU | BEATLES |
| 2. SATISFACTION | THE ROLLING STONES |
| 3. SOME MIGHT SAY | OASIS |
| 4. LET IT BE | BEATLES |
| 5. LIKE A VIRGIN | MADONNA | and the selection items "SORT", "DELETE", "ADD" and "OK" are displayed on the monitor screen at the same time.

1-3.1. Sorting of Musical Compositions

In the following, the sorting procedures of the orders for the selected musical compositions will be described.

By touching the item "SORT" on the monitor screen, as shown below, on the monitor screen, brackets are displayed on the right side of each of the musical compositions, respectively:

| | | |
|---|---|---|
| 1. I LOVE YOU | BEATLES | [ ] |
| 2. SATISFACTION | THE ROLLING STONES | [ ] |
| 3. SOME MIGHT SAY | OASIS | [ ] |
| 4. LET IT BE | BEATLES | [ ] |
| 5. LIKE A VIRGIN | MADONNA | [ ] |

In this example, because the first and the third musical compositions are to be sorted, the order of the musical compositions are changed to the order of 3. 2. 1. 4. 5. by entering the numbers 3, 2, 1, 4, 5 into the blank squares from the top to the bottom in order. Of course, it could be constituted such that the order of the musical compositions can be sorted by using other commonly known methods such as one utilizing a cursor.

On the monitor screen, the item "OK" is displayed at the same time, and, by touching "OK" when the desired sorting has been completed, the monitor screen returns to the display of "THE MUSICAL COMPOSITIONS YOU HAVE SELECTED ARE:", and the sort changed musical compositions, such as shown in below, are displayed:

| | |
|---|---|
| 3. SOME MIGHT SAY | OASIS |
| 2. SATISFACTION | THE ROLLING STONES |
| 1. I LOVE YOU | BEATLES |
| 4. LET IT BE | BEATLES |
| 5. LIKE A VIRGIN | MADONNA |

Then, by touching the item "OK" on the screen, the display of "THE MUSICAL COMPOSITIONS YOU HAVE SELECTED ARE:" is so displayed as to be renumbered such as;

| | |
|---|---|
| 1. SOME MIGHT SAY | OASIS |
| 2. SATISFACTION | THE ROLLING STONES |
| 3. I LOVE YOU | BEATLES |
| 4. LET IT BE | BEATLES |
| 5. LIKE A VIRGIN | MADONNA |

1-3.2. Deletion of Musical Compositions

Deletion of selected musical compositions can be implemented by touching the item "DELETE" on the monitor screen. By touching the item "DELETE", the character display "PLEASE TOUCH THE MUSICAL COMPOSITION(S) TO BE DELETED" is made, and further the list of the selected musical compositions:

| | |
|---|---|
| 1. SOME MIGHT SAY | OASIS |
| 2. SATISFACTION | THE ROLLING STONES |
| 3. I LOVE YOU | BEATLES |
| 4. LET IT BE | BEATLES |
| 5. LIKE A VIRGIN | MADONNA | is displayed on the monitor screen, as well as the selection item "OK" is also displayed at the same time.

Herein, when deleting "2. SATISFACTION THE ROLLING STONES" in the musical composition list, the part of the musical composition "2. SATISFACTION THE ROLLING STONES" is removed from the list by touching the corresponding musical composition display portion on the monitor screen, and only that portion is displayed on the new page in the screen of the monitor with the selection item "OK" as:

| | |
|---|---|
| WILL BE DELETED | |
| 2. SATISFACTION | THE ROLLING STONES |

Herein, by touching the item "OK", the monitor screen displays again as shown below by renumbering the musical compositions except the deleted musical composition:

| | |
|---|---|
| 1. SOME MIGHT SAY | OASIS |
| 2. I LOVE YOU | BEATLES |
| 3. LET IT BE | BEATLES |
| 4. LIKE A VIRGIN | MADONNA |

1-3.3. Addition of Musical Compositions

When newly adding a musical composition, the monitor screen displays the words "THE MUSICAL COMPOSITION WILL BE ADDED" by touching the selection item "ADD", and returns to the screen of "The Musical Composition Selection Step" as described above. Then, as described above, a new musical composition can be added by operating a necessary procedure while watching the monitor screen.

"THE GROUP A OF THE MUSIC CODES" corresponding to the edited musical compositions are created by touching the item "END BUTTON" on the screen after having implemented the necessary operations in the above mentioned musical composition editing step. Also, as described below, the monitor screen will shift to the next step by touching the item "END BUTTON".

1-4. Design Step

In this step, the jacket design selection and the album title entry of the MD are implemented.

1-4.1. Jacket Design Selection

Figure 5:
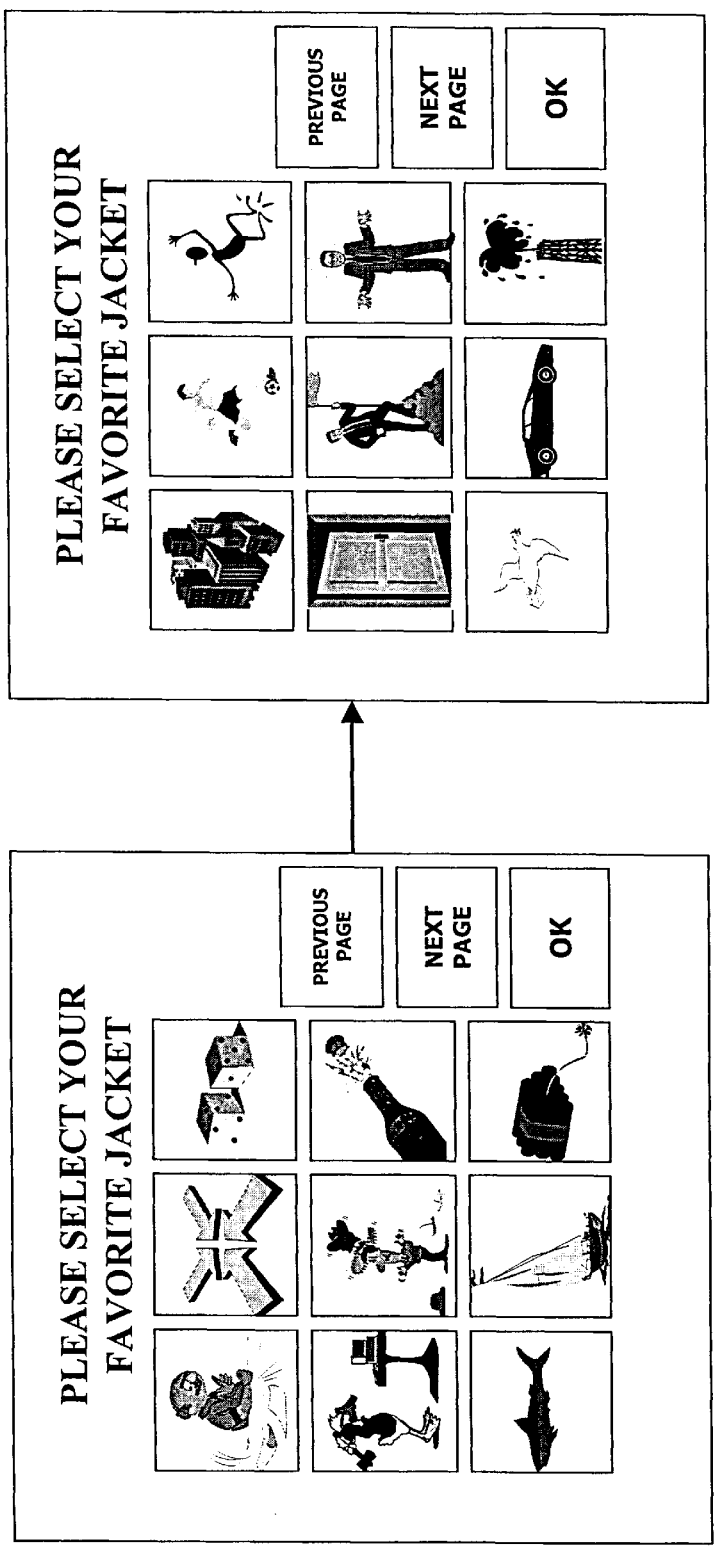
FIG. 5 is an illustrative diagram of another portion of the operation of the system for purchasing a personal recording media according to the present invention shown in FIG. 1.

With a completion of the musical composition editing step as described in the above step 3, in this example, nine kinds of jacket design are displayed on one screen (i.e., one page) of the monitor, as shown in FIG. 5, along with the character display of "PLEASE SELECT THE FAVORITE JACKET". Jacket designs on other monitor screen pages can be displayed on the monitor screen in such a manner that the jacket designs displayed on the previous page and the next page can be displayed on the monitor screen by touching the entry displays of "PREVIOUS PAGE" and "NEXT PAGE" on the monitor screen, respectively. Of course, the number of kinds of the jacket designs incorporated in one screen (i.e., one page) may be set arbitrarily.

In this example, the design placed on the center of the left side column shown in FIG. 5 is selected by touching the monitor screen, and then the "JACKET DESIGN CODE B" corresponding to the selected jacket design is created by touching the entry display "OK".

1-4.2. Album Title Entry

Figure 6:
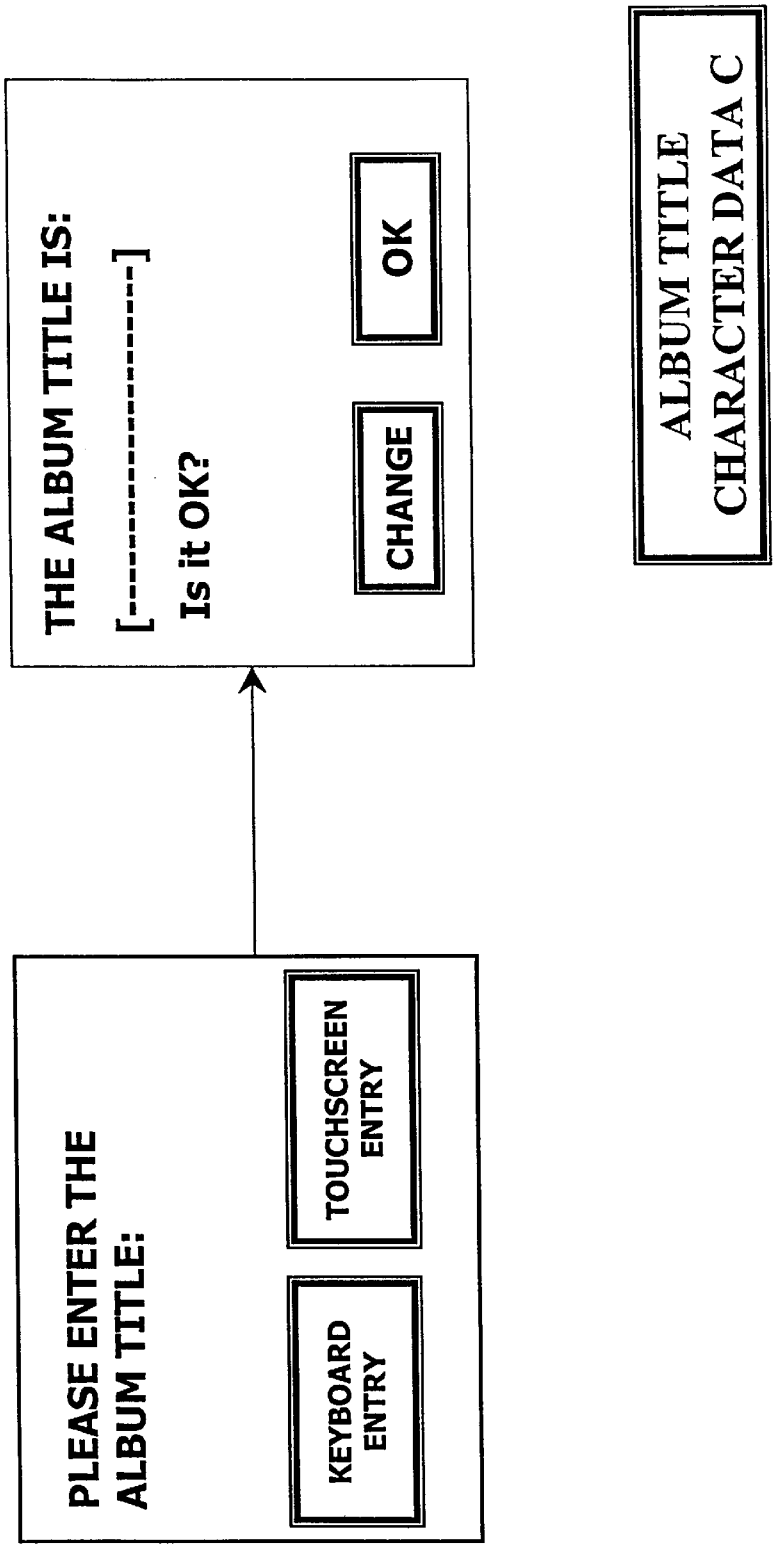
FIG. 6 is an illustrative diagram of another portion of the operation of the system for purchasing a personal recording media according to the present invention shown in FIG. 1.

After the jacket design selection is completed, the character display of "PLEASE ENTER THE ALBUM TITLE" as well as the items "KEYBOARD ENTRY", "TOUCHSENSOR ENTRY" are displayed on the monitor screen, as shown in FIG. 6. The customer enters the album title on which he/she has decided, through the keyboard or the touchsensor, after having touched either one of the items "KEYBOARD ENTRY" or "TOUCHSENSOR ENTRY". The monitor screen sequentially displays the characters of the title of the album to be entered such as "THE ALBUM TITLE IS "SHOUTA & MAYU". IS IT OK?". The items "CHANGE" and "OK" are displayed simultaneously when either one of the items "KEYBOARD ENTRY" or "TOUCHSENSOR ENTRY" is touched.

The customer implements an entry again with the procedures described above, by touching the item "CHANGE", if he/she desires to change the entered album title, while watching the monitor screen. Further, if the entered album title is all right as it is, then the "ALBUM TITLE CHARACTER DATA C" corresponding to the album title being displayed is created by touching the item "OK".

1-5. Final Verification Step

Figure 7:
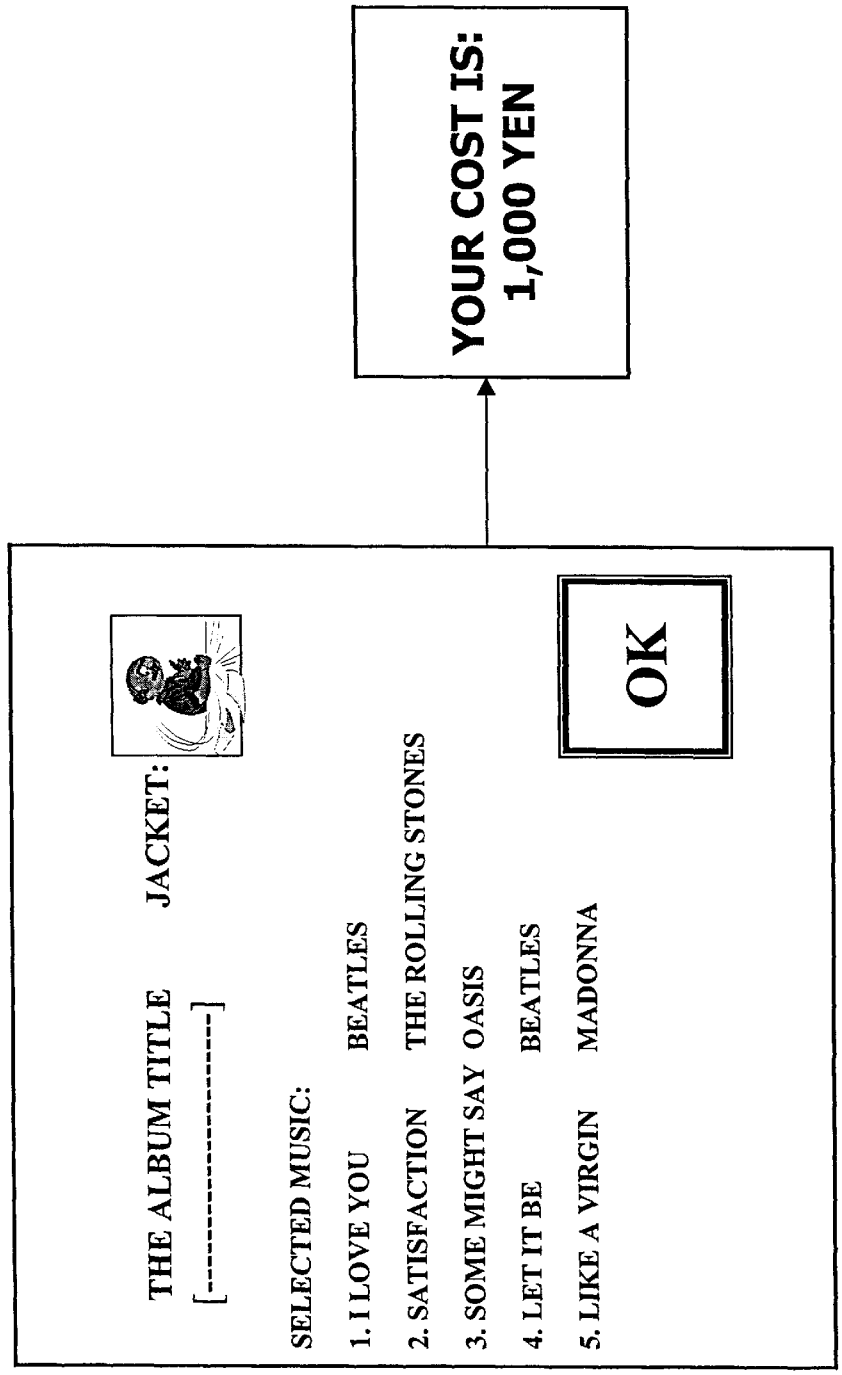
FIG. 7 is an illustrative diagram of another portion of the operation of the system for purchasing a personal recording media according to the present invention shown in FIG. 1.

After the above mentioned design step is completed, the verification items are displayed on the monitor screen, respectively, as shown in FIG. 7. That is, the contents of the respective items "ALBUM TITLE", "JACKET" and "SELECTED MUSIC" are displayed again for final verification. By touching the item "OK" after having completed this final verification, an indication of the cost for the MD which is intended to be produced, for example, as "YOUR COST IS 1,000 YEN", is displayed on the monitor screen.

1-6. Payment Step

Following the above mentioned final verification step, as shown now in FIG. 8, the items "CREDIT CARD", "PREPAID CARD", and "BANK WITHDRAWAL" are displayed on the monitor screen, along with the character display of "WHAT IS YOUR PAYMENT METHOD?". When the customer has selected the payment method by touching any one of the items on the monitor screen, the character display "PLEASE INSERT THE CARD" is implemented, and then the customer will insert the card corresponding to the selected payment method into the cardreader. When the card read by the cardreader is confirmed, then the "CARD DATA D" will be produced.

1-7. Transmission Step

After the above mentioned payment step is completed, the "MUSIC CODE GROUP A", "JACKET DESIGN CODE B", "ALBUM TITLE CHARACTER DATA C", "CARD DATA D" and "CUSTOMER CODE E", which have been produced as described above, are transmitted to the host-computer 22 which is provided in the backchannel company 20, through the communication system 14, the telephone line 40 and the communication system 21, as shown in FIG. 1.

Figure 9:
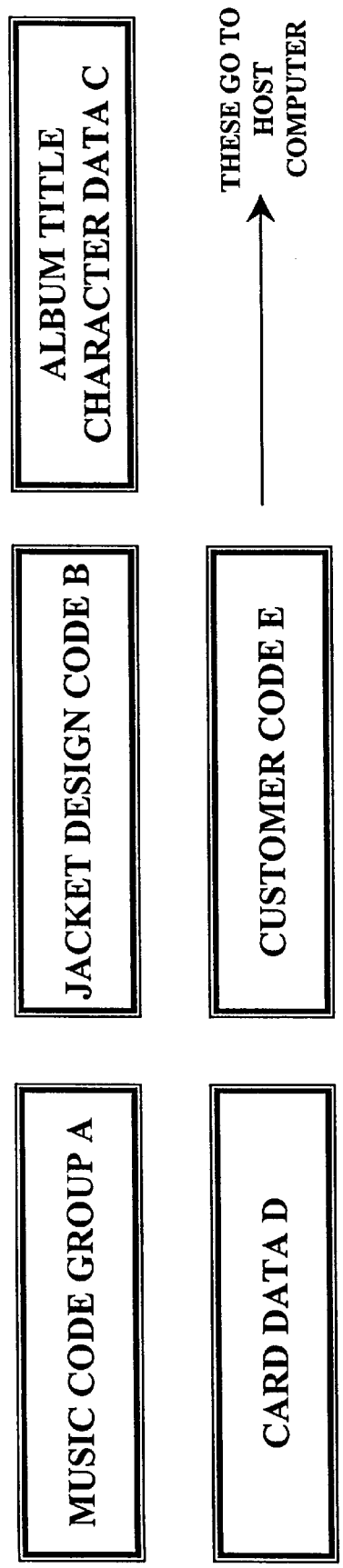
FIG. 9 is an illustrative diagram of another portion of the operation of the system for purchasing a personal recording media according to the present invention shown in FIG. 1.
Figure 10:
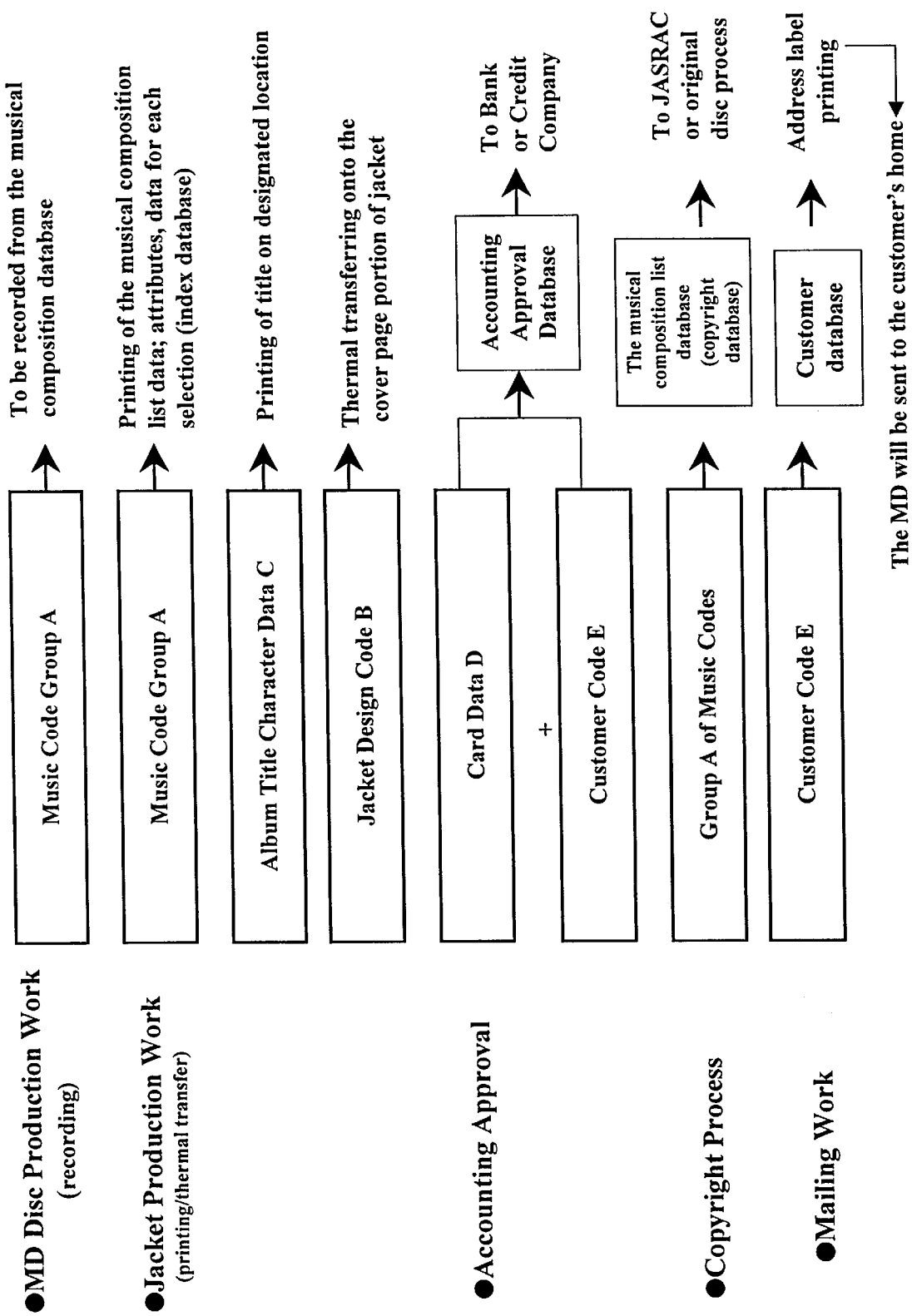
FIG. 10 is an illustrative diagram of another portion of the operation of the system for purchasing a personal recording media according to the present invention shown in FIG. 1.

1-8. Backchannel Company's Work Step (FIGS. 9 and 10)

1-8.1. MD Disc Production Work

After all the above mentioned steps are completed, the production step of the MD is begun. In the present embodiment, the MD disc production work, i.e., the recording, is implemented in the backchannel company 20.

The input information required for the MD production is "MUSIC CODE GROUP A" as mentioned above. Based on MUSIC CODE GROUP A, the musical composition database 24 in the music database 27 is searched, the musical compositions corresponding to the information of the MUSIC CODE GROUP A are selected from the musical composition database 24, and then the selected musical compositions are high-speed recorded into the MD by the MD writer 28.

1-8.2. Jacket Production Work

Further, within the backchannel company 20, based on the "MUSIC CODE GROUP A", "JACKET DESIGN CODE B" and "ALBUM TITLE CHARACTER DATA C", the jacket production work (i.e., printing/thermal transfer) is implemented by the printer 29. Herein, at first, based on the "MUSIC CODE GROUP A", the musical composition list database 23 in the music database 27 is searched, and the attribute of each music is selected from the musical composition list database 23 and the index database 25, and then that information is printed on the predetermined locations of the jacket. Next, based on the "ALBUM TITLE CHARACTER DATA C", the title being input is printed on the title location of the jacket. Then, based on the "JACKET DESIGN CODE B", the selected jacket design is thermally transferred to the front cover of the jacket.

1-8.3. Accounting Approval

The host-computer 22 retrieves the accounting approval database 31 in the database 32 on the company side, based on the information of "CARD DATA D" and "CUSTOMER CODE E", and the necessary information is sent from the accounting approval database 31 to the predetermined financial institution such as a credit company and the like, and then the accounting approval of the customer is carried out.

1-8.4. Copyright Process

The host-computer 22 retrieves the musical composition list database 23 and the copyright database 26 in the music database 27, based on the information of "MUSIC CODE GROUP A". The copyright process is carried out by sending the necessary information from the copyright database 26 of the music database 27 to the JASRAC, and the original disc process is carried out by sending the necessary information from the copyright database 26 of the music database 27 to the recording company and the like.

1-8.5. Mailing Work

The host-computer 22 retrieves the customer database 30 in the database 32 of the company side based on the information of "CUSTOMER CODE E", prints the address label of the customer from the information of the customer's address and the like, and mails the MD to the customer after having completed the predetermined packaging. As a result, the customer could receive the ordered MD.

1-9. Musical Composition Database Update Step

It is very important for the customer to obtain information of new musical compositions (the musical composition list, the musical composition data, the index data, and the like). This information is always updated in the backchannel company 20, and new versions of the musical composition list, musical composition data and index information are stored in the musical composition list database 23, the musical composition data database 24 and the index database 25 of the music database 27, respectively. However, in this embodiment, among this information, only the musical composition list is sent to the communication system 14 in the store 10 through the host-computer 22 and the communication system 21, and then is stored in the musical composition database 12 in the store 10 through the store equipment managing system 13.

In the following, the music database used for the personal musical composition recording media purchasing system according to the present invention, as described above, will be illustrated in detail.

A specification of the music database according to the present invention, which will be described below, is revealed for the first time in the art. The specification includes an accumulable database specification in which music is unified, and the music database is constituted in such a manner that the sound source, the MIDI data, the music score data, and the right attribution data are digitized and then unified. Then, the music database is designed in such a manner that the music is unification-coded and is also enabled to cope with the future market of the music.

Figure 11:
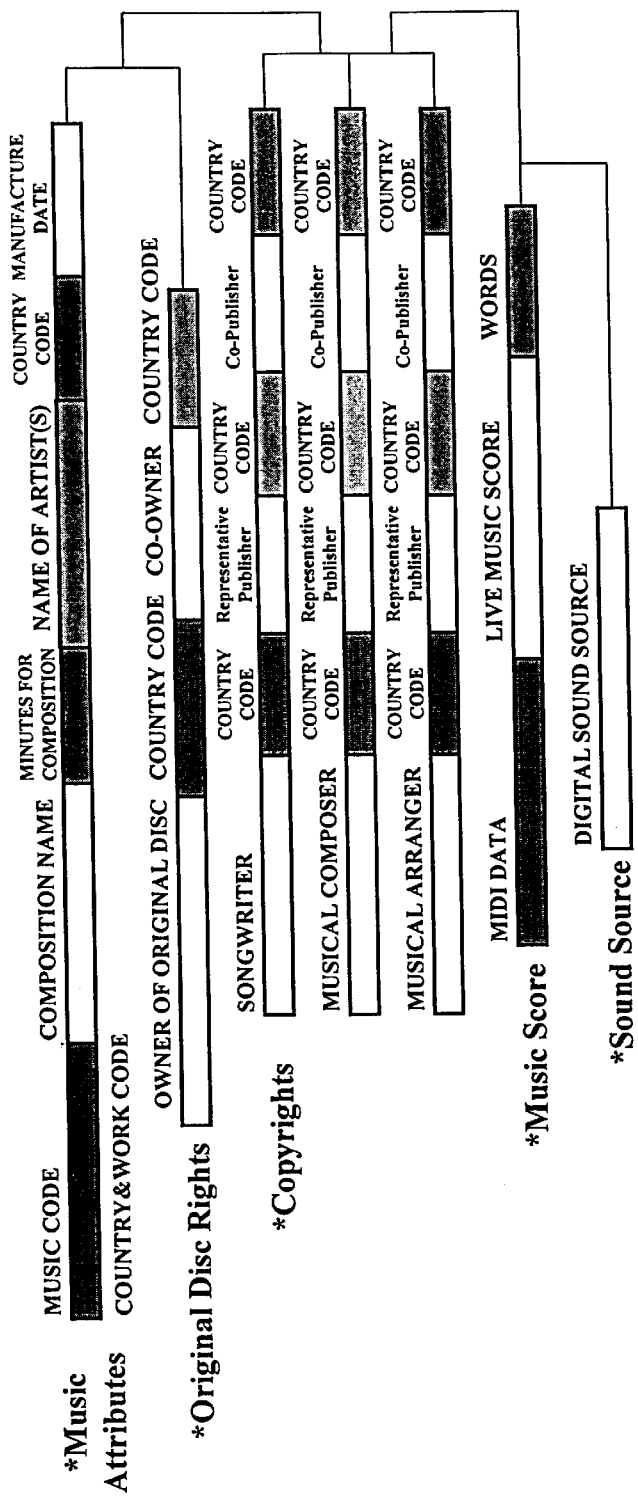
FIG. 11 is a diagram showing one example of the specification of the music database which is one of the main components of the system for purchasing a personal recording media according to the present invention.

FIG. 11 shows one embodiment of the music database which is constituted as described above. This music database includes five categories of (1) the music attribution, (2) the original disc right, (3) the copyright, (4) the music score, and (5) the sound source. Then, each category further includes the information regarding the items described below:

(1) Music Attribution
   (1)-1 music code (country code+work code)
   (1)-2 name of musical composition
   (1)-3 minutes for musical composition
   (1)-4 name of artist(s)
   (1)-5 country code of artist(s)
   (1)-6 manufactured date
(2) original Disc Right
   (2)-1 owner of original disc
   (2)-2 country code
   (2)-3 co-owner
   (2)-4 country code
(3) Copyright
   (3)-1-1 songwriter
   (3)-1-2 country code
   (3)-1-3 representative publisher
   (3)-1-4 country code
   (3)-1-5 co-publisher
   (3)-1-6 country code
   (3)-2-1 musical composer
   (3)-2-2 country code
   (3)-2-3 representative publisher
   (3)-2-4 country code
   (3)-2-5 co-publisher
   (3)-2-6 country code
   (3)-3-1 musical arranger
   (3)-3-2 country code
   (3)-3-3 representative publisher
   (3)-3-4 country code
   (3)-3-5 co-publisher
   (3)-3-6 country code
(4) Music Score
   (4)-1 MIDI data
   (4)-2 live music score
   (4)-3 words
(5) Sound Source
   (5)-1 digital sound source FIGS. 12 and 13 respectively show examples of the index information stored in the index database constituting the music database used for the personal musical composition recording media purchasing system according to the present invention. As can be seen from these examples, the index information is the information indicating a part of the information in the music database described above per musical composition, and the index database is the database in which this index information are stored.

The information of the index A shown in FIG. 12 include each of the information listed below:

(1) Genre; Japanese Music
(2) Title of Musical Composition; AKAI SWEETPEE
(3) Minutes of Musical Composition; 5 minutes 21 seconds
(4) Artist; SEIKO MATSUDA
(5) Songwriter; Karuho Kureta
(6) Musical Composer; Karuho Kureta
(7) Manufacture Date; 1982. 7. 1
(8) Representative Country of Original Disc; Japan
(9) Representative Company of Original Disc; Sony Music (Japan)
(10) Option I; (words card)
(11) Option II; (Music Score)

The information of the index B shown in FIG. 13 include each of the information listed below:

(1) Genre; Western Music
(2) Title of Musical Composition; YESTERDAY
(3) Minutes of Musical Composition; 4 minutes 50 seconds
(4) Artist; Beatles
(5) Songwriter; John Lennon
(6) Musical Composer; Paul McCartney
(7) Manufacture Date; 1968. 7. 1
(8) Representative Country of Original Disc; England (9) Representative Company
of Original Disc; APPLE RECORDS
(10) Option I; (words card)
(11) Option II; (Music Score)

The music database which will be described in the following embodiments also has a similar structure as described above, and the purchasing system of the present invention, by adopting this music database, for the customers, a selection of the musical compositions could be made in a global manner, as well as for the copyrighters, the management of the copyrights associated with the musical compositions could be carried out easily.

Figure 14:
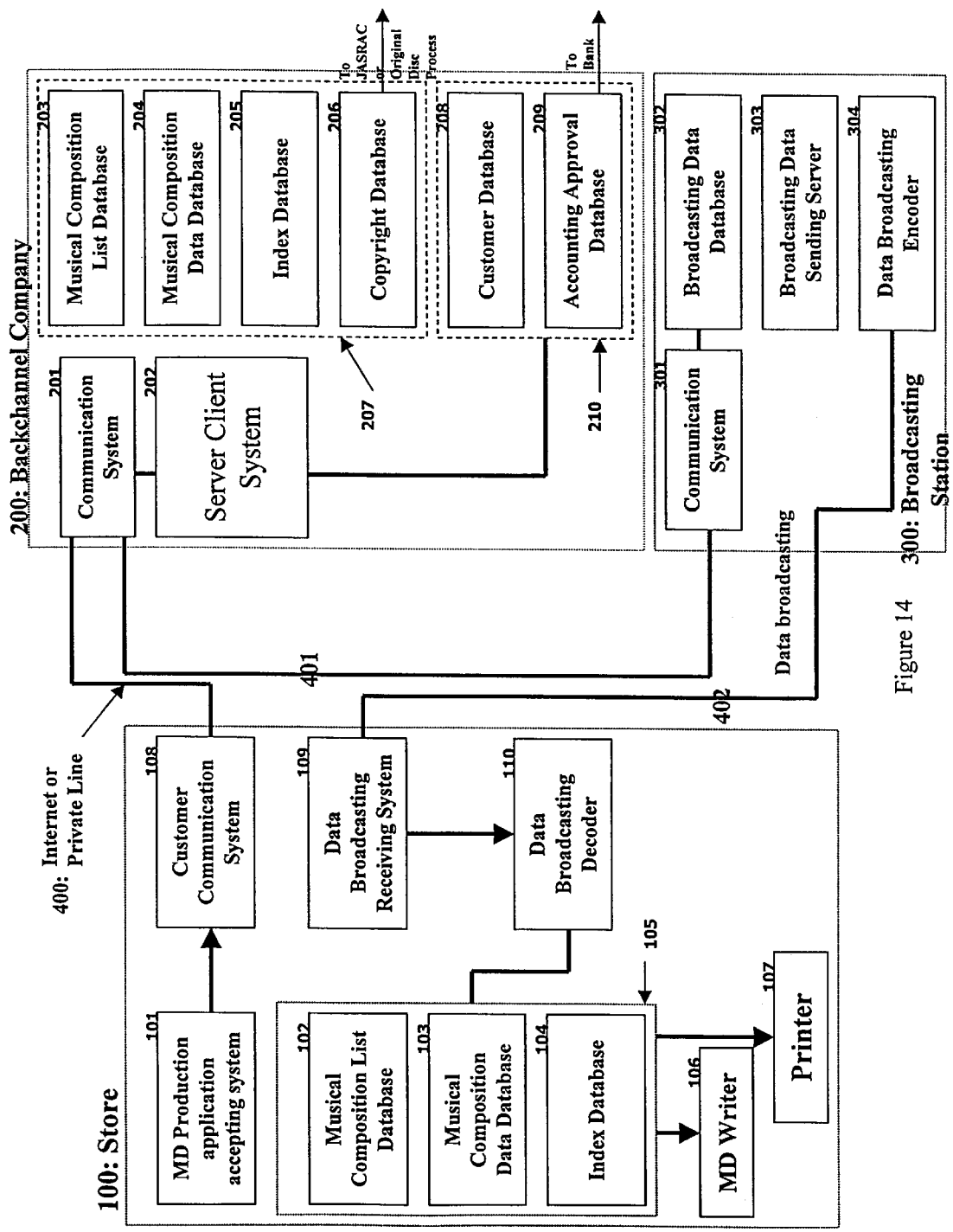
FIG. 14 is a schematic diagram showing a second embodiment of the system for purchasing a personal recording media according to the present invention.
Figure 15:
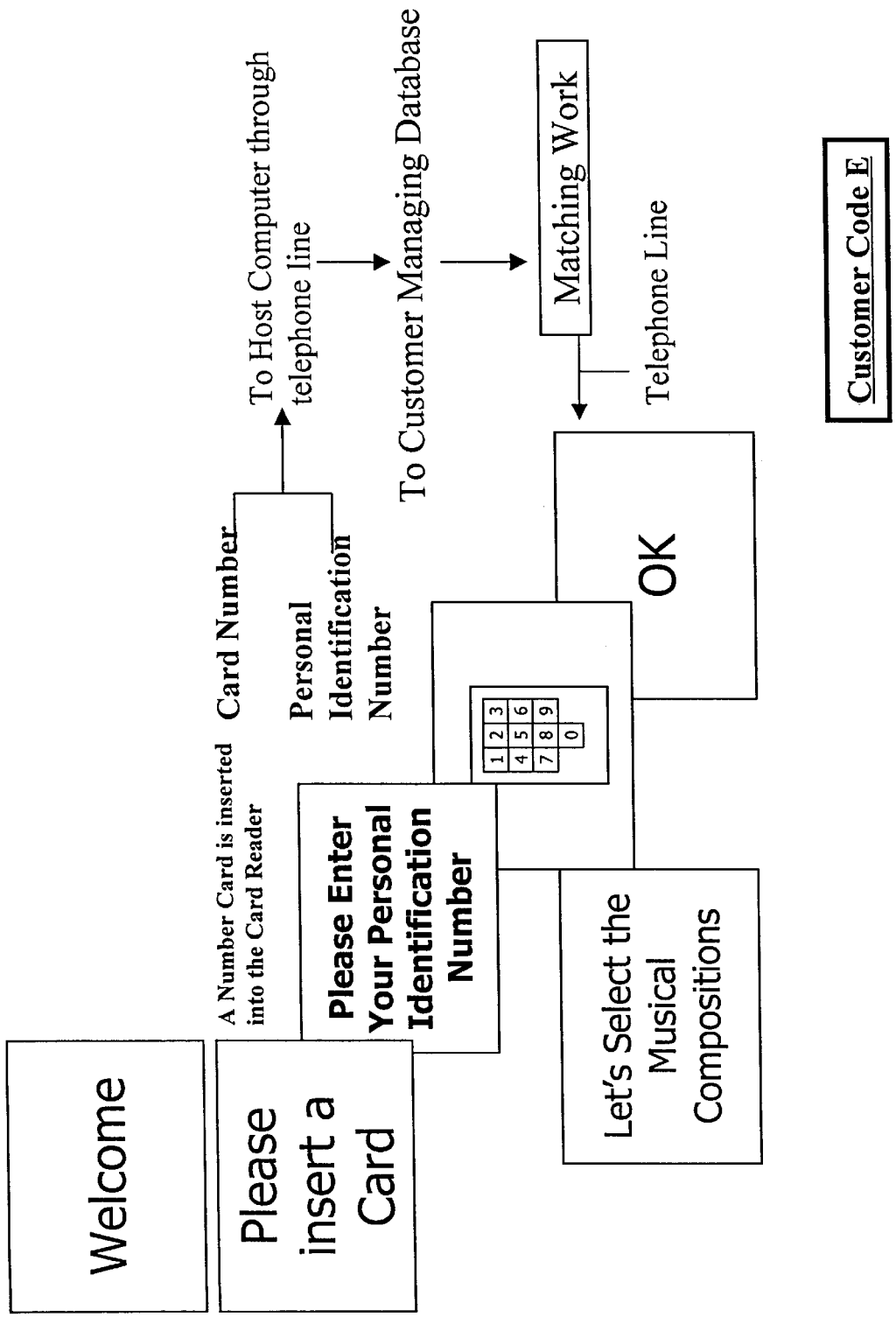
FIG. 15 is an illustrative diagram of one portion of the operation of the system for purchasing a personal recording media according to the present invention shown in FIG. 14.
Figure 16:
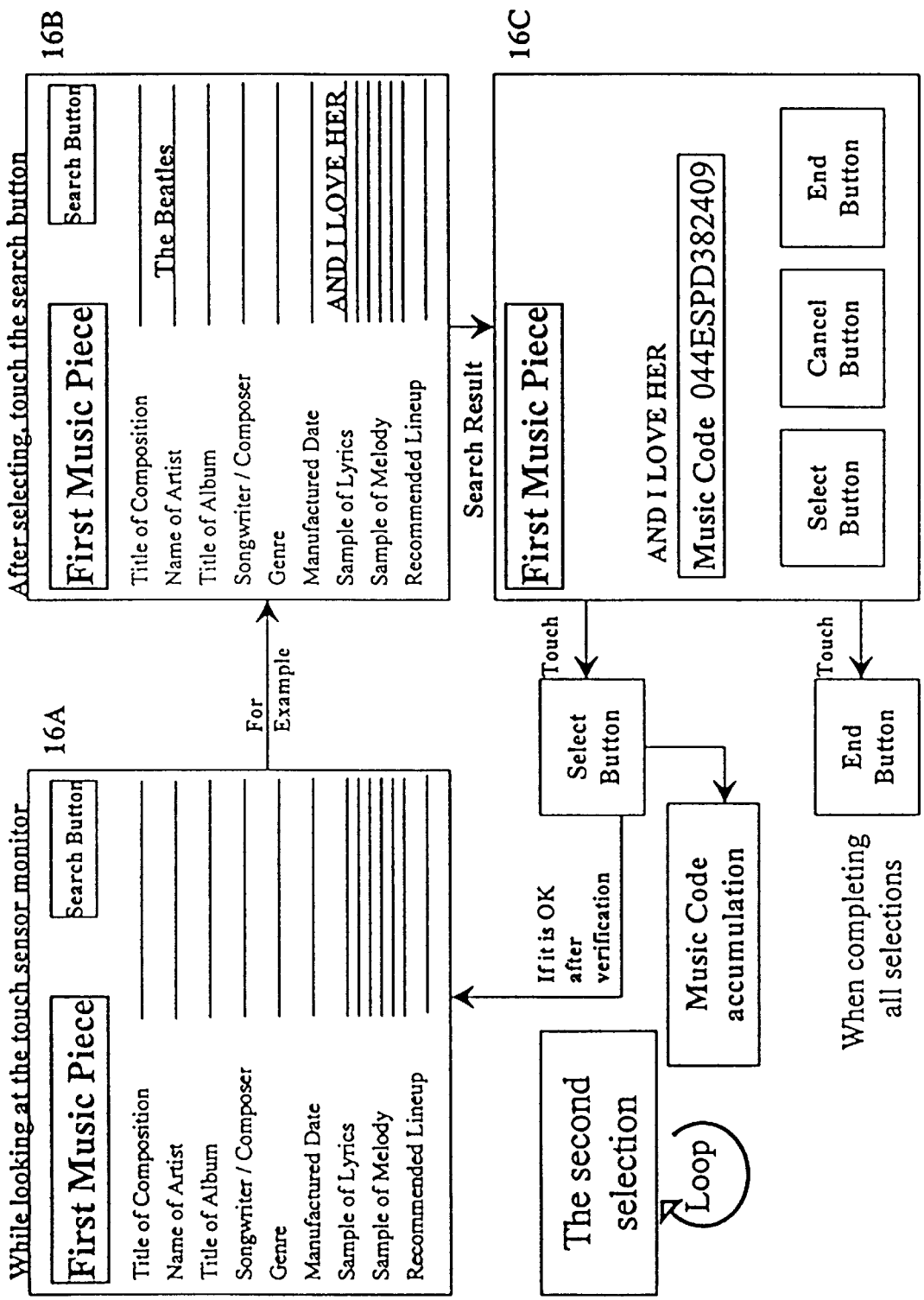
FIG. 16 is an illustrative diagram of another portion of the operation of the system for purchasing a personal recording media according to the present invention shown in FIG. 14.

FIG. 14 is a schematic diagram showing the second embodiment of the system for purchasing a personal recording media (as before, it is referred to as "a purchasing system") according to the present invention.

As shown in FIG. 14, the main parts of the purchasing system in this embodiment are composed of a store 100, a backchannel company 200, and a broadcasting station 300. The store 100 is connected with the backchannel company 200 using a private line (instead, an internet or a telephone line could be used) 400. Further, the store 100 and the broadcasting station 300, as well as the backchannel company 200 and the broadcasting station 300 are respectively communicated with each other through the satellite waves (instead, ground waves or cable could be used) 401, 402, respectively.

Similar to the first embodiment, the store 100 is the KIOSK and includes a MD production application accepting system 101 (as before, referred to as the "AAS") which is composed of a monitor, a cardreader, and a database retrieval/application terminal (not shown), a store side database 105 connected to the AAS 101 and composed of a musical composition list database 102, a musical composition data database 103 and an index database 104, a MD writer 106 connected to the store side database 105, a printer 107 connected to the store side database 105, a communication system 108 connected to the AAS 101, a data broadcasting receiving system 109, and a data broadcasting decoder 110 connected to the store side database 105.

The backchannel company 200 includes a communication system 201 connected to the communication system 108 of the store 100 via a telephone line 400; a server-client system (hereinafter referred to as the "host-computer") 202 connected to the communication system 201; a music database 207 connected to the host-computer 202 and composed of a musical composition list database 203, a musical composition data database 204, an index database 205 a copyright database 206; and a company side database 210 connected to the host-computer 202 and composed of a customer database 206 an accounting approval database 207.

The broadcasting station 300 includes a communication system 301 connected to the communication system 201 in the backchannel company 200 through the satellite wave 401, a broadcasting data database 302 connected to the communication system 301, a broadcasting data sending server 303 connected to the broadcasting data database 302, and a data broadcasting encoder 304 connected to the data broadcasting receiving system 109 in the store 100 through the broadcasting data sending server 303 and the satellite wave 402.

The purchasing system shown in FIG. 14 is so configured that a customer could select a preferred artist or musician and a preferred musical composition thereof, individually, in a store located nearby such as a convenience store or a gas station, the customer could produce a MD onto which the selected musical compositions are digitally copied in the store.

In the following, referring to FIGS. 15 to 23, an operation of the purchasing system shown in FIG. 14 will be described in detail.

2-1. Membership Recognition Step

At first, a switch of the purchasing system is turned on by touching an item "START" on a screen of a touchsensor type monitor in the AAS 101. A word "WELCOME" is displayed on the monitor screen, and then words "PLEASE INSERT A CARD" are displayed on the screen.

When the customer is a registered member of the purchasing system, then he/she should insert his/her member card into the cardreader of the AAS 101. Further, when the customer is a non-registered member, he/she should apply for a membership registration at the store and purchase a new member card, and then insert the purchased member card into the cardreader.

Herein, as is the case with the first embodiment, the purchasing system can be constituted as having a new membership card manufacturing function such that a new member card can be automatically manufactured based on anything which can verify the customer's identification, such as the customer's driver's license or bank card.

After the cardreader has read the member's card, the words "PLEASE ENTER YOUR PERSONAL IDENTIFICATION NUMBER" are displayed on the monitor. According to the display thereof, the customer will enter a PIN which is a unique for each member. The entry of the PIN can be implemented by touching the alphanumeric characters displayed on the monitor screen. The information of the entered PIN and the information of the member registration number of the member card, which has been read in advance by the cardreader, are transmitted from the communication system 108 via the telephone line 400 to the host-computer 202 through the communication system 201 of the backchannel company 200.

In the backchannel company 200, the host-computer 202 searches the customer managing database 208 of the company side database 210 based on the information of the PIN and the member registration number transmitted from the store 100, and matches whether or not the customer is a valid member, and then transmits the information concerning the result of that match from the communication system 201 via the telephone line 400 to the AAS 101 through the communication system 107 of the store 100. Further, the host-computer 202 will produce a customer code E when the customer is a valid member.

The AAS 101 in the store 100 displays the words "OK" on the monitor screen's display when the customer is a valid member, based on the received information concerning the result of the match. On the other hand, when the customer is an invalid member, then the AAS 101 displays the words "INVALID" on the monitor screen's display. In case the wrong PIN was entered during the above mentioned operation, it could be constituted such that the PIN can be re-entered by displaying the words "INVALID" on the screen, and then displaying the words "PLEASE ENTER YOUR PERSONAL IDENTIFICATION NUMBER AGAIN WITH GREAT CARE" on the screen.

In this case, in view of security, it could be constituted such that a limit would be imposed on the number of times that the PIN can be re-entered. And if the match could not be made within the defined number of times for the re-entry, the purchasing system is automatically turned off.

When the words "OK" are displayed on the monitor screen in the above mentioned step, the monitor displays the words "LET'S SELECT THE MUSICAL COMPOSITIONS" on the screen, and then the operation will proceed to the musical composition selection step.

2-2. Musical Composition Selection Step

As shown in FIG. 16A, the musical composition selection items for "the first music piece" are displayed on the monitor screen. In these musical composition selection items, the items of (a) the title of a musical composition, (b) the name of an artist, (c) the title of an album, (d) the names of the songwriter/composer, (e) the category, (f) the manufactured date, (g) a portion of the words, (h) a portion of the melody (tune), and (i) the recommended lineup are displayed, respectively.

The customer enters the necessary information by looking at the musical composition selection items displayed on the monitor screen, in order to select the first music piece. There are various methods of entering this information. For example, the necessary information can be entered by using the keyboard or can be directly written on the screen by using a touch pen.

The AAS 101 will obtain the necessary information by searching the musical composition list database 102 and the index database 104 which are included in the store side database 105, based on the information entered on the monitor screen.

As an example, FIG. 16B shows the monitor screen when the customer has entered (b) the name of an artist, (g) a portion of the words, and (h) a portion of the melody, respectively.

Herein, as is the case with the first embodiment described above, it could be constituted such that a voice recognition method can be adopted for the entry of (h) a portion of the melody, and making a recognition of the melody that the customer is singing by using that recognition method, and it could be constituted such that the recognized melody is further converted to the score corresponding thereto, and then the converted score is displayed on the screen of the monitor.

After these entries have been completed, the search is implemented by pushing the "search button" which is displayed on the monitor screen, and then the search result such as shown in FIG. 16C is displayed on the monitor screen. That is, as a result of the search, the title of the first music piece, "AND I LOVE HER" in this example, as well as its music code "044ESPD382409" are displayed on the monitor screen, and the selection items of "SELECTION BUTTON", "CANCEL BUTTON", "END BUTTON" are displayed on the monitor screen at the same time.

The customer verifies the first music piece displayed on the monitor screen, and then touches the "SELECTION BUTTON" if the entered information is confirmed. When the "SELECTION BUTTON" is touched, the music code is accumulated into a harddisc of the AAS 101, as well as the musical composition selection items for the second music piece are displayed on the monitor screen. The musical composition selection for the second music piece is implemented according to the same procedure. The music codes for the desired musical compositions are accumulated sequentially by repeating the procedure until the desired number of music pieces is reached.

When all the music piece selections have been completed, the musical composition selection is completed by touching the "END BUTTON" selection item after the validation result of the last music piece has been displayed on the monitor screen.

2-3. Musical Composition Editing Step

Figure 17:
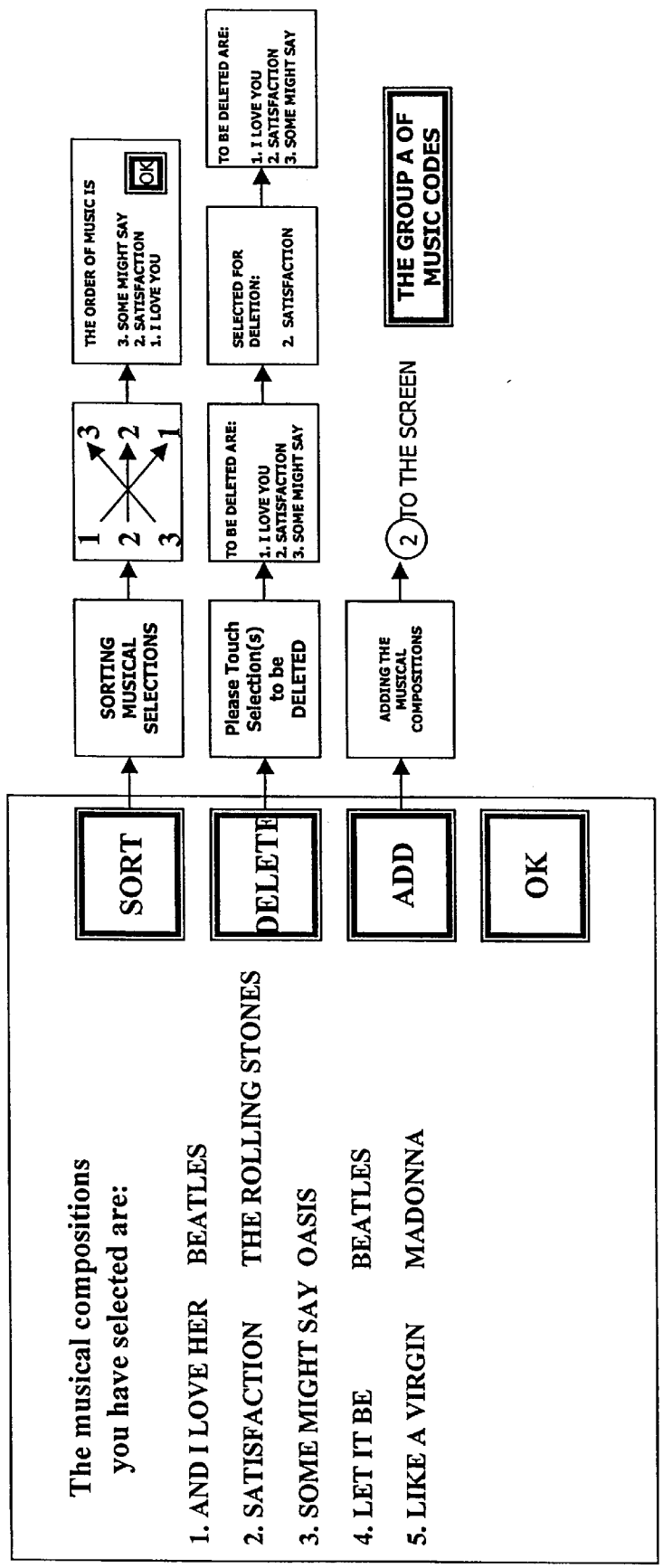
FIG. 17 is an illustrative diagram of another portion of the operation of the system for purchasing a personal recording media according to the present invention shown in FIG. 14.

By touching "END BUTTON" in the above mentioned step, as shown in FIG. 17, after having displayed the words "THE MUSICAL COMPOSITIONS YOU HAVE SELECTED ARE:", the musical compositions selected in the above mentioned musical composition selection step are displayed on the screen.

In this example, the selected musical compositions are displayed on the monitor screen as:

| | | |
|---|---|---|
| 1. AND I LOVE HER | BEATLES |
| 2. SATISFACTION | THE ROLLING STONES |
| 3. SOME MIGHT SAY | OASIS |
| 4. LET IT BE | BEATLES |
| 5. LIKE A VIRGIN | MADONNA | and the selection items "SORT", "DELETE", "ADD" and "OK" are displayed on the monitor screen at the same time.

2-3.1. Sorting of Musical Compositions

In the following, the sorting procedures of the orders for the selected musical compositions will be described.

By touching the item "SORT" on the monitor screen, as shown below, on the monitor screen, brackets are displayed on the right side of the musical compositions, respectively:

| | | |
|---|---|---|
| 1. AND I LOVE HER | BEATLES | [ ] |
| 2. SATISFACTION | THE ROLLING STONES | [ ] |
| 3. SOME MIGHT SAY | OASIS | [ ] |
| 4. LET IT BE | BEATLES | [ ] |
| 5. LIKE A VIRGIN | MADONNA | [ ] |

In this example, because the first and the third musical compositions are to be sorted, the order of the musical compositions are changed to the order of 3. 2. 1. 4. 5. by entering the numbers 3, 2, 1, 4, 5 into the blank squares from the top to the bottom in order. Of course, it could be constituted such that the order of the musical compositions can be sorted by using other commonly known methods such as one utilizing a cursor.

On the monitor screen, the item "OK" is displayed at the same time, and by touching "OK" when the desired sorting has been completed, the monitor screen returns to the display of "THE MUSICAL COMPOSITIONS YOU HAVE SELECTED ARE:", and the sort changed musical compositions, such as shown in below, are displayed:

| | |
|---|---|
| 3. SOME MIGHT SAY | OASIS |
| 2. SATISFACTION | THE ROLLING STONES |
| 1. AND I LOVE HER | BEATLES |
| 4. LET IT BE | BEATLES |
| 5. LIKE A VIRGIN | MADONNA |

Then, by touching the item "OK" on the screen, the display of "THE MUSICAL COMPOSITIONS YOU HAVE SELECTED ARE:" is so displayed as to be renumbered such as;

| | |
|---|---|
| 1. SOME MIGHT SAY | OASIS |
| 2. SATISFACTION | THE ROLLING STONES |
| 3. AND I LOVE HER | BEATLES |
| 4. LET IT BE | BEATLES |
| 5. LIKE A VIRGIN | MADONNA |

2-3.2. Deletion of Musical Compositions

Deletion of selected musical compositions can be implemented by touching the item "DELETE" on the monitor screen. By touching the item "DELETE", the character display "PLEASE TOUCH THE MUSICAL COMPOSITION(S) TO BE DELETED" is made, and further the list of the selected musical compositions:

| | |
|---|---|
| 1. AND I LOVE HER | BEATLES |
| 2. SATISFACTION | THE ROLLING STONES |
| 3. SOME MIGHT SAY | OASIS |
| 4. LET IT BE | BEATLES |
| 5. LIKE A VIRGIN | MADONNA | is displayed on the monitor screen, as well as the selection item "OK" is also displayed at the same time.

Herein, when deleting "2. SATISFACTION THE ROLLING STONES" in the musical composition list, the part of the musical composition "2. SATISFACTION THE ROLLING STONES" is removed from the list by touching the corresponding musical composition display portion on the monitor screen, and only that portion is displayed on the new page in the screen of the monitor with the selection item "OK" as:

| | |
|---|---|
| WILL BE DELETED | |
| 2. SATISFACTION | THE ROLLING STONES |

Herein, by touching the item "OK", the monitor screen displays again as shown below by renumbering the musical compositions except the deleted musical composition:

| | |
|---|---|
| 1. AND I LOVE HER | BEATLES |
| 2. SOME MIGHT SAY | OASIS |
| 3. LET IT BE | BEATLES |
| 4. LIKE A VIRGIN | MADONNA |

2-3.3. Addition of Musical Compositions

When newly adding a musical composition, the monitor screen displays the words "THE MUSICAL COMPOSITION WILL BE ADDED" by touching the selection item "ADD", and returns to the screen of "The Musical Composition Selection Step" as described above. Then, as described above, a new musical composition can be added by operating a necessary procedure while watching the monitor screen.

"THE GROUP A OF THE MUSIC CODES" corresponding to the edited musical compositions are created by touching the item "END BUTTON" on the screen after having implemented the necessary operations in the above mentioned musical composition editing step. Also, as described below, the monitor screen will shift to the next step by touching the item "END BUTTON".

2-4. Design Step

In this step, the jacket design selection and the album title entry of the MD are implemented.

2-4.1. Jacket Design Selection

Figure 18:
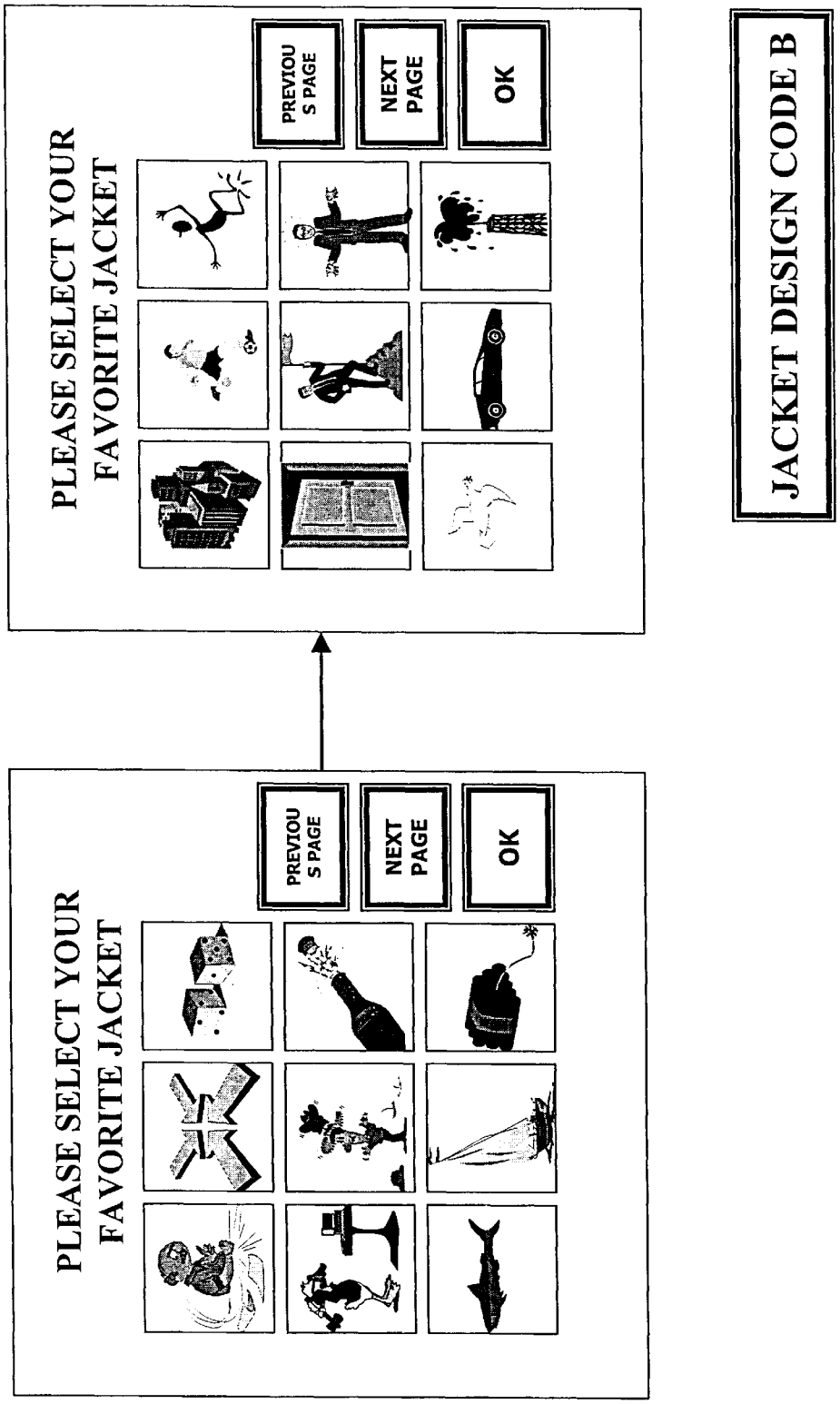
FIG. 18 is an illustrative diagram of another portion of the operation of the system for purchasing a personal recording media according to the present invention shown in FIG. 14.

With a completion of the musical composition editing step as described in the above step 3, in this example, nine kinds of jacket design are displayed on one screen (i.e., one page) of the monitor, as shown in FIG. 18 along with the character display of "PLEASE SELECT THE FAVORITE JACKET". Jacket designs on other pages of the monitor screen can be displayed on the monitor screen in such a manner that the jacket designs displayed on the previous page and the next page can be displayed on the monitor screen by touching the entry displays of "PREVIOUS PAGE" and "NEXT PAGE" on the monitor screen, respectively. Of course, the number of kinds of the jacket designs incorporated in one screen (i.e., one page) may be set arbitrarily.

In this example, the design placed on the center of the left side column shown in FIG. 18 is selected by touching the monitor screen, and then the "JACKET DESIGN CODE B" corresponding to the selected jacket design is created by touching the entry display "OK".

2-4.2. Album Title Entry

Figure 19:
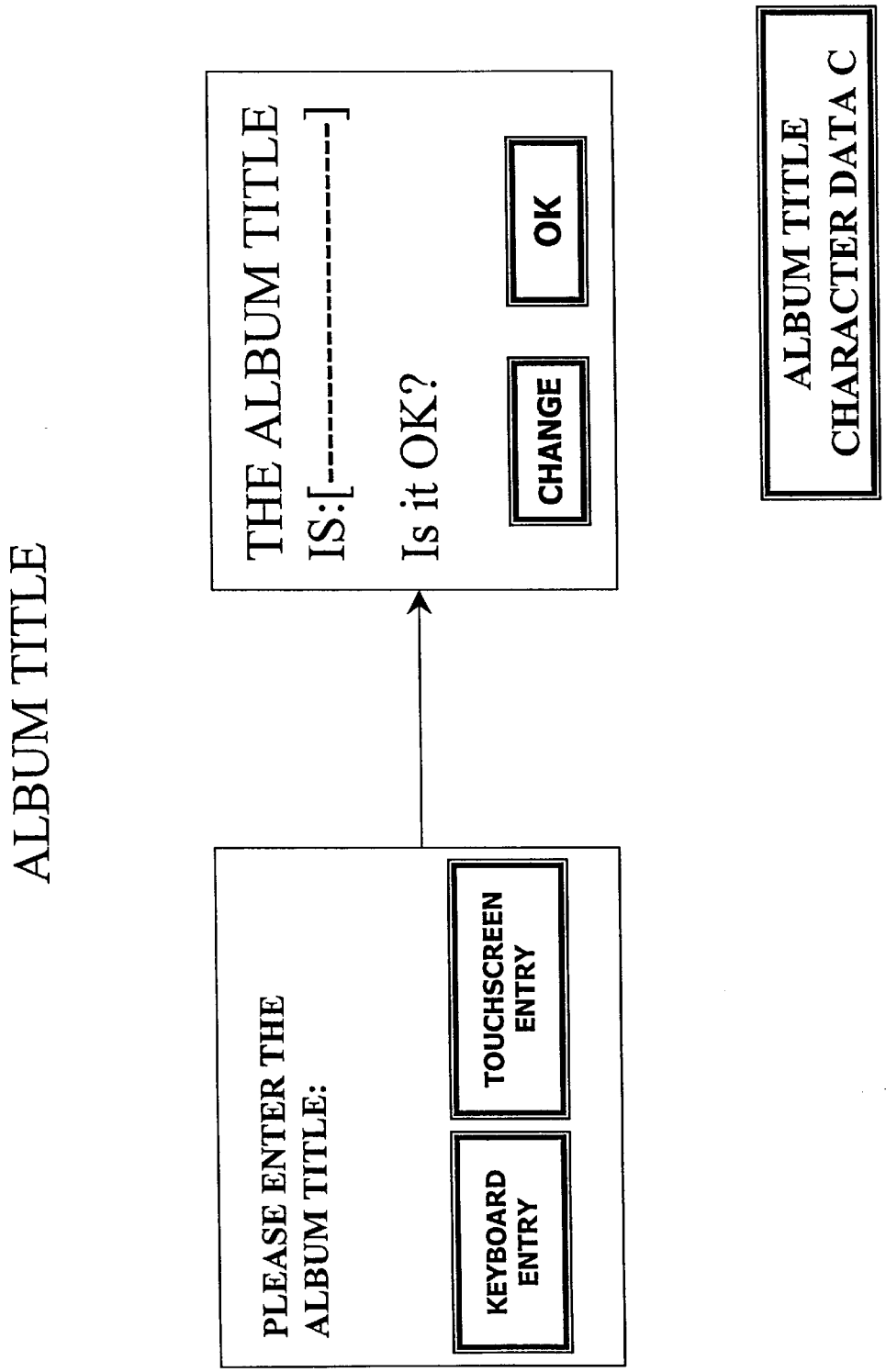
FIG. 19 is an illustrative diagram of another portion of the operation of the system for purchasing a personal recording media according to the present invention shown in FIG. 14.

After the jacket design selection is completed, the character display of "PLEASE ENTER THE ALBUM TITLE" as well as the items "KEYBOARD ENTRY", "TOUCH-SENSOR ENTRY" are displayed on the monitor screen, as shown in FIG. 19. The customer enters the album title on which he/she has decided, through the keyboard or the touchsensor, after having touched either one of the items "KEYBOARD ENTRY" or "TOUCHSENSOR ENTRY". The monitor screen sequentially displays the characters of the title of the album to be entered such as "THE ALBUM TITLE IS "LOVE SONGS". IS IT OK?". The items "CHANGE", "OK" are displayed simultaneously when either one of the items "KEYBOARD ENTRY" or "TOUCHSENSOR ENTRY" is touched.

The customer implements an entry again with the procedures described above, by touching the item "CHANGE", if he/she desires to change the entered album title, while watching the monitor screen. Further, if the entered album title is all right as it is, then the "ALBUM TITLE CHARACTER DATA C" corresponding to the album title being displayed is created by touching the item "OK".

2-5. Final Verification Step

Figure 20:
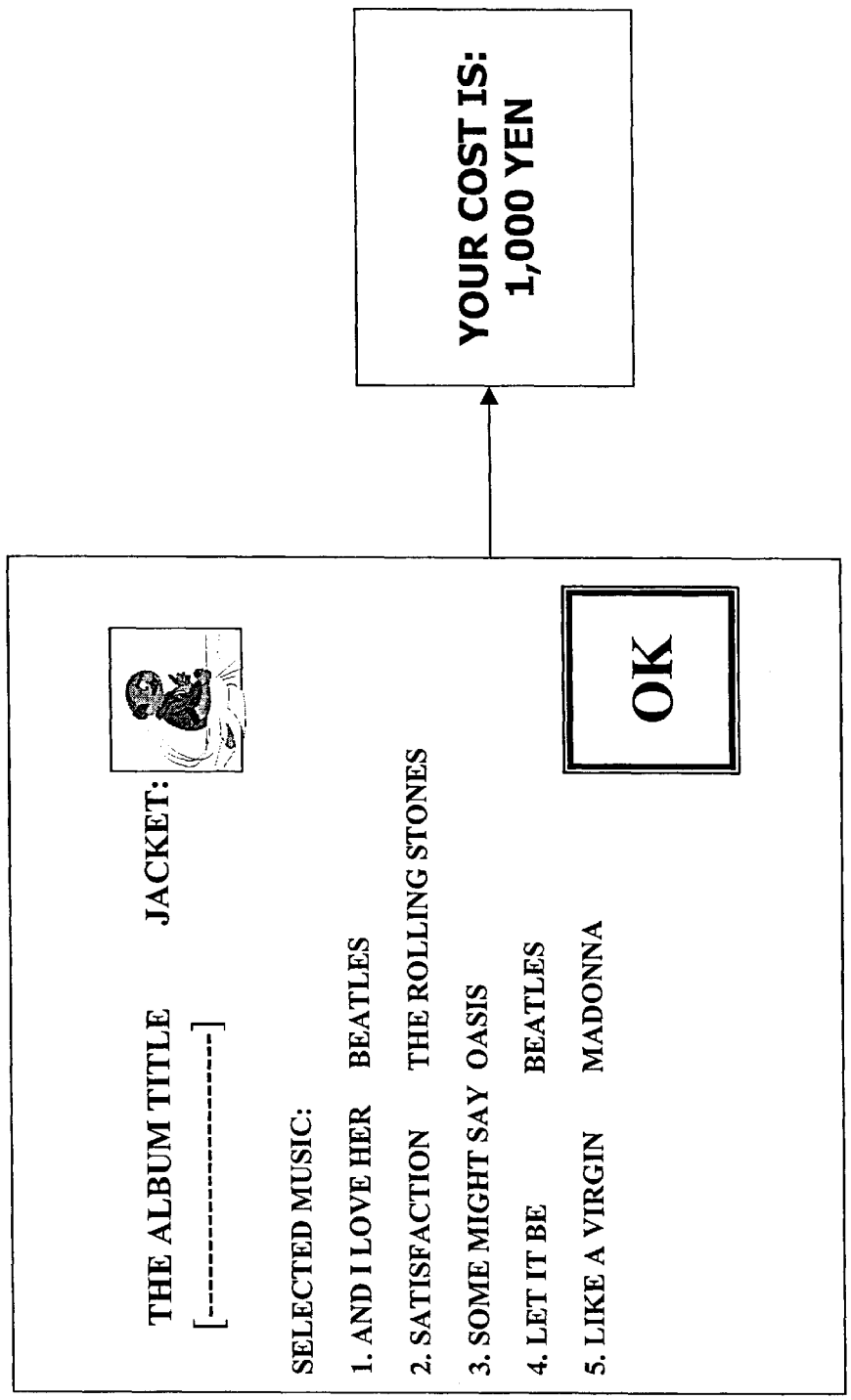
FIG. 20 is an illustrative diagram of another portion of the operation of the system for purchasing a personal recording media according to the present invention shown in FIG. 14.

After the above mentioned design step is completed, the verification items such as shown in FIG. 20 are displayed on the monitor screen, respectively. That is, the contents of the respective items "ALBUM TITLE", "JACKET" and "SELECTED MUSIC" are displayed again for final verification. By touching the item "OK" after this final verification is complete, an indication of the cost for the MD which is intended to be produced, for example, as "YOUR COST IS 1,000 YEN", is displayed on the monitor screen.

2-6. Payment Step

Figure 21:
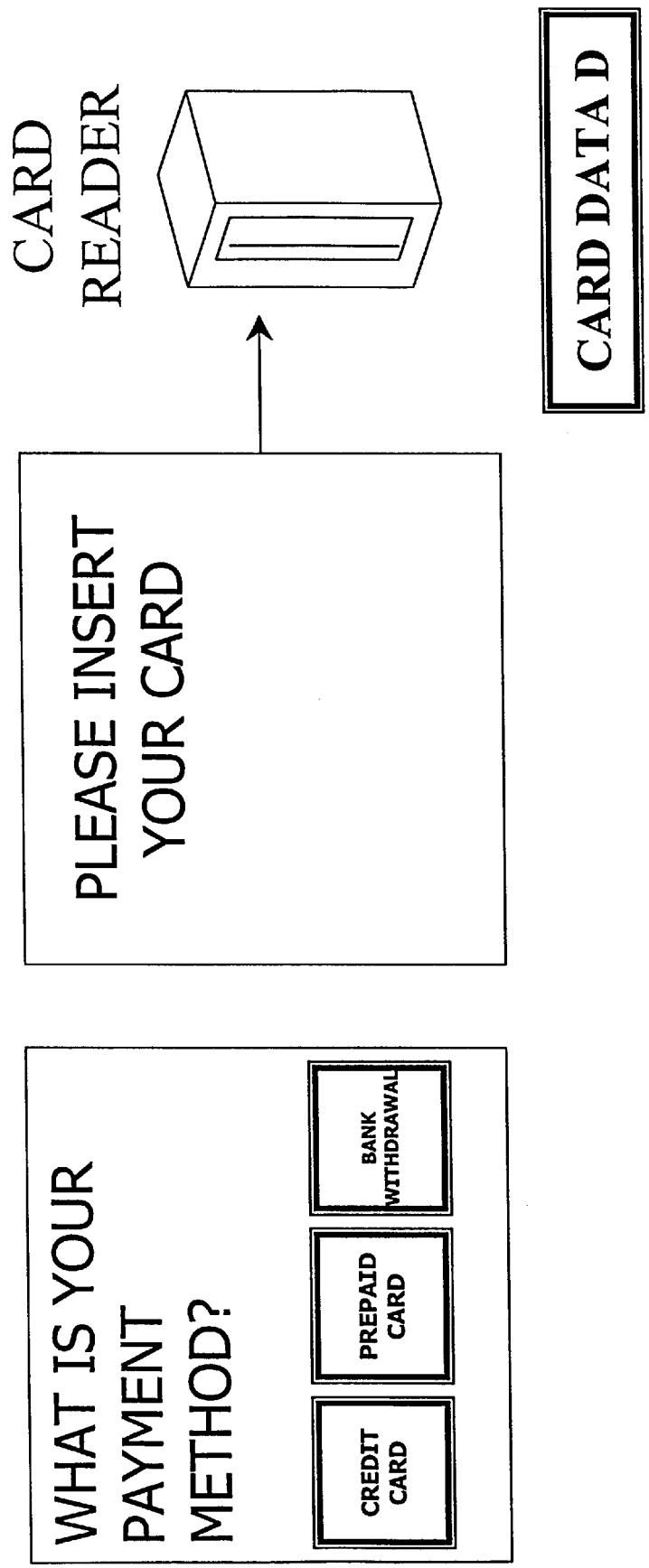
FIG. 21 is an illustrative diagram of another portion of the operation of the system for purchasing a personal recording media according to the present invention shown in FIG. 14.
Figure 22:
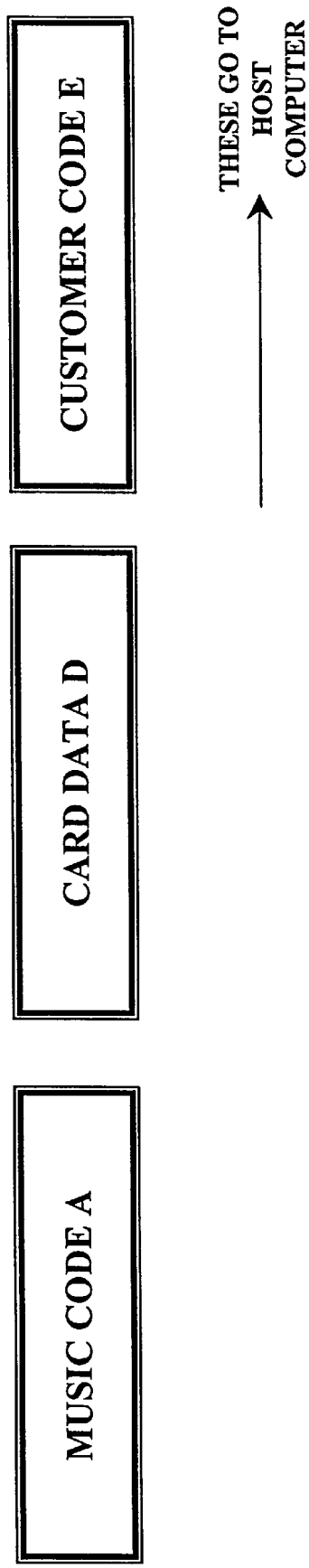
FIG. 22 is an illustrative diagram of another portion of the operation of the system for purchasing a personal recording media according to the present invention shown in FIG. 14.

Following the above mentioned final verification step, as shown in FIG. 21, the items "CREDIT CARD", "PREPAID CARD", and "BANK WITHDRAWAL" are displayed on the monitor screen along with the character display of "WHAT IS YOUR PAYMENT METHOD?". When the customer has selected the payment method by touching any one of the items on the monitor screen, the character display of "PLEASE INSERT THE CARD" is implemented, and the customer will then insert the card corresponding to the selected payment method into the cardreader. When the card read by the cardreader is confirmed, then the "CARD DATA D" will be produced.

Next, referring to FIG. 23, the work steps in the store 100 and the backchannel company 200 will be described.

2-7. MD Production Step 2-7.1. MD Disc Production Work

After the above mentioned steps 1 to 6 are completed, the production step of the MD is begun. In the present embodiment, the MD disc production work, i.e., the recording, is implemented in the KIOSK, that is, in the store 100 such as the convenience store or the gas station and the like.

The input information required for the MD production is "MUSIC CODE GROUP A" as mentioned above. Based on MUSIC CODE GROUP A, the musical composition data database 103 in the store side database 105 is searched, and the musical compositions corresponding to the information of the MUSIC CODE GROUP A are selected from the musical composition data database 103, and then the selected musical compositions are high-speed recorded into the MD by the MD writer 106.

2-7.2. Jacket Production Work

Further, within the store 100, based on the "MUSIC CODE GROUP A", "JACKET DESIGN CODE B" and "ALBUM TITLE CHARACTER DATA C", the jacket production work (i.e., printing/thermal transfer) is implemented by the printer 107. Herein, at first, based on the "MUSIC CODE GROUP A", the musical composition list database 102 in the store side database 105 is searched, and the attribute of each music is selected from the musical composition list database 102 and the index database 104, and then that information is printed on the predetermined locations of the jacket. Next, based on the "ALBUM TITLE CHARACTER DATA C", the title being input is printed on the title location of the jacket. Then, based on the "JACKET DESIGN CODE B", the selected jacket design is thermally transferred to the front cover of the jacket.

When the above mentioned MD disc production work and the above mentioned jacket production work are completed, the customer could obtain the desired MD at the store 100 such as the KIOSK and the like.

2-7. Transmission Step

After the above mentioned payment step is completed, the "MUSIC CODE GROUP A", "CARD DATA D" and "CUSTOMER CODE E", which have been produced as described above, are transmitted to the host-computer 202 which is provided in the backchannel company 200 through the communication system 108, the telephone line 400 and the communication system 201, as shown in FIG. 14.

2-9. Backchannel Company's Work Step 2-9.1. Accounting Approval

The host-computer 202 retrieves the accounting approval database 209 in the company side database 210, based on the information of "CARD DATA D" and "CUSTOMER CODE E", and the necessary information is sent from the accounting approval database 209 to the predetermined financial institution such as a credit company and the like, and then the accounting approval of the customer is carried out.

2-9.2. Copyright Process

The host-computer 202 retrieves the musical composition list database 203 and the copyright database 206 in the music database 207, based on the information of "MUSIC CODE GROUP A". The copyright process is carried out by sending the necessary information from the copyright database 206 of the music database 207 to the JASRAC, and the original disc process is carried out by sending the necessary information from the copyright database 206 of the music database 207 to the recording company and the like.

2-10. Musical Composition Database Update Step

It is very important for the customer to obtain information of new musical compositions (the musical composition list, the musical composition data, the index data, and the like). This information is transmitted from the broadcasting station 300 to the store 100 by satellite wave and the like 402.

The backchannel company reads the new versions of the musical composition list, the musical composition data and the index information from the musical composition list database 203, the musical composition data database 204 and the index database 205 of the music database 207, respectively using the host-computer 202, and then transmits this information from the communication system 201 to the communication system 301 in the broadcasting station 300 by satellite wave (instead, it is possible to use the telephone line or the private line).

In the broadcasting station 300, the new versions of the musical composition list, the musical composition data, the index information are stored in the broadcasting data database 302. The broadcasting data sending server 303 sends the new versions of the musical composition list, the musical composition data, the index information stored in the broadcasting data database 302 to the data broadcasting encoder 304. The data broadcasting encoder 304 converts this information to transmission signals by encoding them, and then transmits the transmission signals to the data broadcasting receiving system 109 in the store 100 by satellite wave and the like 402.

The data broadcasting receiving system 109 in the store 100, which has received the encoded signals, sends these signals to the data broadcasting decoder 110. Then, the data broadcasting decoder 110 decodes the received signals, reads the new versions of the musical composition list, the musical composition data and the index information, and stores these new versions of the musical composition list, the musical composition data and the index information in the musical composition list database 102, the musical composition data database 103 and the index database 104 in the store side database 105, respectively.

Accordingly, the purchasing system according to the present embodiment is so configured that the newest music information is always stored in the store 100, and thus it could respond to the needs for the customers.

Figure 24:
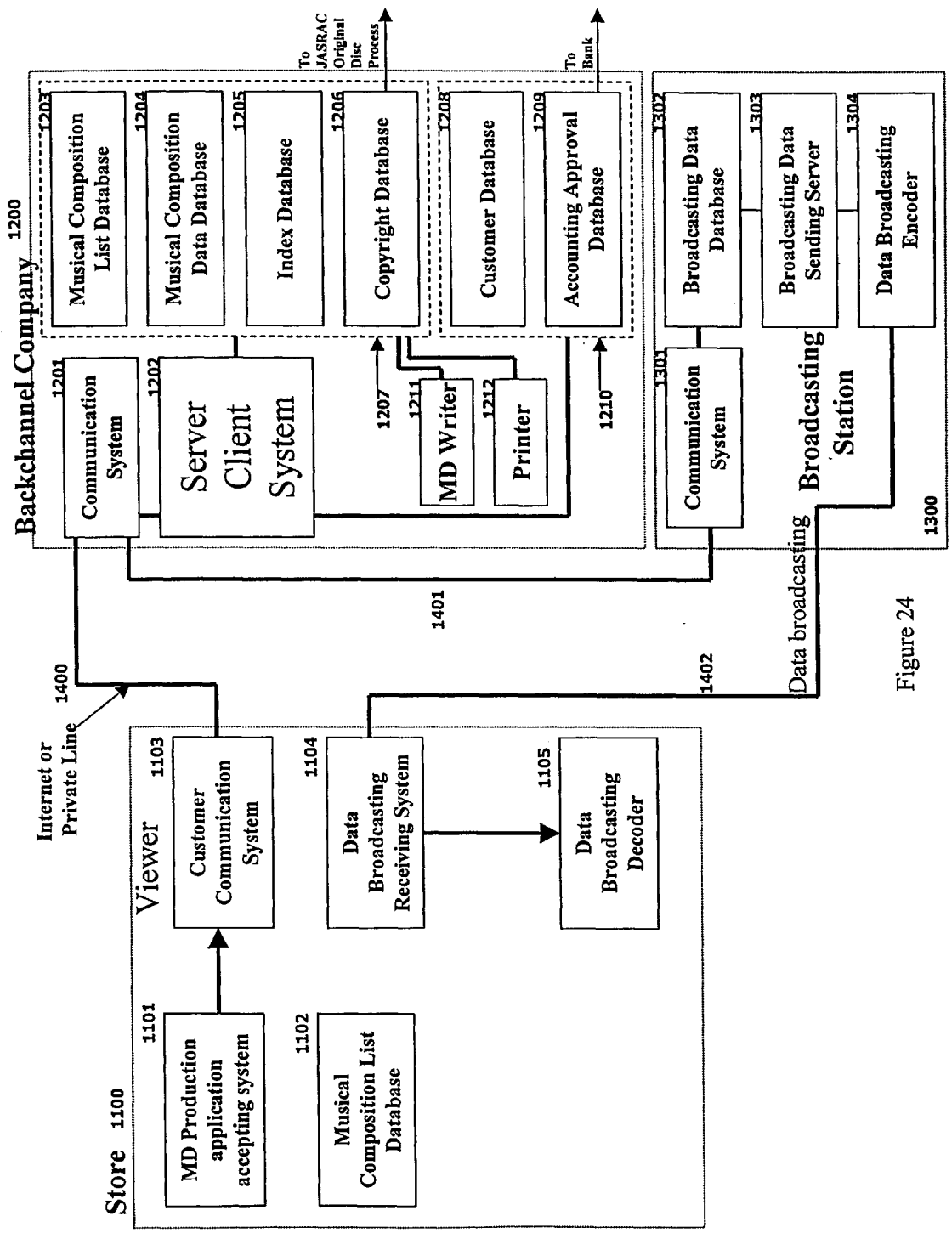
FIG. 24 is a schematic diagram showing a third embodiment of the system for purchasing a personal recording media according to the present invention.

FIG. 24 is a schematic diagram showing the third embodiment of the system for purchasing a personal recording media (as before, it is referred to as "a purchasing system") according to the present invention.

Before describing the structure of FIG. 24, the features of the third embodiment will be described below. The substantial differences in the third embodiment from the first and the second embodiments are such that it is adapted to implement the MD application at the customer's home, and the new music is applied through the data broadcasting.

The third embodiment is a service directed to specific members only:

(1) Only the new musical composition list (music codes) will be sent from the broadcasting station 1300 using the data broadcasting;

(2) The desired new music will be clicked while watching TV programs, such as "MTV", "Countdown TV" and the like;

(3) Accessing host-computer 1202 when several numbers of the desired music are accumulated;

(4) The compilation MD will be delivered to the home 1100; and (5) The copyright approval process will be implemented.

In the following, the prerequisites in the third embodiment will be described:

A. The member (customer) should already have a PC/TV at home by purchasing it, or the dedicated board should have been attached to the PC which has been already at home by purchasing it, and the PC TV is connected to the telephone line in the home;

B. When new music is released, the recording company will submit a notification of the necessary attributes to the music database, and then the music code will be allocated, accordingly;

C. Implementing the music broadcasting by embedding the music code (+alpha) into the broadcasting band which is not used for general broadcasting (e.g., a TV program such as "MTV" and the like);

D. Accumulating the music codes (+alpha) sent from the broadcasting station 1300 into the PC/TV harddisc by operating a remote controller, a keyboard, or a mouse, and then transmitting them; (This PC/TV is preferably linked to the music database homepage, and the musical composition list database within the harddisc thereof is always updated thereby.)

E. The broadcasting band which is not used for general broadcasting refers to each band of the data broadcasting, the teletext broadcasting, sub-sound broadcasting;

F. It can be utilized as a system which is adapted to simplify the application work by encoding ticket information and general product information;

G. It can be utilized as a system for a radio broadcasting; and

H. It is also possible to use an IC card.

As shown in FIG. 24, the main parts of the purchasing system in this embodiment are composed of a home 1100, a backchannel company 1200, and a broadcasting station 1300. The home 1100 is connected with the backchannel company 1200 using a telephone line (instead, an internet or a private line could be used) 1400. Further, the home 1100 and the broadcasting station 1300, as well as the backchannel company 1200 and the broadcasting station 1300 are respectively communicated with each other through the satellite waves (instead, ground waves or cable could be used) 1401, 1402, respectively.

The home 1100 is a residence and the like of the customer, and includes a MD production application accepting system 1101 (the "AAS"), a musical composition list database 1102 connected to the AAS 1101, a communication system 1103 connected to the AAS 1101, a data broadcasting decoder 1105 connected to the musical composition list data 1102, and a data broadcasting receiving system 1104 connected to the data broadcasting decoder 1105.

The backchannel company 1200 includes a communication system 1201 connected to the communication system 1103 of the home 1100 via a telephone line 1400; a server-client system (the "host-computer") 1202 connected to the communication system 1201; a music database 1207 connected to the host-computer 1202 and composed of a musical composition list database 1203, a musical composition data database 1204, an index database 1205 and a copyright database 1206; and a company side database 1210 connected to the host-computer 1202 and composed of a customer database 1206 and an accounting approval database 1207. Further, the MD writer 1211 and the printer 1212 are connected to the music database 1207, respectively.

The broadcasting station 1300 includes a communication system 1301 connected to the communication system 1201 in the backchannel company 1200 through the satellite wave 1401, a broadcasting data database 1302 connected to the communication system 1301, a broadcasting data sending server 1303 connected to the broadcasting data database 1302, and a data broadcasting encoder 1304 connected to the data broadcasting receiving system 1104 in the home 1100 through the broadcasting data sending server 1303 and the satellite wave 1402.

This third embodiment differs from the first and the second embodiments described above in that it is configured such that the musical composition list (=music codes) is data-broadcasted from the broadcasting station, and the MD can be applied at the home. The applied MD will be delivered from backchannel company 1200 to the home 1100.

In the following, an operation of the purchasing system of the third embodiment will be described in detail.

Assuming that a recording company M has produced, for example, a new music recording "LOVE YOU" of SEIKO MATSUDA. The recording company M will immediately register that new music to the music database. By registering, a music code for that new music, for example 081AMDM029988, is provided. Then, the recording company M puts the new music "LOVE YOU" of SEIKO MATSUDA on air in the TV program "Countdown TV" by bringing the promotional video tape of the new music "LOVE YOU" on which the music code 081AMDM029988 is provided into the TV program "Countdown TV" of the commercial broadcasting station TBS, and transmits the music code 081AMDM029988 with the data broadcasting band at the same time.

It is assumed that, on a monitor screen of the PC TV which is connected to the telephone line, the TV program "Countdown TV" is turned on, and just the new music "LOVE YOU" of SEIKO MATSUDA is on air.

Figure 25:
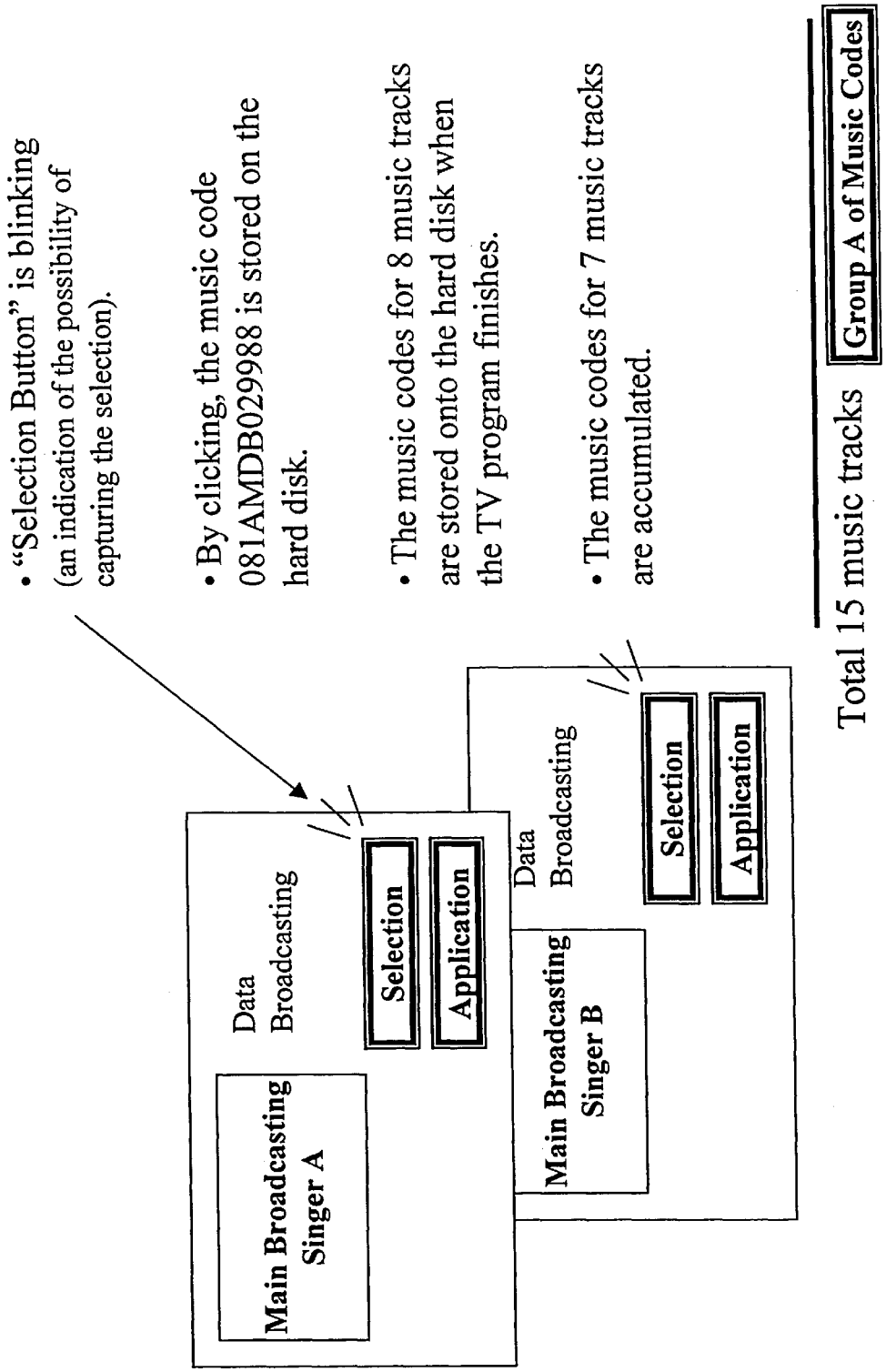
FIG. 25 is an illustrative diagram of one portion of the operation of the system for purchasing a personal recording media according to the present invention shown in FIG. 24.

FIG. 25 shows a monitor screen of the PC/TV at the home 1100. Herein, it is assumed that in the main broadcasting (in the above case, it is the TV program "Countdown TV" of TBS) a scene of the new music "LOVE YOU" of a singer A (in the above case, it is SEIKO MATSUDA) is running on the air, and then a scene of the new music "HOW TO BE A GIRL" of a singer B (in this case, NAMIE AMURO) is running on the air.

3-1. Selection

The entry displays "SELECTION" and "APPLICATION" are shown on the monitor screen of the PC/TV. Herein, assuming that the entry display "SELECTION" is blinking in order to indicate a possibility of capturing, then by clicking or touching this blinking entry display "SELECTION", the music code 081AMDM029988 corresponding to the new music "LOVE YOU" is stored into the harddisc of the PC/TV.

Similarly, the customer (the member) selects the new music "HOW TO BE A GIRL" of NAMIE AMURO during the same main broadcasting (the broadcasting of the TV program "Countdown TV" of TBS), and then the music code corresponding to this music is stored into the harddisc of the PC/TV.

By doing so, it is assumed that, by selecting eight music selections during the same main broadcasting, the music codes for eight music selections are stored into the harddisc of the PC/TV when the TV program "Countdown TV" has been completed. Further, it is assumed that the customer (the member) has selected seven music selections during the broadcasting of other TV program, the music codes for seven music selections are stored into the harddisc of the PC/TV when that TV program has been completed.

In the above case, the music codes for the total of fifteen music selections are stored into the harddisc of the PC/TV.

3-2. Application

Figure 26:
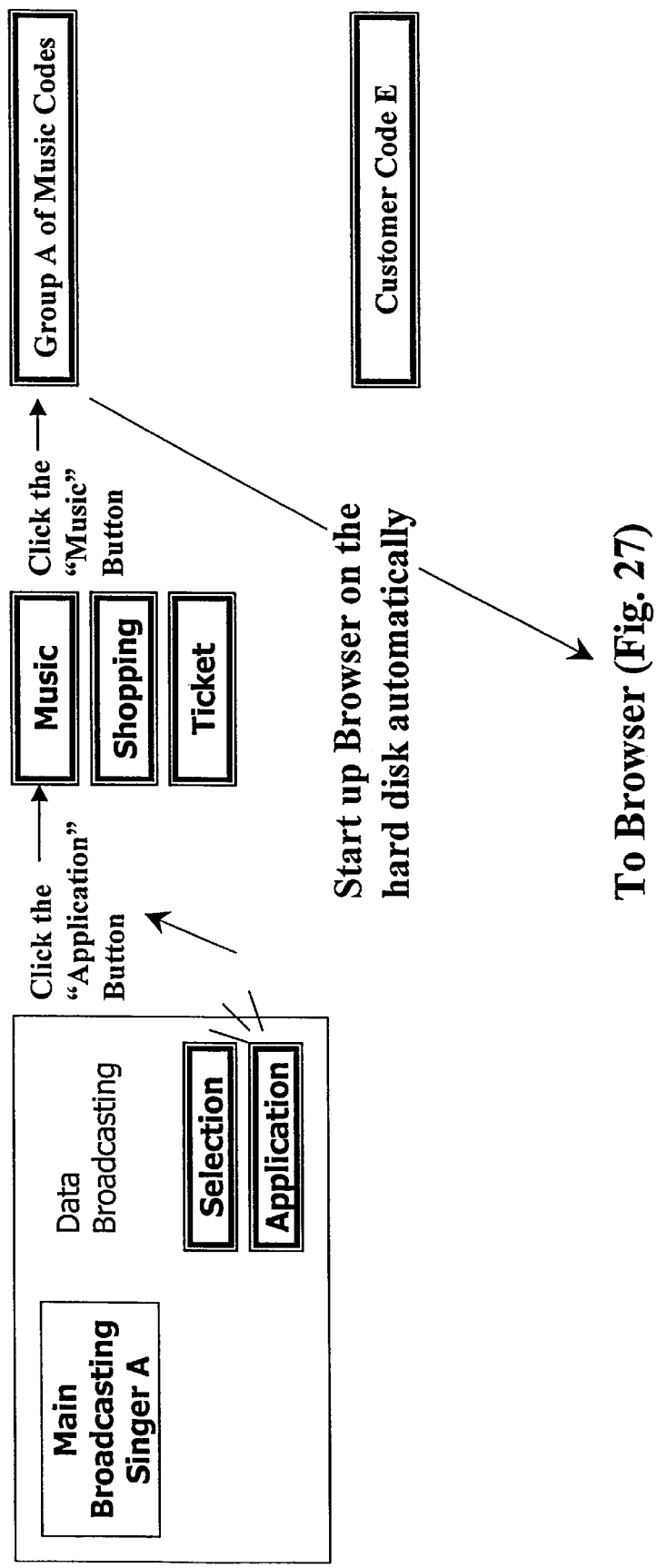
FIG. 26 is an illustrative diagram of another portion of the operation of the system for purchasing a personal recording media according to the present invention shown in FIG. 24.

The process moves to the application operation, as shown in FIG. 26, when the selection step of the above has been completed.

By clicking (or touching) the entry display "APPLICATION" on the monitor screen of the PC/TV, the entry displays "MUSIC", "SHOPPING", "TICKET" are displayed on the monitor screen. The item "MUSIC" is clicked in this embodiment.

Figure 27:
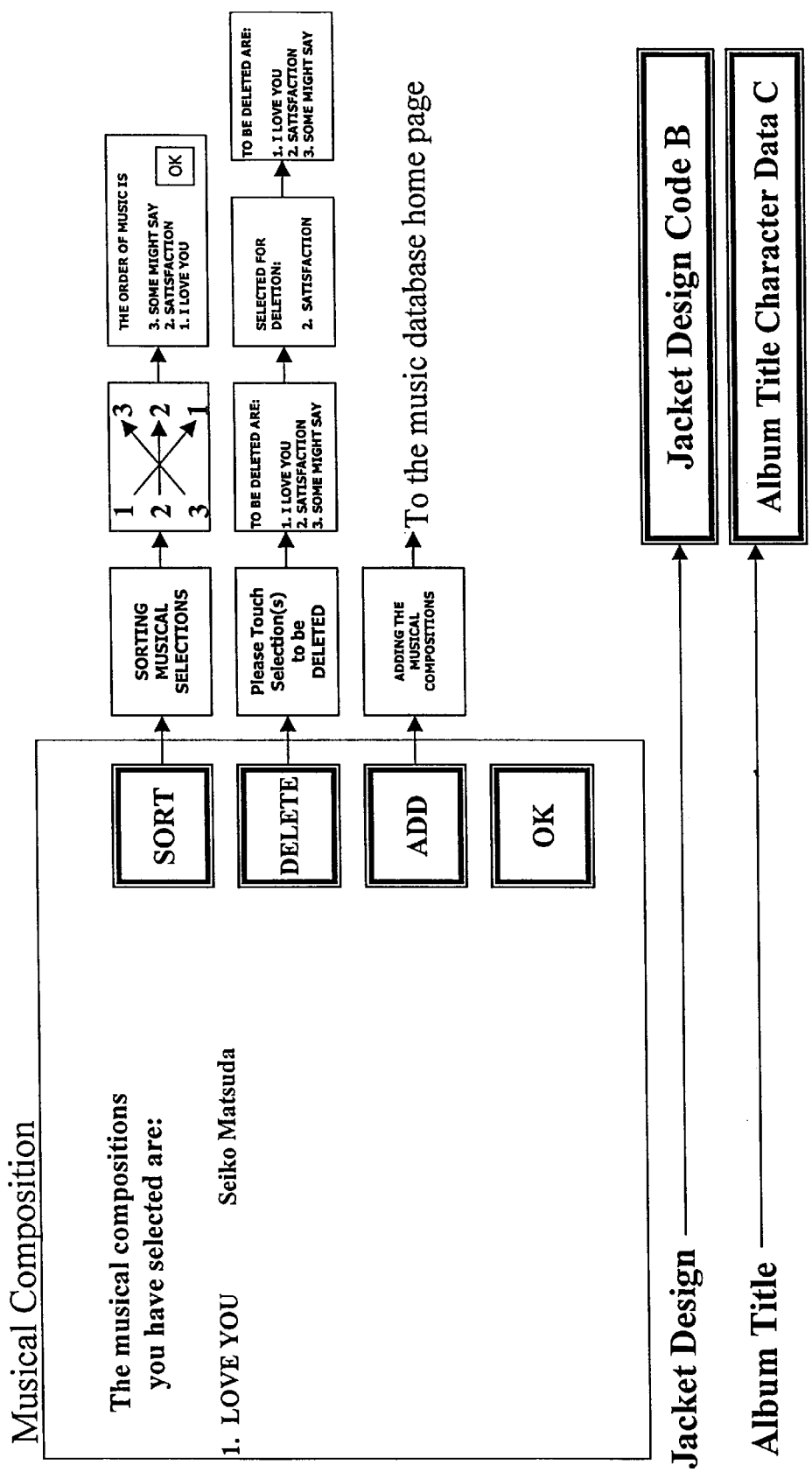
FIG. 27 is an illustrative diagram of another portion of the operation of the system for purchasing a personal recording media according to the present invention shown in FIG. 24.

By clicking the item "MUSIC", in this embodiment, the "THE GROUP A OF MUSIC CODES" composed of the music codes of fifteen music selections, as well as the "CUSTOMER CODE E" are produced. Further, at the same time, a browser within the harddisc of the PC/TV is started-up automatically, and as shown in FIG. 27, after the words "THE MUSICAL COMPOSITIONS YOU HAVE SELECTED ARE:" are displayed, the musical compositions selected in the above mentioned manner are displayed on the screen.

In this example, the selected musical compositions are displayed on the monitor screen as:

| 1. LOVE YOU | SEIKO MATSUDA |
|---|---|
| 2. HOW TO BE A GIRL | NAMIE AMURO |
| 3. FOR THE MOMENT | EVERY LITTLE THING |
| * * * | |
| 15. KOREGA WATASHI-NO IKIRUMICHI | PUFFY | and the selection items "SORT", "DELETE", "ADD" and "OK" are displayed on the monitor screen at the same time.

3-2.1. Sorting of Musical Compositions

In the following, the sorting procedures of the orders for the selected musical compositions will be described.

By touching the item "SORT" on the monitor screen, as shown below, on the monitor screen, brackets [ ] are displayed on the right side of the musical compositions, respectively:

| 1. | LOVE YOU | SEIKO MATSUDA | [ ] |
|---|---|---|---|
| 2. | HOW TO BE A GIRL | NAMIE AMURO | [ ] |
| 3. | FOR THE MOMENT | EVERY LITTLE THING | [ ] |
| | * * * | | |
| 15. | KOREGA WATASHI-NO IKIRUMICHI | PUFFY | [ ] |

In this example, because the first and the third musical compositions are to be sorted, the order of the musical compositions are changed to the order of 3. 2. 1. 4. . . . 15. by entering the numbers 3, 2, 1, 4, . . . , 15 into the brackets [ ] from the top to the bottom in order. Of course, it could be constituted such that the order of the musical compositions can be sorted by using other commonly known methods such as one which utilizes a cursor. On the monitor screen, the item "OK" is displayed at the same time, and by touching "OK" when the desired sorting has been completed, the monitor screen returns to the display of the "THE MUSICAL COMPOSITIONS YOU HAVE SELECTED ARE:", and the sort changed musical compositions, such as shown in below, are displayed:

| 3. | FOR THE MOMENT | EVERY LITTLE THING |
|---|---|---|
| 2. | HOW TO BE A GIRL | NAMIE AMURO |
| 1. | LOVE YOU | SEIKO MATSUDA |
| | * * * | |
| 15. | KOREGA WATASHI-NO IKIRUMICHI | PUFFY |

Then, by touching the item "OK" on the screen, the display of "THE MUSICAL COMPOSITIONS YOU HAVE SELECTED ARE:" is so displayed as to be renumbered such as;

| 1. | FOR THE MOMENT | EVERY LITTLE THING |
|---|---|---|
| 2. | HOW TO BE A GIRL | NAMIE AMURO |
| 3. | LOVE YOU | SEIKO MATSUDA |
| | * * * | |
| 15. | KOREGA WATASHI-NO IKIRUMICHI | PUFFY |

3-2.2. Deletion of Musical Compositions

Deletion of selected musical compositions can be implemented by touching the item "DELETE" on the monitor screen. By touching the item "DELETE", the character display "PLEASE TOUCH THE MUSICAL COMPOSITION(S) TO BE DELETED" is made, and further the list of the selected musical compositions:

| 1. | FOR THE MOMENT | EVERY LITTLE THING |
|---|---|---|
| 2. | HOW TO BE A GIRL | NAMIE AMURO |
| 3. | LOVE YOU | SEIKO MATSUDA |
| | * * * | |
| 15. | KOREGA WATASHI-NO IKIRUMICHI | PUFFY | is displayed on the monitor screen, as well as the selection item "OK" is also displayed at the same time.

Herein, when deleting the musical composition "3. LOVE YOU SEIKO MATSUDA" in the musical composition list, the part of the musical composition "3. LOVE YOU SEIKO MATSUDA" is removed from the list by touching the corresponding musical composition display portion on the monitor screen, and only that portion is displayed on the new page in the screen of the monitor with the selection item "OK" as:

| WILL BE DELETED | | |
|---|---|---|
| 3. | LOVE YOU | SEIKO MATSUDA |

Herein, by touching the item "OK", the monitor screen displays again as shown below by renumbering the musical compositions except the deleted musical composition:

| 1. | FOR THE MOMENT | EVERY LITTLE THING |
|---|---|---|
| 2. | HOW TO BE A GIRL | NAMIE AMURO |
| | * * * | |
| 14. | KOREGA WATASHI-NO IKIRUMICHI | PUFFY |

3-2.3. Addition of Musical Compositions

When newly adding a musical composition, the monitor screen displays the words "THE MUSICAL COMPOSITION WILL BE ADDED" by touching the selection item "ADD", and returns to the screen of "The Musical Composition Selection Step" as described above. Then, as described above, a new musical composition can be added by operating a necessary procedure while watching the monitor screen.

"THE GROUP A OF THE MUSIC CODES" corresponding to the edited musical compositions are created by touching the item "END BUTTON" on the screen after having implemented the necessary operations in the above mentioned musical composition editing step. Also, as described below, the monitor screen will shift to the next step by touching the item "END BUTTON".

3-3. Design Step

In this step, the jacket design selection and the album title entry of the MD are implemented. Since this step is the same as the one in the first embodiment, the same description will be repeated below.

3-3.1. Jacket Design Selection

With the completion of the musical composition editing step as described in the above step 3, in this example, nine kinds of jacket design are displayed on one screen (i.e., one page) of the monitor, as shown in FIGS. 5 and 18, along with the character display of "PLEASE SELECT THE FAVORITE JACKET". Jacket designs on other pages of the monitor screen can be displayed on the monitor screen in such a manner that the jacket designs displayed on the previous page and the next page can be displayed on the monitor screen by touching the entry displays of "PREVIOUS PAGE" and "NEXT PAGE" on the monitor screen, respectively. Of course, the number of kinds of the jacket designs incorporated in one screen (i.e., one page) may be set arbitrarily. Once the jacket design has been selected by touching the monitor screen, the "JACKET DESIGN CODE B" corresponding to the selected jacket design is created by touching the entry display "OK".

3-3.2. Album Title Entry

After the jacket design selection is completed, the character display of "PLEASE ENTER THE ALBUM TITLE" as well as the items "KEYBOARD ENTRY", "TOUCH-SENSOR ENTRY" are displayed on the monitor screen, as shown in FIGS. 6 and 19. The customer enters the album title on which he/she has decided, through the keyboard or the touchsensor, after having touched either one of the items "KEYBOARD ENTRY" or "TOUCHSENSOR ENTRY". The monitor screen sequentially displays the characters of the title of the album to be entered such as "THE ALBUM TITLE IS "LOVE SONGS". IS IT OK?". The items "CHANGE" and "OK" are displayed simultaneously when either one of the items "KEYBOARD ENTRY" or "TOUCHSENSOR ENTRY" is touched.

The customer implements an entry again with the procedures described above, by touching the item "CHANGE", if he/she desires to change the entered album title, while watching the monitor screen. Further, if the entered album title is all right as it is, then the "ALBUM TITLE CHARACTER DATA C" corresponding to the album title being displayed is created by touching the item "OK".

3-4. Final Verification Step

Figure 28:
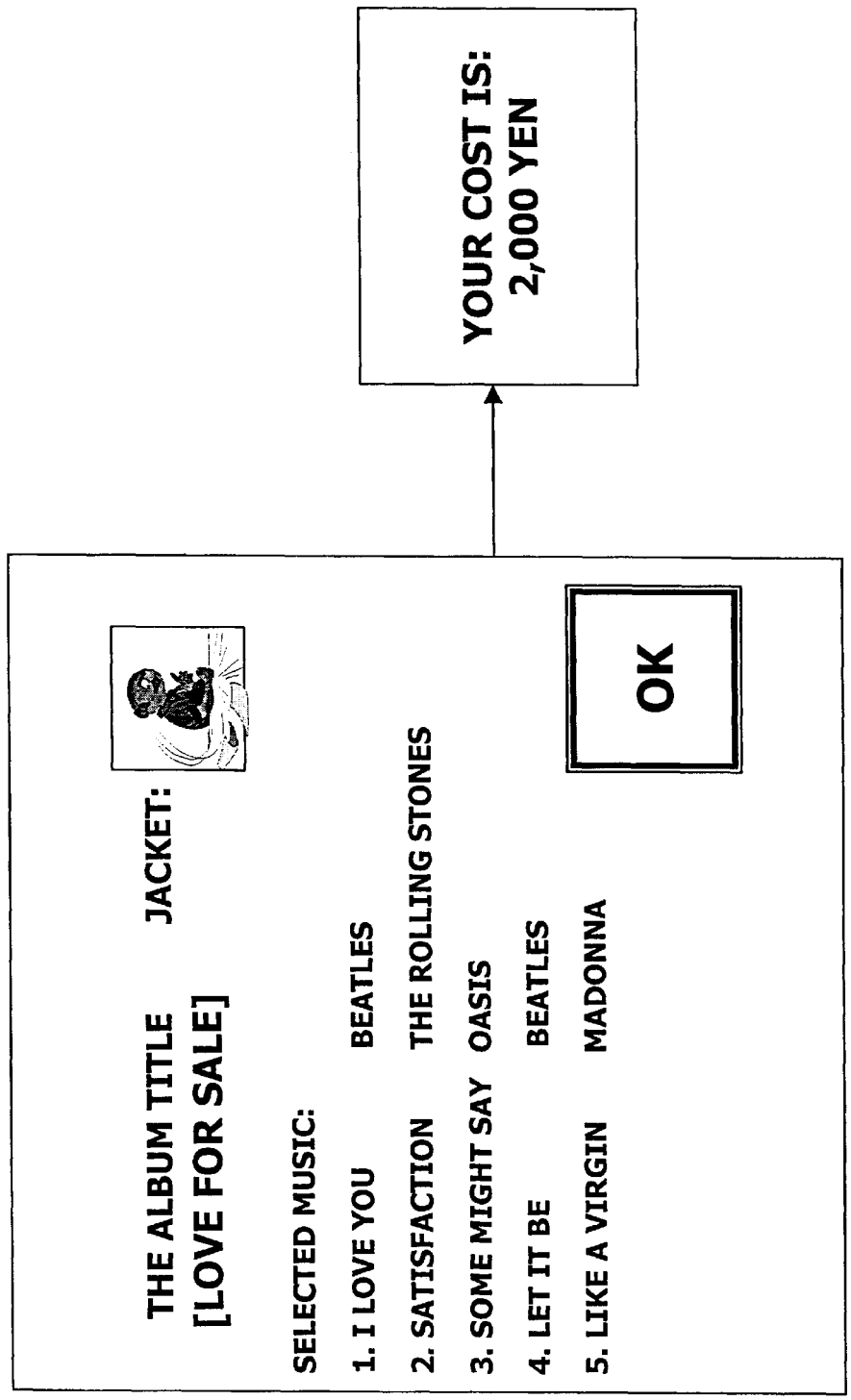
FIG. 28 is an illustrative diagram of another portion of the operation of the system for purchasing a personal recording media according to the present invention shown in FIG. 24.

After the above mentioned design step is completed, the verification items such as shown in FIG. 28 are displayed on the monitor screen, respectively. That is, the contents of the respective items "ALBUM TITLE", "JACKET" and "SELECTED MUSIC" are displayed again for final verification. By touching the item "OK" after this final verification is complete, an indication of the cost for the MD which is intended to be produced, for example, as "YOUR COST IS 2,000 YEN", is displayed on the monitor screen.

3-5. Payment Step

Figure 29:
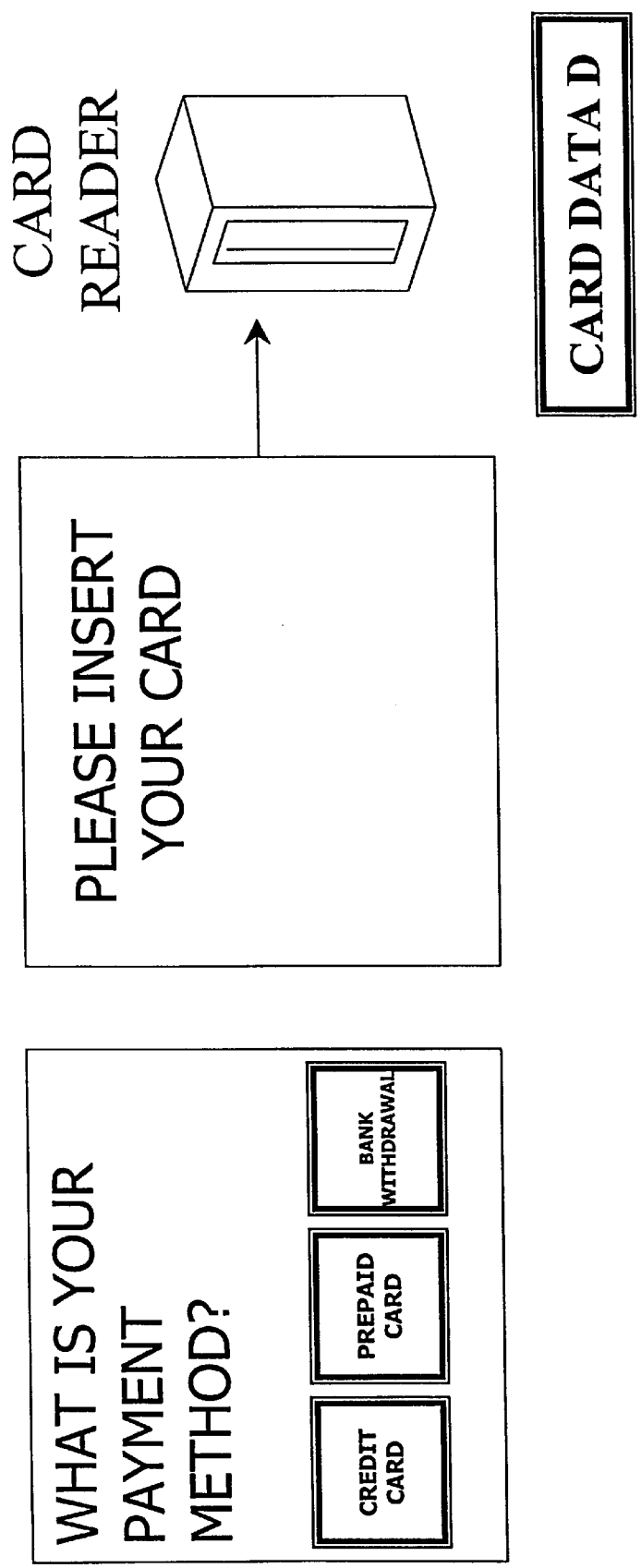
FIG. 29 is an illustrative diagram of another portion of the operation of the system for purchasing a personal recording media according to the present invention shown in FIG. 24.

Following the above mentioned final verification step, the items "CREDIT CARD", "PREPAID CARD", and "BANK WITHDRAWAL" are displayed on the monitor screen, as shown in FIG. 29, along with the character display of "WHAT IS YOUR PAYMENT METHOD?". When the customer has selected the payment method by touching any one of the items on the monitor screen, the character display "PLEASE INSERT THE CARD" is implemented, and the customer will then insert the card corresponding to the selected payment method into the cardreader. When the card read by the cardreader is confirmed, the "CARD DATA D" will then be produced.

3-6. Transmission Step

Figure 30:
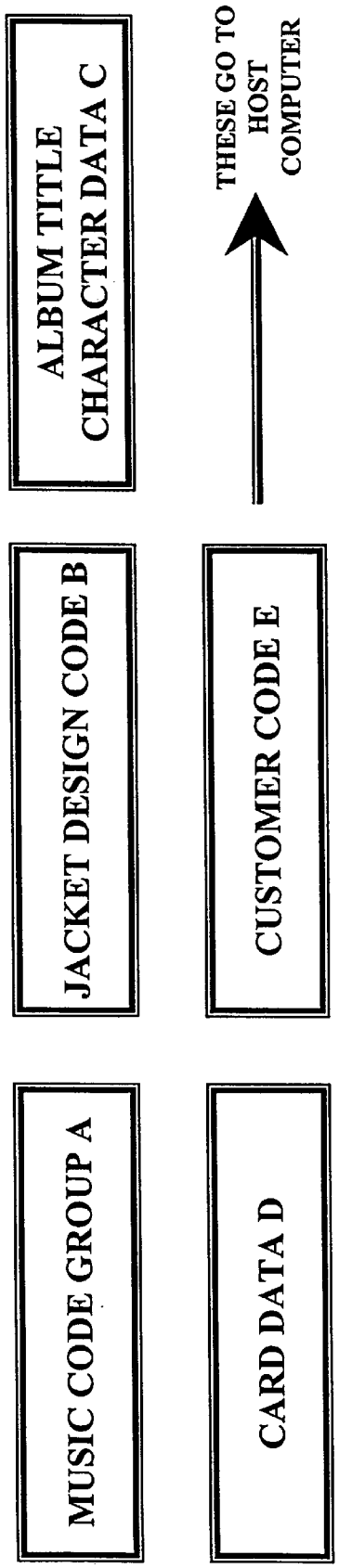
FIG. 30 is an illustrative diagram of another portion of the operation of the system for purchasing a personal recording media according to the present invention shown in FIG. 24.

After the above mentioned payment step is complete, as shown in FIG. 30, the "MUSIC CODE GROUP A", "CARD DATA D" and "CUSTOMER CODE E", which have been produced as described above, are transmitted to the host-computer 202 which is provided in the backchannel company 200 through the communication system 108, the telephone line 400 and the communication system 201, as shown in FIG. 24.

3-7. Backchannel Company Work Steps

Figure 31:
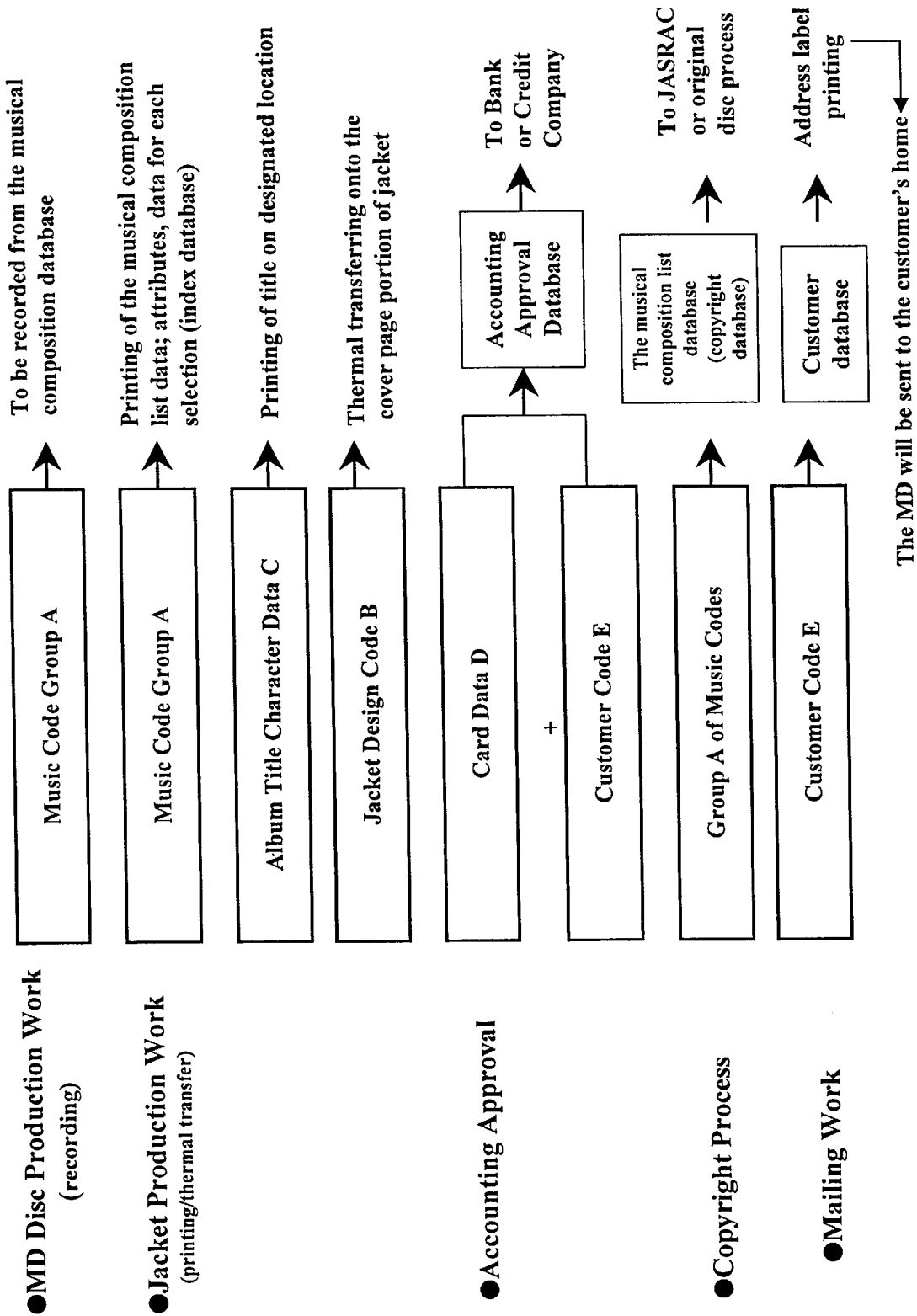
FIG. 31 is an illustrative diagram of another portion of the operation of the system for purchasing a personal recording media according to the present invention shown in FIG. 24.

FIG. 31 shows the work steps in the backchannel company 1200.

3-7.1. MD Disc Production Work

After the above mentioned steps are complete, the production step of the MD is begun. In the present embodiment, the MD disc production work, i.e., the recording, is implemented in the backchannel company 1200. The input information required for the MD production is "MUSIC CODE GROUP A" as mentioned above. Based on MUSIC CODE GROUP A, the musical composition data database 1204 in the music database 1207 in the backchannel company 1200 is searched, and the musical compositions corresponding to the information of the MUSIC CODE GROUP A are selected from the musical composition data database 1204, and then the selected musical compositions are high-speed recorded into the MD by the MD writer 1211.

3-7.2. Jacket Production Work

Further, in the backchannel company 1200, based on the "MUSIC CODE GROUP A", "JACKET DESIGN CODE B" and "ALBUM TITLE CHARACTER DATA C", the jacket production work (i.e., printing/thermal transfer) is implemented by the printer 1212. Herein, at first, based on the "MUSIC CODE GROUP A", the musical composition list database 1203 in the music database 1207 is searched, and the attribute of each music is selected from the musical composition list database 1203 and the index database 1205, and then that information is printed on the predetermined locations of the jacket. Next, based on the "ALBUM TITLE CHARACTER DATA C", the title being input is printed on the title location of the jacket. Then, based on the "JACKET DESIGN CODE B", the selected jacket design is thermally transferred to the front cover of the jacket.

3-7.3. Accounting Approval

The host-computer 1202 retrieves the customer database 1208 and the accounting approval database 1209 in the company side database 1210, based on the information of "CARD DATA D" and "CUSTOMER CODE E", and the necessary information is sent from these database 1208 and 1209 to the predetermined financial institution such as a credit company and the like, and then the accounting approval of the customer is carried out.

3-7.4. Copyright Process

The host-computer 1202 retrieves the musical composition list database 1203 and the copyright database 1206 in the music database 1207, based on the information of "MUSIC CODE GROUP A". The copyright process is carried out by sending the necessary information from the copyright database 1206 of the music database 1207 to the JASRAC, and the original disc process is carried out by sending the necessary information from the musical composition list database 1203 of the music database 1207 to the recording company and the like.

3-7.5. Mailing Work

The host-computer 1202 retrieves the customer database 1208 in the company side database 1210, based on the information of the "CUSTOMER CODE E", and then prints the address label of the customer from the information such as the customer's address, and the like, and then mails the MD after having completed a predetermined packing. As a result of this, the customer can receive the ordered MD.

Figure 32:
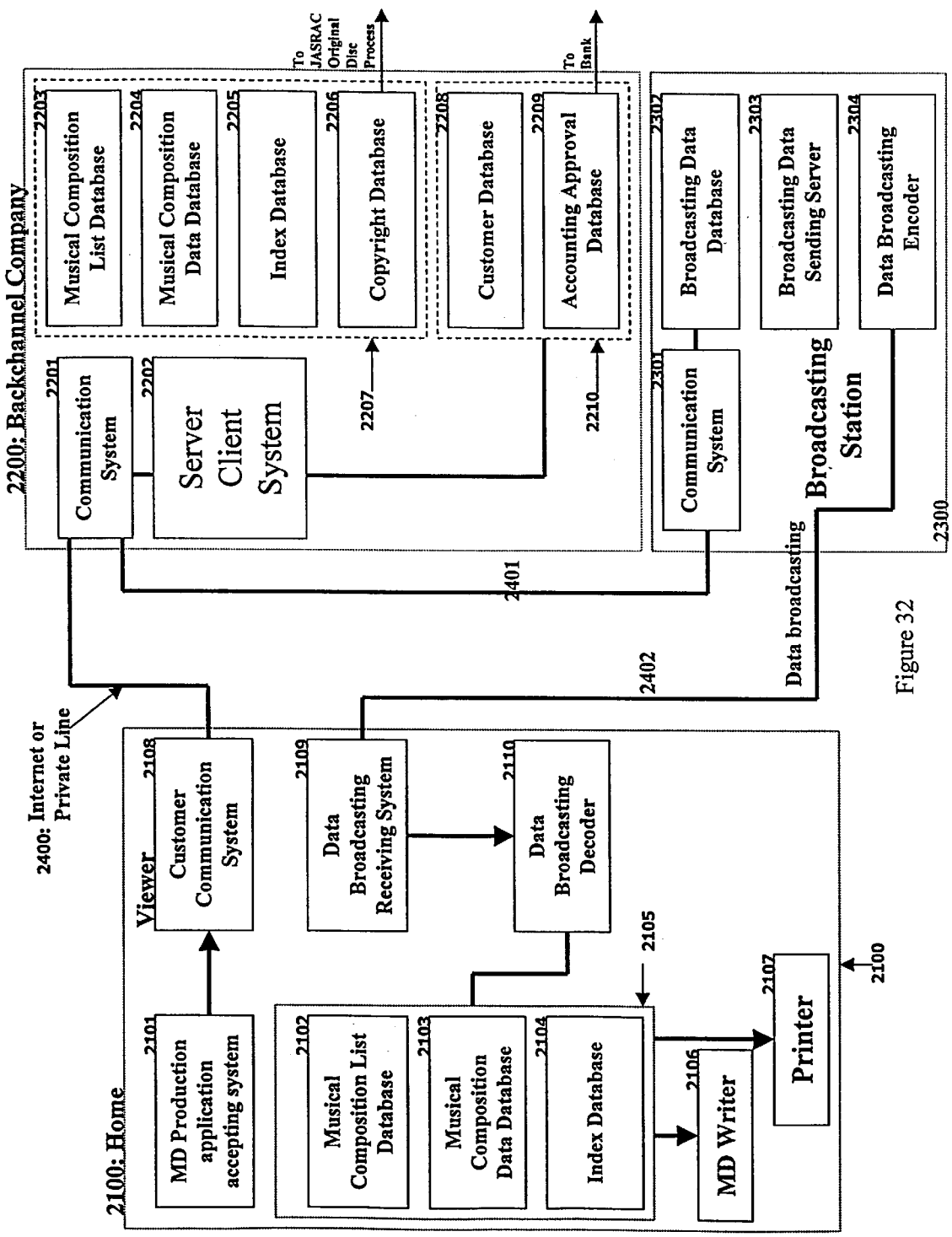
FIG. 32 is a schematic diagram showing a fourth embodiment of the system for purchasing a personal recording media according to the present invention.

FIG. 32 is a schematic diagram showing the fourth embodiment of the system for purchasing a personal recording media (as before, it is referred to as "a purchasing system") according to the present invention.

As shown in FIG. 32, the main parts of the purchasing system in this embodiment are composed of a home 2100, a backchannel company 2200, and a broadcasting station 2300. The home 2100 is connected with the backchannel company 2200 using a telephone line (instead, an internet or a private line could be used) 2400. Further, the home 2100 and the broadcasting station 2300, as well as the backchannel company 2200 and the broadcasting station 2300 are respectively communicated with each other through the satellite waves (instead, ground waves or cable could be used) 2401, 2402, respectively.

The home 2100 includes a MD production application accepting system 2101 (the "AAS") including the PC/TV; a home side database 2105 connected to the AAS 2101 and composed of a musical composition list database 2102, a musical composition data database 2103 and an index database 2104; a MD writer 2106 connected to the home side database 2105; a printer 2107 connected to the home side database 2105; a communication system 2108 connected to the AAS 2101; a data broadcasting receiving system 2109; and a data broadcasting decoder 2110 connected to the home side database 2105.

The backchannel company 2200 includes a communication system 2201 connected to the communication system 2108 of the home 2100 via a telephone line and the like 2400; a server-client system (the "host-computer") 2202 connected to the communication system 2201; a music database 2207 connected to the host-computer 2202 and composed of a musical composition list database 2203, a musical composition data database 2204, an index database 2205 and a copyright database 2206, and a company side database 2210 connected to the host-computer 2202 and composed of a customer database 2206 and an accounting approval database 2207.

The broadcasting station 2300 includes a communication system 2301 connected to the communication system 2201 in the backchannel company 2200 through the satellite wave 2401, a broadcasting data database 2302 connected to the communication system 2301, a broadcasting data sending server 2303 connected to the broadcasting data database 2302, and a data broadcasting encoder 2304 connected to the data broadcasting receiving system 2109 in the home 100, through the broadcasting data sending server 2303 and the satellite wave 2402.

Before describing the structure of FIG. 32, the features of the fourth embodiment will be described below.

Although this fourth embodiment resembles the third embodiment described above, the substantial difference is that it is configured to produce a MD at home, and the new music can be the MD produced with the data broadcasting. Further, the purchasing system of the fourth embodiment is a service directed to the specific member:

(1) The musical composition list (music codes) and the musical composition data will be sent from the broadcasting station 2300 using the data broadcasting;

(2) The utilization status is suck up with the telephone line;

(3) The copyright approval process is implemented.

In the following, the prerequisites in the fourth embodiment are described:

A. The musical composition list database is stored in the harddisc within the PC/TV (a maintenance is updated by a telephone line at midnight).

B. A musical composition list (music codes) and a musical composition data (digital sound source) of a new musical composition is coming down through the data broadcasting. A dedicated decoder is used.

C. A person who wants to purchase a new musical composition will click a button during the main broadcasting. At that moment, the musical composition list (music codes) is accumulated and will be sent to the host-computer together with a member code. An approval code will be sent back from the host-computer. Further, the musical composition data (the music sound source) is stored into the harddisc once, but a watermark will be input only by matching with the above mentioned approval code, and the decipherment will be implemented. Then, only once, it is highspeed recorded from the harddisc to the MD.

In the following, referring to FIGS. 33 to 38, an operation of the purchasing system of the fourth embodiment will be described in detail.

Assuming that a recording company M has produced, for example, a new music recording "LOVE YOU" of SEIKO MATSUDA. The recording company M will immediately register that new music to the music database, and also a music sound source (digital) is deposited on the same date. Then, a music code for that new music, for example 081AMDM029988, is provided. Then, the recording company M puts the new music "LOVE YOU" of SEIKO MATSUDA on air in the special channel for the music delivering program "NEW MUSIC" of the J SKY B by bringing the promotional video tape of the new music "LOVE YOU" on which the music code 081AMDM029988 and the music sound source (digital) are provided into the special channel for the music delivering "NEW MUSIC", and transmits the music code 081AMDM029988 and the music sound source (digital) with the data broadcasting band at the same time.

It is assumed that, on a monitor screen of the PC/TV which is connected to the telephone line, the channel "NEW MUSIC" is turned on, and just the new music "LOVE YOU" of SEIKO MATSUDA is on air.

Figure 33:
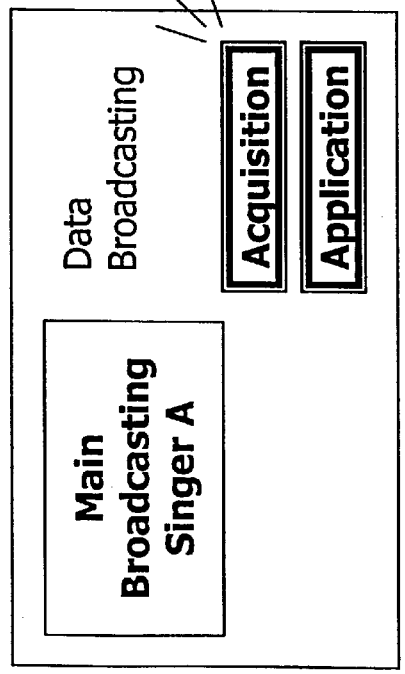
FIG. 33 is an illustrative diagram of one portion of the operation of the system for purchasing a personal recording media according to the present invention shown in FIG. 32.

FIG. 33 shows a monitor screen of the PC/TV at the home 2100. Herein, it is assumed that in the main broadcasting (in the above case, it is the channel "NEW MUSIC" of J SKY B) a scene of the new music "LOVE YOU" of a singer A (in the above case, it is SEIKO MATSUDA) is running on the air.

4-1. Acquisition

The entry displays "ACQUISITION" and "APPLICATION" are shown on the monitor screen of the PC/TV. Herein, assuming that the entry display "ACQUISITION" is blinking in order to indicate a possibility of a direct receiving. Then, by clicking or touching this blinking entry display "ACQUISITION", the music code 081AMDM029988 and the music sound source (digital) corresponding to the music "LOVE YOU" are stored on the harddisc of the PC/TV.

Similarly, the customer (the member) selects the new music "HOW TO BE A GIRL" of NAMIE AMURO during the same main broadcasting (the channel "NEW MUSIC" of J SKY B), and then the music code and the music sound source (digital) corresponding to this music is stored into the harddisc of the PC/TV. By doing so, it is assumed that, by selecting a few music selections during the same main broadcasting, the music codes for five music selections are stored on the harddisc of the PC/TV when the channel "NEW MUSIC" has been completed. Accordingly, in this example, "THE GROUP A OF MUSIC CODES" and "THE MUSIC SOUND SOURCE ALPHA" composed of five music selections are produced.

4-2. Application

Figure 34:
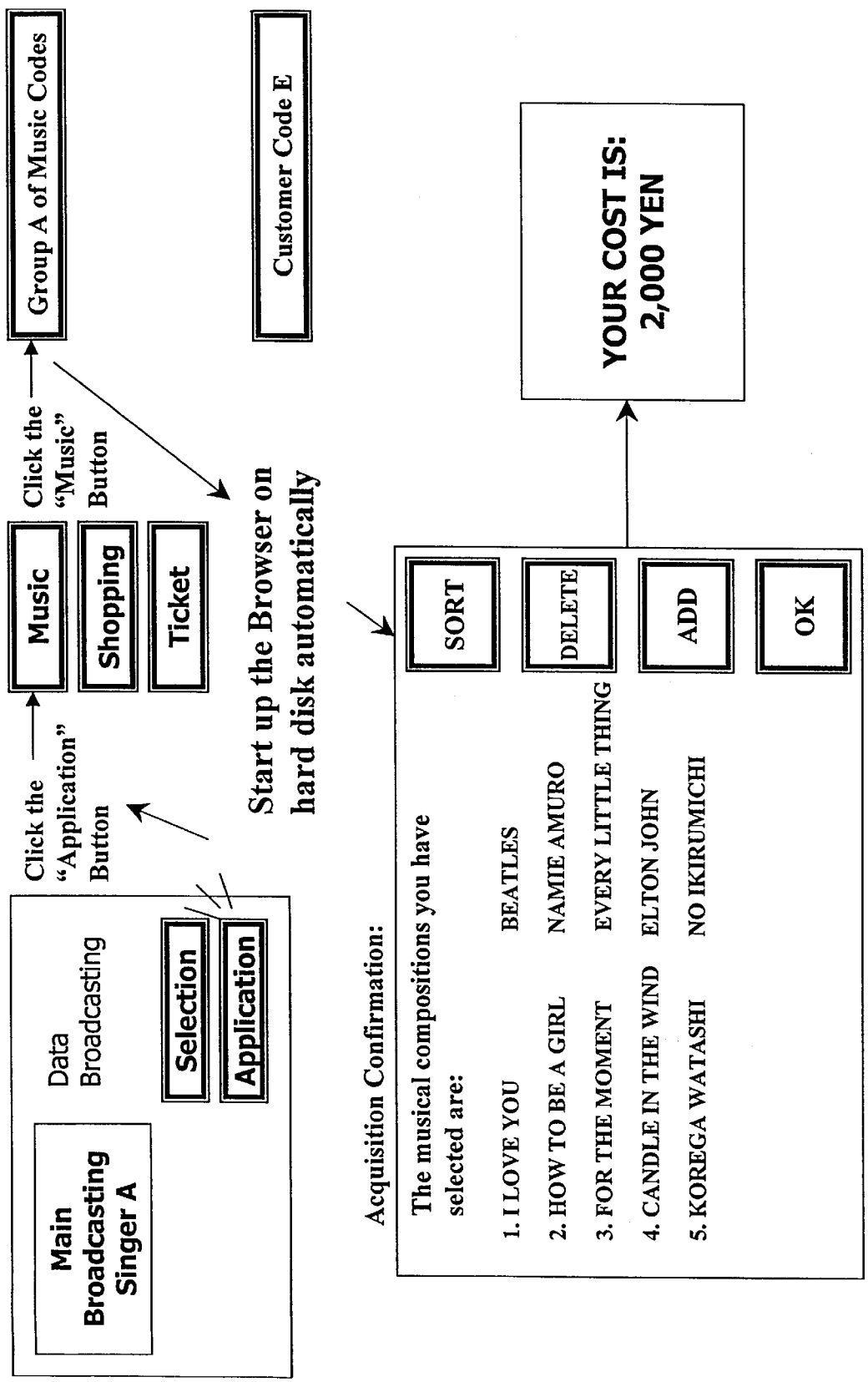
FIG. 34 is an illustrative diagram of another portion of the operation of the system for purchasing a personal recording media according to the present invention shown in FIG. 32.

The process moves to the application operation, as shown in FIG. 34, when the acquisition step of the above has been completed.

By clicking (or touching) the entry display "APPLICATION" on the monitor screen of the PC/TV, the entry displays "MUSIC", "SHOPPING", "TICKET" are displayed on the monitor screen. Item "MUSIC" is clicked in this embodiment.

By clicking the item "MUSIC", in this embodiment, the "THE GROUP A OF MUSIC CODES" composed of the music codes of several music selections (e.g., five) as well as the "CUSTOMER CODE E" are produced as well. Further, at the same time, a browser within the harddisc of the PC/TV is started-up automatically, and then, after having displayed the words "ACQUISITION CONFIRMATION/ THE MUSICAL COMPOSITIONS YOU HAVE SELECTED ARE:", the musical compositions selected in the above mentioned manner are displayed on the screen.

In this example, the selected musical compositions are displayed on the monitor screen as:

| 1. | LOVE YOU | SEIKO MATSUDA |
|---|---|---|
| 2. | HOW TO BE A GIRL | NAMIE AMURO |
| 3. | FOR THE MOMENT | EVERY LITTLE THING |
| 4. | CANDLE IN THE WIND | ELTON JOHN |
| 5. | KOREGA WATASHI-NO IKIRUMICHI | PUFFY | and the selection items "SORT", "DELETE", "ADD" and "OK" are displayed on the monitor screen at the same time.

4-2.1. Sorting of Musical Compositions

In the following, the sorting procedures of the orders for the selected musical compositions will be described.

By touching the item "SORT" on the monitor screen, as shown below, on the monitor screen, brackets [ ] are displayed on the right side of each of the musical compositions, respectively:

| 1. | LOVE YOU | SEIKO MATSUDA | [ ] |
|---|---|---|---|
| 2. | HOW TO BE A GIRL | NAMIE AMURO | [ ] |
| 3. | FOR THE MOMENT | EVERY LITTLE THING | [ ] |
| 4. | CANDLE IN THE WIND | ELTON JOHN | [ ] |
| 5. | KOREGA WATASHI-NO IKIRUMICHI | PUFFY | [ ] |

In this example, because the first and the third musical compositions are to be sorted, the order of the musical compositions are changed to the order of 3. 2. 1. 4. 5. by entering the numbers 3, 2, 1, 4, 5 into the brackets [ ] from the top to the bottom in order. Of course, it could be constituted such that the order of the musical compositions can be sorted by using other commonly known methods such as one utilizing a cursor. On the monitor screen, the item "OK" is displayed at the same time, and by touching "OK" when the desired sorting has been completed, the monitor screen returns to the display of the "THE MUSICAL COMPOSITIONS YOU HAVE SELECTED ARE:", and the sort changed musical compositions, such as shown in below, are displayed:

| 3. | FOR THE MOMENT | EVERY LITTLE THING |
|---|---|---|
| 2. | HOW TO BE A GIRL | NAMIE AMURO |
| 1. | LOVE YOU | SEIKO MATSUDA |
| 4. | CANDLE IN THE WIND | ELTON JOHN |
| 5. | KOREGA WATASHI-NO IKIRUMICHI | PUFFY |

Then, by touching the item "OK" on the screen, the display of "THE MUSICAL COMPOSITIONS YOU HAVE SELECTED ARE:" is so displayed as to be renumbered such as;

| 1. | FOR THE MOMENT | EVERY LITTLE THING |
|---|---|---|
| 2. | HOW TO BE A GIRL | NAMIE AMURO |
| 3. | LOVE YOU | SEIKO MATSUDA |
| 4. | CANDLE IN THE WIND | ELTON JOHN |
| 5. | KOREGA WATASHI-NO IKIRUMICHI | PUFFY |

4-2.2. Deletion of Musical Compositions

Deletion of selected musical compositions can be implemented by touching the item "DELETE" on the monitor screen. By touching the item "DELETE", the character display "PLEASE TOUCH THE MUSICAL COMPOSITION(S) TO BE DELETED" is made, and further the list of the selected musical compositions:

| 1. | FOR THE MOMENT | EVERY LITTLE THING |
|---|---|---|
| 2. | HOW TO BE A GIRL | NAMIE AMURO |
| 3. | LOVE YOU | SEIKO MATSUDA |
| 4. | CANDLE IN THE WIND | ELTON JOHN |
| 5. | KOREGA WATASHI-NO IKIRUMICHI | PUFFY | is displayed on the monitor screen, as well as the selection item "OK" is also displayed at the same time. Herein, when deleting the musical composition "3. LOVE YOU SEIKO MATSUDA" in the musical composition list, the part of the musical composition "3. LOVE YOU SEIKO MATSUDA" is removed from the list by touching the corresponding musical composition display portion on the monitor screen, and only that portion is displayed on the new page in the screen of the monitor with the selection item "OK" as:

| WILL BE DELETED | | |
|---|---|---|
| 3. | LOVE YOU | SEIKO MATSUDA |

Herein, by touching the item "OK", the monitor screen displays again as shown below by renumbering the musical compositions except the deleted musical composition:

| 1. | FOR THE MOMENT | EVERY LITTLE THING |
|---|---|---|
| 2. | HOW TO BE A GIRL | NAMIE AMURO |
| 3. | CANDLE IN THE WIND | ELTON JOHN |
| 4. | KOREGA WATASHI-NO IKIRUMICHI | PUFFY |

4-2.3. Addition of Musical Compositions

When newly adding a musical composition, the monitor screen displays the words "THE MUSICAL COMPOSITION WILL BE ADDED" by touching the selection item "ADD", and returns to the screen of "The Musical Composition Selection Step" as described above. Then, as described above, a new musical composition can be added by operating a necessary procedure while watching the monitor screen.

"THE GROUP A OF THE MUSIC CODES" corresponding to the edited musical compositions are created by touching the item "END BUTTON" on the screen after having implemented the necessary operations in the above mentioned musical composition editing step. Also, as described below, the monitor screen will shift to the next step by touching the item "END BUTTON".

4-3. Design Step

In this step, the jacket design selection and the album title entry of the MD are implemented. Since this step is the same as the one in the first embodiment, the same description will be repeated below.

4-3.1. Jacket Design Selection

With the completion of the musical composition editing step as described in the above step 3, in this example, the nine kinds of jacket design are displayed on one screen (i.e., one page) of the monitor, as shown in FIGS. 5 and 18, along with the character display of "PLEASE SELECT THE FAVORITE JACKET". Jacket designs on other pages of the monitor screen can be displayed on the monitor screen in such a manner that the jacket designs displayed on the previous page and the next page can be displayed on the monitor screen by touching the entry displays of "PREVIOUS PAGE" and "NEXT PAGE" on the monitor screen, respectively. Of course, the number of kinds of the jacket designs incorporated in one screen (i.e., one page) may be set arbitrarily. Once the jacket design has been selected by touching the monitor screen, and then the "JACKET DESIGN CODE B" corresponding to the selected jacket design is created by touching the entry display "OK".

4-3.2. Album Title Entry

After the jacket design selection is completed, the character display of "PLEASE ENTER THE ALBUM TITLE" as well as the items "KEYBOARD ENTRY", "TOUCHSENSOR ENTRY" are displayed on the monitor screen, as shown in FIGS. 6 and 19. The customer enters the album title on which he/she has decided, through the keyboard or the touchsensor, after having touched either one of the items "KEYBOARD ENTRY" or "TOUCHSENSOR ENTRY". The monitor screen sequentially displays the characters of the title of the album to be entered such as "THE ALBUM TITLE IS "LOVE FOR SALE". IS IT OK?" The items "CHANGE" and "OK" are displayed simultaneously at the same time when either one of the items "KEYBOARD ENTRY" or "TOUCHSENSOR ENTRY" is touched.

The customer implements an entry again with the procedures described above, by touching the item "CHANGE", if he/she desires to change the entered album title, while watching the monitor screen. Further, if the entered album title is all right as it is, then the "ALBUM TITLE CHARACTER DATA C" corresponding to the album title being displayed is created by touching the item "OK".

4-4. Final Verification Step

After the above mentioned design step is completed, the verification items such as shown in FIG. 7 (refer to the first embodiment) are displayed on the monitor screen, respectively. That is, the contents of the respective items "ALBUM TITLE", "JACKET" and "SELECTED MUSIC" are displayed again for final verification. By touching "OK" on the monitor screen after this final verification is complete, an indication of the cost for the MD which is intended to be produced, for example, as "YOUR COST IS 2,000 YEN", is displayed on the monitor screen.

4-5. Payment Step

Figure 35:
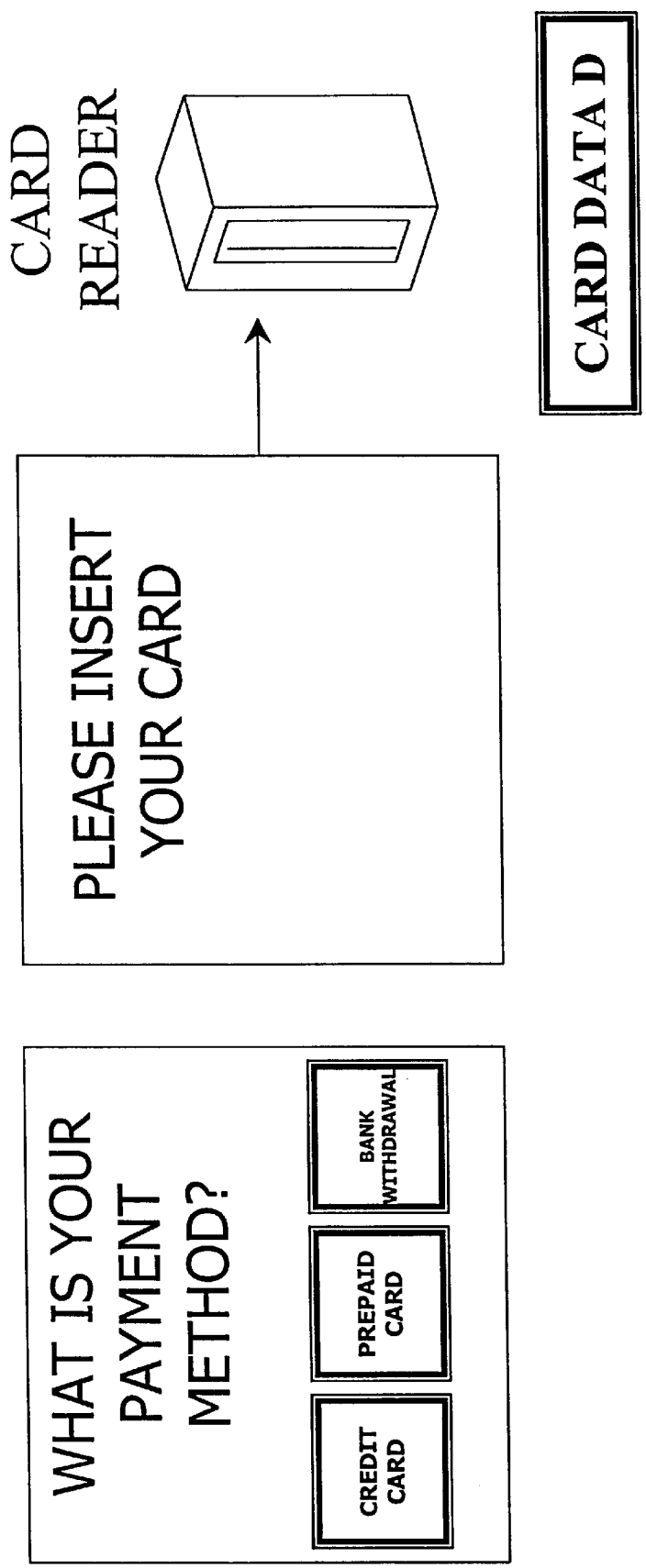
FIG. 35 is an illustrative diagram of another portion of the operation of the system for purchasing a personal recording media according to the present invention shown in FIG. 32.

Following the above mentioned final verification step, the items "CREDIT CARD", "PREPAID CARD", and "BANK WITHDRAWAL" are displayed on the monitor screen, as shown in FIG. 35, along with the character display of "WHAT IS YOUR PAYMENT METHOD?". When the customer has selected the payment method by touching any one of the items on the monitor screen, the character display "PLEASE INSERT THE CARD" is implemented, and the customer will then insert the card corresponding to the selected payment method into the cardreader. When the card read by the cardreader is confirmed, the "CARD DATA D" will then be produced.

4-6. Transmission Step

Figure 36:
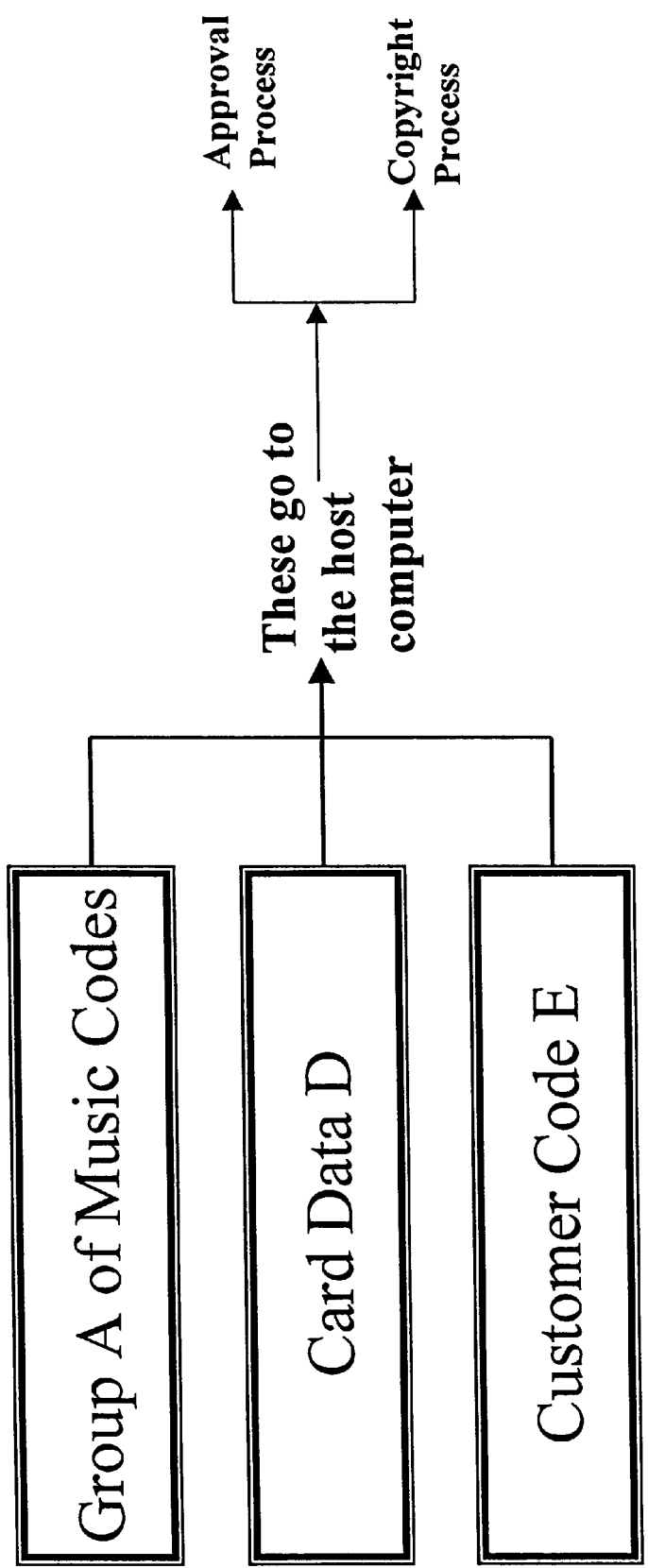
FIG. 36 is an illustrative diagram of another portion of the operation of the system for purchasing a personal recording media according to the present invention shown in FIG. 32.

After the above mentioned payment step is completed, as shown in FIG. 36, the "MUSIC CODE GROUP A", "CARD DATA D" and "CUSTOMER CODE E", which have been produced as described above, are transmitted to the host-computer 2202 which is provided in the backchannel company 2200 through the communication system 2108, the telephone line 2400 and the communication system 2201, as shown in FIG. 23.

4-6.1. Accounting Approval

The host-computer 2202 retrieves the customer database 2208 and the accounting approval database 2209 in the company side database 2210, based on the information of "CARD DATA D" and "CUSTOMER CODE E", and the necessary information is sent from these database 2208 and 2209 to the predetermined financial institution such as a credit company and the like, and then the accounting approval of the customer is carried out.

4-6.2. Copyright Process

The host-computer 2202 retrieves the musical composition list database 2203 and the copyright database 2206 in the music database 2207, based on the information of "THE GROUP A OF THE MUSIC CODES". The copyright process is carried out by sending the necessary information from the copyright database 2206 of the music database 2207 to the JASRAC, and the original disc process is carried out by sending the necessary information from the musical composition list database 2203 of the music database 2207 to the recording company and the like.

4-7. Cipher Approval

Figure 37:
FIG. 37 is an illustrative diagram of another portion of the operation of the system for purchasing a personal recording media according to the present invention shown in FIG. 32.

As shown in FIG. 37, after having confirmed the receipt of "THE GROUP A OF THE MUSIC CODES", "THE CARD DATA D" and "THE CUSTOMER CODE E" in the host-computer 2202 of the backchannel company 220, "THE APPROVAL CODE BETA" is transmitted to the PC/TV of the home 2100, attached to "THE CUSTOMER CODE E".

4-8. Defrost

Figure 38:
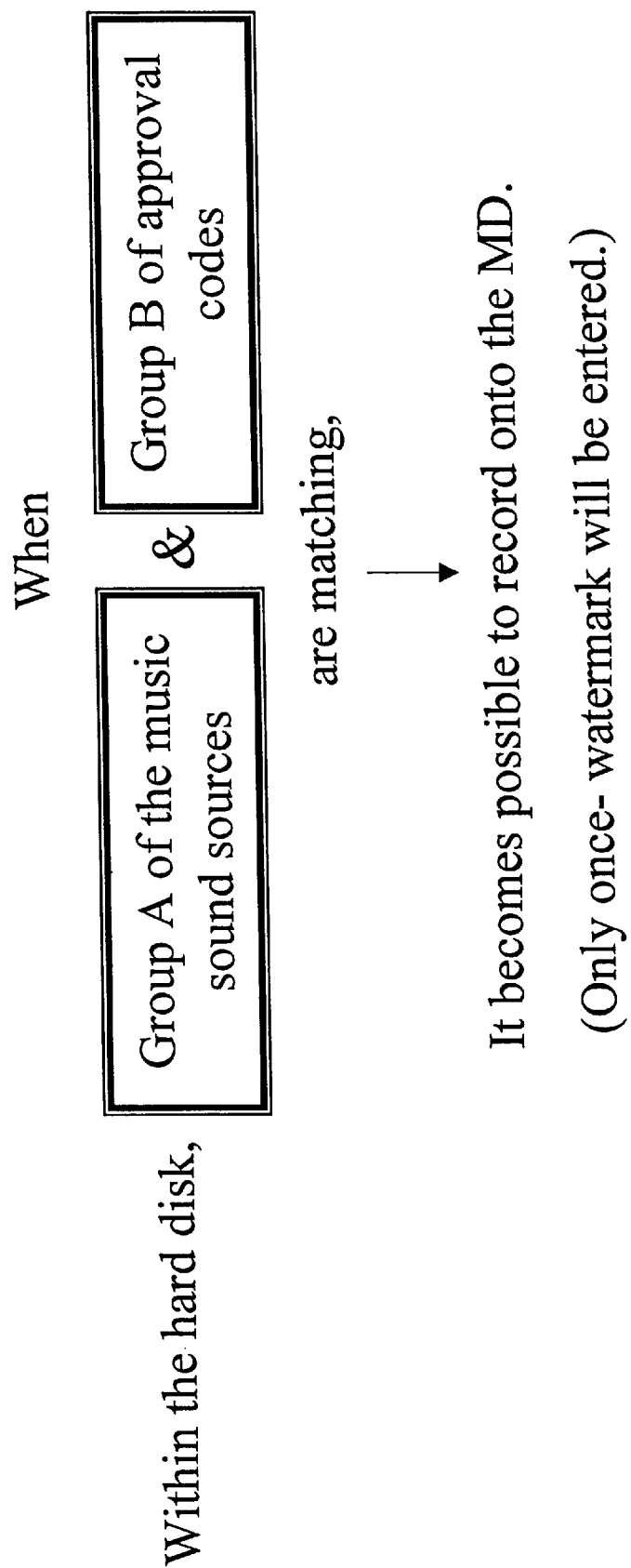
FIG. 38 is an illustrative diagram of another portion of the operation of the system for purchasing a personal recording media according to the present invention shown in FIG. 32.

As shown in FIG. 38, if "THE GROUP ALPHA OF THE MUSIC SOUND SOURCES" being stored within the hard-disc of the PC/TV in the home 2100 and "THE APPROVAL CODE BETA" being sent from the host-computer 2202 in the backchannel company 2200 match, then it is possible to record the desired musical compositions into the MD (only once, because the watermark will then be entered).

4-9. MD Disc Production Work

After the above mentioned steps are completed, the production step of the MD is begun. In this embodiment, the MD disc production work, i.e., the recording, is implemented in the home 2100. The group alpha of the music sound sources which has been defrosted in the above step are high-speed recorded into the MD by the MD writer 2106.

4-10. Jacket Production Work

Further, in the home 2100, based on the "GROUP A OF THE MUSIC CODES", "JACKET DESIGN CODE B" and "ALBUM TITLE CHARACTER DATA C", the jacket production work (i.e., printing/thermal transfer) is implemented by the printer 2107. Herein, at first, based on the "GROUP A OF THE MUSIC CODES", the musical composition list database 2103 in the home side database 2105 is retrieved, and the attribute of each music is selected from the musical composition list database 2103 and the index database 2105, and then that information is printed on the predetermined locations of the jacket. Next, based on the "ALBUM TITLE CHARACTER DATA C", the title being input is printed on the title location of the jacket. Then, based on the "JACKET DESIGN CODE B", the selected jacket design is thermally transferred to the front cover of the jacket.

All of the above embodiments are described when the system for purchasing a personal recording media, the method of purchasing a personal recording media, and the media recorded with a personal recording media purchasing program are applied to musical compositions.

However, the present invention is not limited to musical compositions, but it could be applied to, for example, digital compositions in which video and/or sound are used as the information source, such as movies and TV advertisements. In these cases, as the personal recording media, the MD for the musical compositions could be replaced with a video cassette tape, a DVD (Digital Versatile Disc) or the like. Further, the present invention could also be applied to a software game in which images of the graphics and/or sound are used as the information source. In these cases, as the personal recording media, the MD for the musical compositions could be replaced with floppy disks and the like.

According to the present invention, the customer could produce and purchase a personal recording media in which the customer's desired information are recorded only, by using the system, the method, as well as the media of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. A system for purchasing a personal recording media, comprising:
    a first station, including
        a first entering means for entering an identification information in order to identify a customer;
        a second entering means for entering at least one designated information by said customer when said customer is identified as an authorized customer;
        a first information storing means for storing a plurality of information;
        a information recording means for recording information associated with said designated information by retrieving said plurality of information of said first information storing means based on said designated information entered from said second entering means;
    a second station, including
        means connected to said first station for identifying whether or not said customer is an authorized customer based on said identification information entered by said first entering means;
        a second information storing means for storing a plurality of information corresponding to said plurality of information stored in said first storing means;
        means for implementing a predetermined accounting process regarding said recording media into which said information has been recorded;
        a third station, connected to said first station and said second station, respectively, including a latest information storing means for storing the latest information,
    wherein, said first station and said second station update said plurality of information stored in said first information storing means and said second information storing means, respectively, based on said latest information stored in said latest information storing means,
    wherein said customer can purchase said recording media at said first station in such a manner that said recording media consisting of an arbitrary numbers of said information is produced at said first station based on said designated information entered by said customer at said first station.

2. A system for purchasing a personal recording media according to claim 1, wherein said plurality of information stored in said first information storing means and said plurality of information stored in said second information storing means are musical composition information which include information concerning a musical composition list, a musical composition data, an index and a copyright.

3. A system for purchasing a personal recording media according to claim 2, wherein said musical composition information further includes information concerning an original disc right.

4. A system for purchasing a personal recording media according to claim 1, wherein said information storing means is a musical composition information storing means, and said plurality of information stored therein are a plurality of musical composition information which include information concerning a musical composition list, a musical composition data, an index and a copyright.

5. A system for purchasing a personal recording media according to claim 4, wherein said plurality of musical information further include information concerning an original disc right.

6. A system for purchasing a personal recording media according to claim 4, wherein said musical composition information storing means is a database having an accumulable specification which unifies the music, and is constituted by digitalizing and unifying a sound source, a MIDI data, a music score data, and a right attribution data.

7. A system for purchasing a personal recording media according to claim 6, wherein said musical composition information storing means includes the information of five categories of a music attribution, an original disc right, a copyright, a music score, and a sound source.

8. A system for purchasing a personal recording media according to claim 7, wherein said musical attribution includes at least one of:
    music code (country code+work code);
    name of musical composition;
    time of musical composition;
    name(s) of artist(s);
    country code of artist(s); and
    manufactured date.

9. A system for purchasing a personal recording media according to claim 7, wherein said original disc right includes at least one of:
    owner(s) of the original disc;
    country code(s) of the owner(s) of the original disc;
    co-owner(s); and
    country code(s) of the co-owner(s).

10. A system for purchasing a personal recording media according to claim 8, wherein said copyright includes at least one of:
    name(s) of songwriter(s);
    country code(s) of songwriter(s);
    name(s) of representative publisher(s) of songwriter(s);
    country code(s) of representative publisher(s);
    name(s) of co-publisher(s);
    country code(s) of co-publisher(s);
    name(s) of musical composer(s);
    country code(s) of musical composer(s);
    name(s) of representative publisher(s) of musical composer(s);
    country code(s) of representative publisher(s);
    name(s) of co-publisher(s);
    country code(s) of co-publisher(s);

name(s) of musical arranger(s);

country code(s) of musical arranger(s);

name(s) of representative publisher(s) of musical arranger(s);

country code(s) of representative publisher(s);

name(s) of co-publisher(s); and country code(s) of co-publisher(s).

11. A system for purchasing a personal recording media according to claim 1, wherein said information storing means is a video information storing means, and said plurality of information are a plurality of video information which include information regarding a video data, a sound data, an index, and a copyright.

12. A system for purchasing a personal recording media according to claim 11, wherein said plurality of video information further include information regarding an original disc right.

13. A system for purchasing a personal recording media according to claim 11, wherein said video data is a motion picture data.

14. A system for purchasing a personal recording media according to claim 11, wherein said video data is a television program data.

15. A system for purchasing a personal recording media according to claim 11, wherein said video data is a commercial program data.

16. A system for purchasing a personal recording media according to claim 1, wherein said information storing means is an image information storing means, and said plurality of information are a plurality of image information which include information regarding a graphic data, a sound data, an index, and a copyright.

17. A system for purchasing a personal recording media according to claim 16, wherein said plurality of image information further include information regarding an original disc right.

18. A system for purchasing a personal recording media according to claim 11, wherein said video information storing means is a Digital Video Disc (DVD).

19. A system for purchasing a personal recording media according to claim 1, wherein said information storing means is a program storing means, and said plurality of information are a plurality of program information which include information regarding a plurality of software programs, an index, and a copyright.

20. A system for purchasing a personal recording media according to claim 19, wherein said plurality of program information further include information regarding an original disc right.

21. A system for purchasing a personal recording media according to claim 19, wherein said video information storing means is a video cassette tape (VCT).

22. A system for purchasing a personal recording media, comprising:

a first station, including a first entering means for entering an identification information in order to identify a customer;

a second entering means for entering at least one designated information by said customer when said customer is identified as an authorized customer;

a second station, including means connected to said first station for identifying whether or not said customer is an authorized customer based on said identification information entered by said first entering means;

an information storing means for storing a plurality of information;

means for reading said information associated with said designated information by retrieving said plurality of information in said information storing means based on said designated information entered from said second entering means;

information recording means connected to said information reading means for recording said information read from said information storing means into a predetermined recording media;

means for implementing a predetermined accounting process regarding said recording media into which said information has been recorded;

a third station, connected to said first station and said second station, respectively, including a latest information storing means for storing the latest information, wherein, said first station and said second station update said plurality of information stored in said information storing means in said second station based on said latest information stored in said latest information storing means, as necessary, wherein said customer can purchase said recording media at said first station in such a manner that said recording media consisting of an arbitrary numbers of said information is produced at said second station, based on said designated information entered by said customer at said first station, and then said produced recording media is delivered to said first station.

23. A system for purchasing a personal recording media according to claim 22, wherein said first station further includes means for storing a specific information consisting of a part of said plurality of information stored in said information storing means at said second station; and means for retrieving said specific information storing means based on said designated information entered from said second entering means by said customer and for displaying, to said customer, said specific information associated with said designated information entered.

24. A system for purchasing a personal recording media according to claim 23, wherein said information storing means is a musical composition information storing means, and said plurality of information stored therein are a plurality of musical composition information which include information concerning a musical composition list, a musical composition data, an index and a copyright.

25. A system for purchasing a personal recording media according to claim 24, wherein said musical composition information storing means is a database having an accumulable specification which unifies the music, and is constituted by digitalizing and unifying a sound source, a MIDI data, a music score data, and a right attribution data.

26. A system for purchasing a personal recording media according to claim 25, wherein said musical composition information storing means includes the information of five categories of a music attribution, an original disc right, a copyright, a music score, and a sound source.

27. A system for purchasing a personal recording media according to claim 23, wherein said information storing means is a video information storing means, and said plurality of information are a plurality of video information which include information regarding a video data, a sound data, an index, and a copyright.

28. A system for purchasing a personal recording media according to claim 27, wherein said video data is a motion picture data.

29. A system for purchasing a personal recording media according to claim 27, wherein said video data is a television program data.

30. A system for purchasing a personal recording media according to claim 27, wherein said video data is a commercial program data.

31. A system for purchasing a personal recording media according to claim 23, wherein said information storing means is an image information storing means, and said plurality of information are a plurality of image information which include information regarding a graphic data, a sound data, an index, and a copyright.

32. A system for purchasing a personal recording media according to claim 30, wherein said video information storing means is a Digital Video Disc (DVD).

33. A system for purchasing a personal recording media according to claim 23, wherein said information storing means is a program storing means, and said plurality of information are a plurality of program information which include information regarding a plurality of software programs, an index, and a copyright.

34. A system for purchasing a personal recording media according to claim 33, wherein said video information storing means is a video cassette tape (VCT).

35. A system for purchasing a personal recording media according to claim 24, wherein said plurality of musical composition information further include an original disc right.

36. A system for purchasing a personal recording media according to claim 26, wherein said musical attribution includes at least one of:
   music code (country code+work code);
   name of musical composition;
   time of musical composition;
   name(s) of artist(s);
   country code of artist(s); and
   manufactured date.

37. A system for purchasing a personal recording media according to claim 26, wherein said original disc right includes at least one of:
   owner(s) of the original disc;
   country code(s) of the owner(s) of the original disc;
   co-owner(s); and
   country code(s) of the co-owner(s).

38. A system for purchasing a personal recording media according to claim 26, wherein said copyright includes at least one of:
   name(s) of songwriter(s);
   country code(s) of songwriter(s);
   name(s) of representative publisher(s) of songwriter(s);
   country code(s) of representative publisher(s);
   name(s) of co-publisher(s);
   country code(s) of co-publisher(s);
   name(s) of musical composer(s);
   country code(s) of musical composer(s);
   name(s) of representative publisher(s) of musical composer(s);
   country code(s) of representative publisher(s);
   name(s) of co-publisher(s);
   country code(s) of co-publisher(s);
   name(s) of musical arranger(s);
   country code(s) of musical arranger(s);
   name(s) of representative publisher(s) of musical arranger (s);
   country code(s) of representative publisher(s);
   name(s) of co-publisher(s); and
   country code(s) of co-publisher(s).

39. A system for purchasing a personal recording media according to claim 27, wherein said plurality of video information further include information regarding an original disc right.

40. A system for purchasing a personal recording media according to claim 31, wherein said plurality of image information further include information regarding an original disc right.

41. A system for purchasing a personal recording media according to claim 33, wherein said plurality of program information further include information regarding an original disc right.

* * * * *